(12) United States Patent
Matsuyama et al.

(10) Patent No.: US 6,962,623 B2
(45) Date of Patent: Nov. 8, 2005

(54) HARDENED CALCIUM SILICATE HAVING HIGH STRENGTH

(75) Inventors: Hiroyoshi Matsuyama, Fuji (JP); Kunio Matsui, Fuji (JP); Tadashi Shimizu, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 61 days.

(21) Appl. No.: 10/468,376

(22) PCT Filed: Feb. 19, 2001

(86) PCT No.: PCT/JP01/01168

§ 371 (c)(1),
(2), (4) Date: Aug. 19, 2003

(87) PCT Pub. No.: WO02/066396

PCT Pub. Date: Aug. 29, 2002

(65) Prior Publication Data

US 2004/0107872 A1 Jun. 10, 2004

(51) Int. Cl.[7] .............................................. C04B 14/04
(52) U.S. Cl. .................................... 106/796; 264/333
(58) Field of Search .......................... 106/796; 264/333

(56) References Cited

U.S. PATENT DOCUMENTS

| | | | | |
|---|---|---|---|---|
| 4,193,958 A | * | 3/1980 | Uchida et al. | 264/86 |
| 4,298,561 A | * | 11/1981 | Uchida et al. | 264/86 |
| 4,318,270 A | | 3/1982 | Orlick et al. | |
| 4,388,257 A | * | 6/1983 | Oguri et al. | 264/86 |
| 4,427,611 A | * | 1/1984 | Oguri et al. | 264/82 |
| 4,490,320 A | * | 12/1984 | Oguri et al. | 264/82 |
| 4,775,505 A | * | 10/1988 | Kuroda et al. | 264/82 |
| 5,242,649 A | * | 9/1993 | Yamamoto et al. | 264/333 |
| 5,330,573 A | * | 7/1994 | Nakano et al. | 106/796 |
| 5,580,508 A | * | 12/1996 | Kobayashi et al. | 264/234 |
| 6,139,620 A | * | 10/2000 | Suzuki et al. | 106/672 |
| 6,464,771 B1 | * | 10/2002 | Matsui et al. | 106/470 |

FOREIGN PATENT DOCUMENTS

| | | |
|---|---|---|
| JP | 63-295487 | 12/1988 |
| JP | 9-235115 | 9/1997 |
| JP | 9-328373 | 12/1997 |

* cited by examiner

*Primary Examiner*—Paul Marcantoni
(74) *Attorney, Agent, or Firm*—Dickstein, Shapiro, Morin & Oshinsky, LLP.

(57) ABSTRACT

Disclosed is a cured form of calcium silicate, mainly comprising tobermorite and exhibiting a powder X-ray diffraction pattern in which the diffraction peak intensity Ib ascribed to the (220) plane of the tobermorite and the minimum diffraction intensity Ia observed in the diffraction angle range between the two diffraction peaks respectively ascribed to the (220) plane and (222) plane of the tobermorite satisfy the relationship Ib/Ia ≧ 3.0; a differential pore distribution curve obtained by mercury porosimetry in which the logarithmic width of the pore diameter distribution as measured at a height of ¼ of the height of the maximum peak of the differential pore distribution curve is from 0.40 to 1.20, and also disclosed is a reinforced calcium silicate composite structure, and methods for producing same. The cured form of calcium silicate and the reinforced calcium silicate composite structure of the present invention which, while exhibiting an apparent specific gravity of from 0.14 to 1.0 (and, hence, having a light weight), exhibit excellent properties as a building material, such as a high strength, a high modulus of elasticity, a high resistance to the neutralization reaction, a high dimensional stability, and a high resistance to chipping.

21 Claims, 10 Drawing Sheets

Fig. 5
(A)
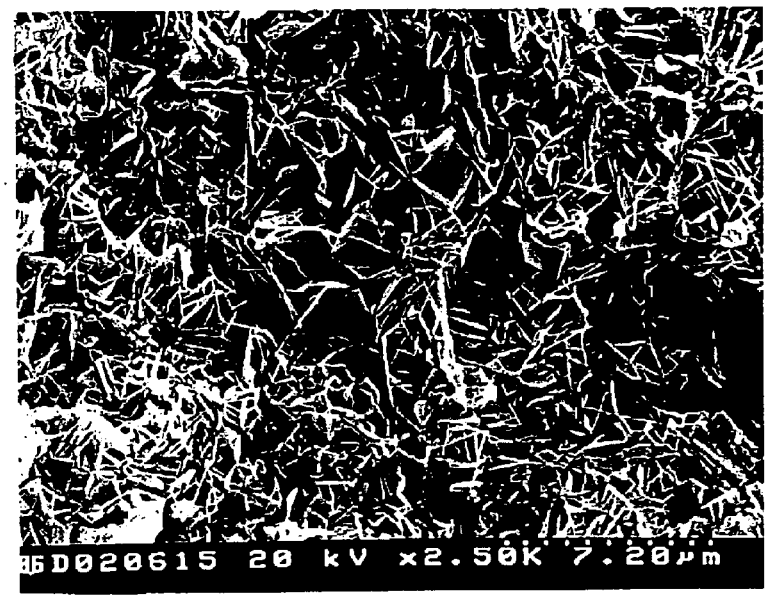
(B)
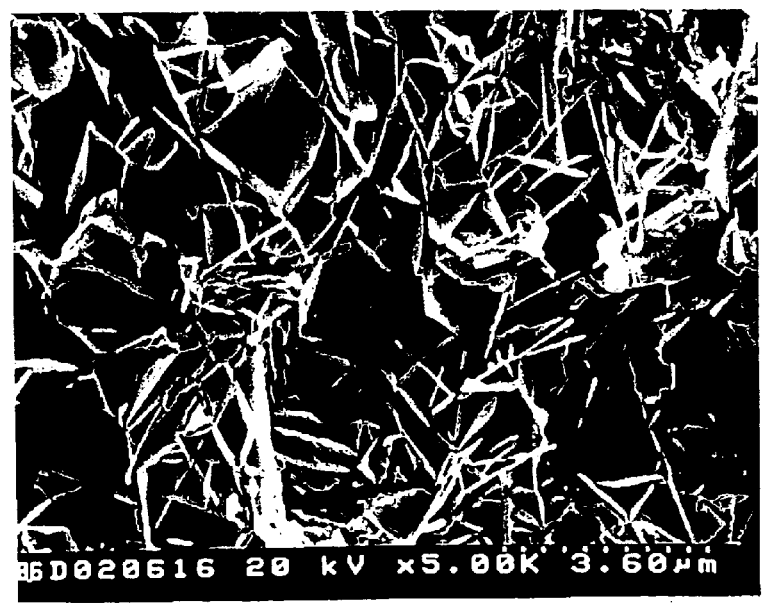

Fig. 5
(C)
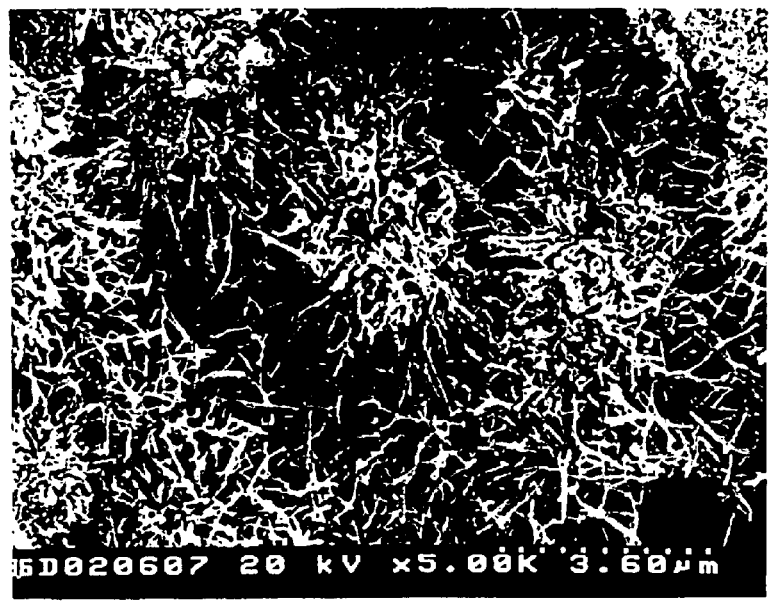
(D)
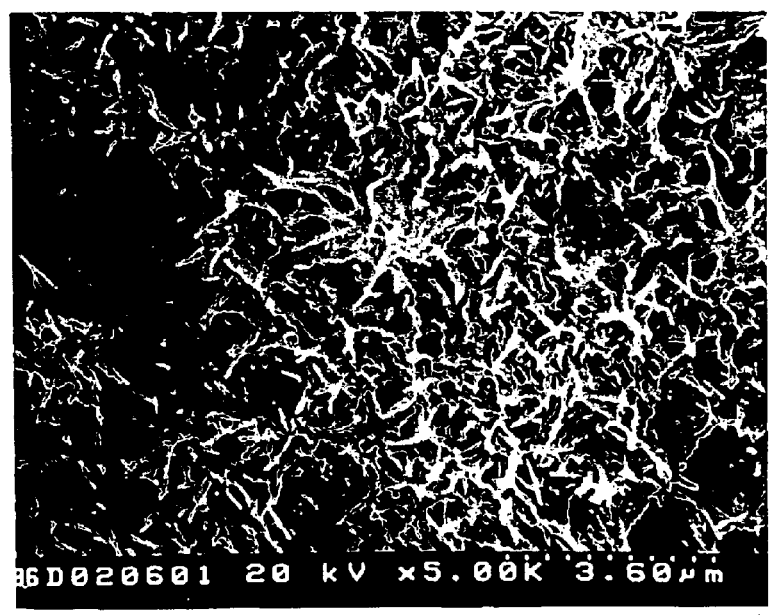

US 6,962,623 B2

HARDENED CALCIUM SILICATE HAVING HIGH STRENGTH

BACKGROUND OF THE INVENTION

1. Field of the Invention

The present invention relates to a cured form of calcium silicate and a reinforced calcium silicate composite structure, and also relates to methods for producing same. More particularly, the present invention is concerned with a cured form of calcium silicate, mainly comprising tobermorite and exhibiting a powder X-ray diffraction pattern in which the diffraction peak intensity Ib ascribed to the (220) plane of the tobermorite and the minimum diffraction intensity Ia observed in the diffraction angle range between the two diffraction peaks respectively ascribed to the (220) plane and (222) plane of the tobermorite satisfy the relationship Ib/Ia≧3.0; an apparent specific gravity of from 0.14 to 1.0; and a differential pore distribution curve obtained by mercury porosimetry in which the logarithmic width of the pore diameter distribution as measured at a height of ¼ of the height of the maximum peak of the differential pore distribution curve is from 0.40 to 1.20. The present invention is also concerned with a reinforced calcium silicate composite structure which comprises the cured form of calcium silicate and a reinforcing iron rod or a reinforcing wire netting. The present invention is further concerned with methods for producing the cured form of calcium silicate and the reinforced calcium silicate composite structure.

2. Prior Art

From the viewpoint of lowering the weight of a building, there has been a demand for incombustible and lightweight building materials in recent years.

As a building material meeting the demand, an autoclaved lightweight concrete (hereinafter, frequently referred to simply as an "ALC") and a fiber reinforced calcium silicate board (hereinafter, frequently referred to simply as a "calcium silicate board") have hitherto been used. An ALC is produced by a method which comprises: providing a cement material and a silica powder as main raw materials, and optionally, at least one material selected from the group consisting of a quick lime powder, gypsum and the like; mixing these materials together to obtain a mixture; adding water to the mixture to obtain a slurry; mixing the slurry with a foaming agent to thereby obtain a foamable slurry; and pouring the foamable slurry into a mold, followed by autoclaving. An ALC exhibits an apparent specific gravity of from approximately 0.5 to 0.6 and, hence, has a light weight. Further, an ALC contains a large amount of highly crystalline tobermorite ($5CaO.6SiO_2.5H_2O$) and, hence, has excellent long-term weatherability, excellent fire resistance and excellent durability. Therefore, an ALC has been widely used as a material for an external wall, a floor material and an internal wall of a building.

The modulus of elasticity of an ALC is in the range of from 1,700 to 2,500 $N/mm^2$. Also, the compressive strength of an ALC is in the range of from 4 to 5 $N/mm^2$. On the other hand, with respect to the flexural strength (which is an important property of a substance used as a plate-formed material), an ALC itself has a flexural strength as low as about 1 $N/mm^2$. Therefore, an ALC has been used in the form of a composite structure having a reinforcing iron rod arranged therein, as a material for parts of a building, such as a wall, a floor and a roof bed. However, the ratio in an ALC of the modulus of elasticity to the specific gravity (hereinafter, this ratio is frequently referred to simply as the "relative modulus of elasticity") is not satisfactorily high, so that, even when an ALC is used in the form of the above-mentioned composite structure as a panel, the ALC is likely to suffer a large deflection. Therefore, an ALC has a problem in that an ALC cannot be used in a part of a building which is carried by supporting members arranged at long intervals. Further, an ALC is defective in that, when used as a floor panel for a dwelling, an ALC exhibits poor insulation against noises generated due to the weight impact because the relative modulus of elasticity of an ALC is not satisfactory. Therefore, in such a case, it has been necessary to conduct a complicated operation, such as application of mortar onto the ALC panel for alleviating the defect of the ALC.

On the other hand, when a concrete material is used in the form of a reinforced structure having a reinforcing iron rod arranged therein, the design strength of the reinforced structure is determined taking into consideration the compressive strength of the concrete material. An ALC has a problem in that it has low compressive strength, so that the use of an ALC is inevitably limited. Especially, an ALC cannot be used in a high-rise building. Also, a conventional ALC is very low with respect to nail holding strength as compared to the nail holding strengths of timber and the like, thereby limiting the use of an ALC in a building, especially at the sites thereof, such as nail receiving sites of a base material for a roof or a roof board. The nail holding strength varies depending on the relationship between the modulus of elasticity and the compressive strength, such as the ratio of the compressive strength to the modulus of elasticity. In the case of an ALC, this ratio is low, so that when a nail is driven into an ALC, the ALC cannot stand a local distortion caused by the nailing, thereby causing a micro breakage around the nail driven into the ALC. Therefore, an ALC does not exhibit a satisfactory nail holding strength.

For improving the properties of an ALC, various methods have been attempted. Examples of such methods include a method in which the cell size distribution of an ALC is controlled, a method in which the ratio of closed cells in an ALC is increased, and a method in which the crystallinity of the tobermorite contained in an ALC is enhanced.

There has been a presumption that cells present in the surface and inside of an ALC act as cracks, so that the strength of the ALC is markedly lowered. Based on this presumption, research has been made. For example, Unexamined Japanese Patent Application Laid-Open Specification No. Hei 8-67577 discloses a method in which the number of cells in an ALC is decreased to thereby obtain an ALC having high specific gravity. However, this method has a problem in that, when it is intended to maintain the high compressive strength of an ALC in the method, it is necessary for the ALC to have an apparent specific gravity of at least about 1.1. That is, when the apparent specific gravity of the ALC is 1.0 or less, the compressive strength of the ALC is markedly lowered. In addition, the above-mentioned ALC produced by the method of the above-mentioned patent document exhibits a powder X-ray diffraction pattern in which, with respect to the diffraction peak intensity Ib ascribed to the (220) plane of the tobermorite and the minimum diffraction intensity Ia observed in the diffraction angle range between the two diffraction peaks respectively ascribed to the (220) plane and (222) plane of the tobermorite, the value of Ib/Ia is less than 3.0. This means that the tobermorite contained in the above-mentioned ALC has a low crystallinity as compared to a tobermorite which is generally contained in a conventional ALC and, hence, the ALC produced by the method of the above-mentioned patent document has unsatisfactory weatherability. Especially, this type of ALC is susceptible to a carbonation reaction (i.e., a neutralization reaction) in which the ALC is reacted with carbon dioxide contained in the air and is decomposed into calcium carbonate and noncrystalline silicate. That is, this type of ALC has unsatisfactory resistance to the neutralization reaction. Therefore, the above-mentioned ALC has a problem in that the use of the ALC as an external building material is inevitably limited.

Further, Unexamined Japanese Patent Application Laid-Open Specification No. Hei 7-101787 discloses a method for producing a cured, lightweight concrete material without using a foaming agent, wherein the cured material exhibits an apparent specific gravity of 0.7 or more and a compressive strength of more than 20 $N/mm^2$. However, when the apparent specific gravity of the cured material is 1.0 or less in this patent document, the cured material is composed mainly of a hydrate of calcium silicate having very low crystallinity and, hence, has unsatisfactory weatherability, especially very poor resistance to the above-mentioned neutralization reaction with carbon dioxide in the air. Therefore, the cured material has a problem in that the use of the cured material as an external building material is inevitably limited.

In recent years, with respect to structural materials (such as an external building material and a floor material) in which reinforcing iron rods are arranged, there has been a demand for extension of the length of the structural materials and extension of the interval at which the structural materials are carried by supporting members. From this viewpoint, the structural materials are required to have three times the strength of a conventional ALC. For example, WO99-42418 discloses a method for producing a lightweight concrete material without using a foaming agent. Examples of such lightweight concrete materials include a material exhibiting an apparent specific gravity of 0.52 and a compressive strength of 10 $N/mm^2$, and a material exhibiting an apparent specific gravity of 0.69 and a compressive strength of more than 19 $N/mm^2$. However, the lightweight concrete material disclosed in this patent document exhibits a differential pore distribution curve obtained by mercury porosimetry in which the logarithmic width of the pore diameter distribution as measured at a height of ¼ of the height of the maximum peak of the differential pore distribution curve (hereinafter, this logarithmic width is frequently referred to simply as "logarithmic width at ¼ height") is more than 1.20. When this type of lightweight concrete material is compared with a conventional ALC which has the same apparent specific gravity as that of the lightweight concrete material, the compressive strength of this type of lightweight concrete material is at most two times that of the conventional ALC. Further, there is a problem in that in this type of lightweight concrete material, the ratio of the compressive strength to the modulus of elasticity is unsatisfactory. Furthermore, there is still another problem in that this type of lightweight concrete material is produced without using a foaming agent and, hence, for producing this type of lightweight concrete material, a conventional apparatus employed for producing a conventional ALC cannot be used, so that the productivity of the lightweight concrete material is inevitably lowered. Moreover, it is impossible to obtain a lightweight concrete material having properties which are sufficiently improved to compensate for the lowering of the productivity.

On the other hand, a fiber reinforced calcium silicate board (calcium silicate board) is produced by a method comprising reacting a crystalline siliceous material and/or a non-crystalline siliceous material with a calcareous material, and curing the resultant reaction mixture together with a reinforcing fiber by autoclaving. A calcium silicate board is composed mainly of fiber, tobermorite, xonotlite, and a calcium silicate hydrate having a very low crystallinity (hereinafter, the calcium silicate hydrate is frequently referred to simply as "CSH"). The use of a calcium silicate board is roughly classified into a heat insulating material which exhibits an apparent specific gravity of 0.3 or less, a fireproof coating material which exhibits an apparent specific gravity of from 0.3 to 0.4, and a fireproof building material which exhibits an apparent specific gravity of from 0.6 to 1.2. A calcium silicate board having an apparent specific gravity of 0.4 or less is produced by a filter press method. On the other hand, a calcium silicate board having an apparent specific gravity of 0.6 or more is produced by a paper sheet making method.

A calcium silicate board contains fibers in an amount as large as 5 to 20% by weight, based on the weight of the calcium silicate board, so that the calcium silicate board has excellent flexural strength, excellent toughness and high processability. On the other hand, however, the calcium silicate board exhibits a high water absorption and a high shrinkage upon drying, so that the calcium silicate board exhibits poor dimensional precision. Further, the calcium silicate board is disadvantageous not only in that a large amount of dust is produced from a calcium silicate board, but also in that the calcium silicate board has a low surface hardness and, hence, is susceptible to flawing. Moreover, the calcium silicate board mainly comprising a CSH has poor weatherability and durability. Therefore, the use of this type calcium silicate board as an external building material is inevitably limited, and this type calcium silicate board is used mainly as an internal building material. Further, this type calcium silicate board is disadvantageous in that the calcium silicate board has a low compressive strength as compared to the flexural strength thereof, and has a very low modulus of elasticity, so that it is impossible to use, as a structural material, this type of calcium silicate board in the form of a structure having a reinforcing iron rod arranged therein.

For example, Unexamined Japanese Patent Application Laid-Open Specification No. Hei 3-237051 (corresponding to U.S. Pat. No. 5,330,573) discloses a shaped article of calcium silicate and a method for producing same, wherein the shaped article of calcium silicate comprises tobermorite, a CSH, quartz and a reinforcing fiber, and exhibits an apparent specific gravity of 0.55 and a flexural strength of 10 $N/mm^2$ or more. In the method of this patent document, a siliceous material and a calcareous material are mixed with water at a temperature of 50° C. or lower for the purpose of elevating the tobermorite content in the shaped article of calcium silicate. However, the shaped article of calcium silicate exhibits a powder X-ray diffraction pattern in which, with respect to the diffraction peak intensity Ib ascribed to the (220) plane of the tobermorite and the minimum diffraction intensity Ia observed in the diffraction angle range between the two diffraction peaks respectively ascribed to the (220) plane and (222) plane of the tobermorite, the value of Ib/Ia is less than 3.0. That is, the crystallinity of the tobermorite contained in the shaped article of calcium silicate is very low as compared to that of a tobermorite which is generally contained in a conventional ALC, so that the shaped article of calcium silicate has an unsatisfactory weatherability, especially an unsatisfactory resistance to the above-mentioned neutralization reaction with carbon dioxide in the air. Accordingly, the shaped article of calcium silicate of this patent document cannot be used as an external building material. Further, due to the low crystallinity of the tobermorite contained in the shaped article of calcium silicate, the modulus of elasticity of the shaped article of calcium silicate is very low, so that it is also impossible to use the shaped article of calcium silicate of this patent document as a structural material.

SUMMARY OF THE INVENTION

In this situation, the present inventors have made extensive and intensive studies with a view toward developing a cured form of calcium silicate having high strength and a reinforced calcium silicate composite structure having high strength, as well as methods for producing the cured form of calcium silicate and the reinforced calcium silicate composite structure. In their studies, the present inventors have paid attention to the crystallinity of the substances used for forming the cured form of calcium silicate and the microstructure of the cured form of calcium silicate.

As a result, it has unexpectedly been found that a cured form of calcium silicate which comprises a large amount of highly crystalline tobermorite and which has a novel microstructure (wherein microcells are uniformly distributed) can be produced by a method which comprises:

providing an aqueous slurry comprising water and solid materials including a siliceous material, a cementitious material, a calcareous material, at least one member selected from the group consisting of aluminum sulfate and a hydrate thereof, and a sulfate compound other than aluminum sulfate and a hydrate thereof, wherein 50% by weight or more of the siliceous material is a crystalline siliceous material;

pouring the aqueous slurry into a mold; and precuring the aqueous slurry, followed by autoclaving. The present inventors have also found that the use of aluminum sulfate and/or a hydrate thereof makes it possible to produce a cured form of calcium silicate without causing solid-liquid separation even when the ratio of the weight of water to the total weight of the solid materials is high, so that it becomes possible to produce a cured form of calcium silicate having a low apparent specific gravity wherein the amount of coarse cells in the cured form is controlled to a desirable, appropriate level. Moreover, it has been found that such a cured form of calcium silicate having a low apparent specific gravity can be produced without introducing coarse cells in the cured form by using a foaming agent.

Furthermore, it has also been found that by virtue of the above-mentioned novel microstructure, each of the strength, modulus of elasticity, and ratio (of compressive strength to modulus of elasticity) of the cured form of calcium silicate is several times as high as that of a conventional autoclaved lightweight concrete, even when the cured form of calcium silicate contains coarse cells which are formed by the use of a foaming agent. Moreover, it has also been found that when the cured form of calcium silicate is produced without using a foaming agent so that the produced cured form of calcium silicate does not contain coarse cells, each of the above-mentioned properties of the cured form of calcium silicate becomes 1.5 to 2 times that of a cured form containing coarse cells. Furthermore, it has been found that the cured form of calcium silicate exhibits not only a greatly improved resistance to chipping (it should be noted that a conventional ALC is defective in that it is likely to suffer chipping) and excellent nailing properties (such as high nail holding strength), but also high processability. In addition, it has also been found that the cured form of calcium silicate exhibits a high modulus of elasticity, a high compressive strength, and a high durability as compared to those of a conventional fiber reinforced calcium silicate board. Based on these findings, the present invention has been completed.

Accordingly, it is an object of the present invention to provide a cured form of calcium silicate which, while exhibiting an apparent specific gravity of from 0.14 to 1.0 (and, hence, having a light weight), exhibits excellent properties as a building material, such as a high compressive strength, a high modulus of elasticity, a high ratio of compressive strength to modulus of elasticity, and a high resistance to the above-mentioned neutralization reaction.

It is another object of the present invention to provide a cured form of calcium silicate which exhibits excellent dimensional stability, excellent resistance to chipping, and nailing properties as well as the above-mentioned excellent properties.

It is still another object of the present invention to provide a reinforced calcium silicate composite structure which, in addition to the above-mentioned excellent properties, exhibits an excellent strength which has been designed for use as a structural material.

It is still another object of the present invention to provide methods for producing the above-mentioned cured form of calcium silicate and the reinforced calcium silicate composite structure.

The foregoing and other objects, features and advantages of the present invention will be apparent from the following detailed description and appended claims taken in connection with the accompanying drawings.

BRIEF DESCRIPTION OF THE DRAWINGS

In the drawings.

Each of FIGS. 1(A) and 1(B) is a graph showing the powder X-ray diffraction pattern obtained with respect to a cured form of calcium silicate, wherein how to obtain the values of Ia and Ib is also indicated, and wherein "CPS" is an abbreviation for "counts per second".

Figure 3:
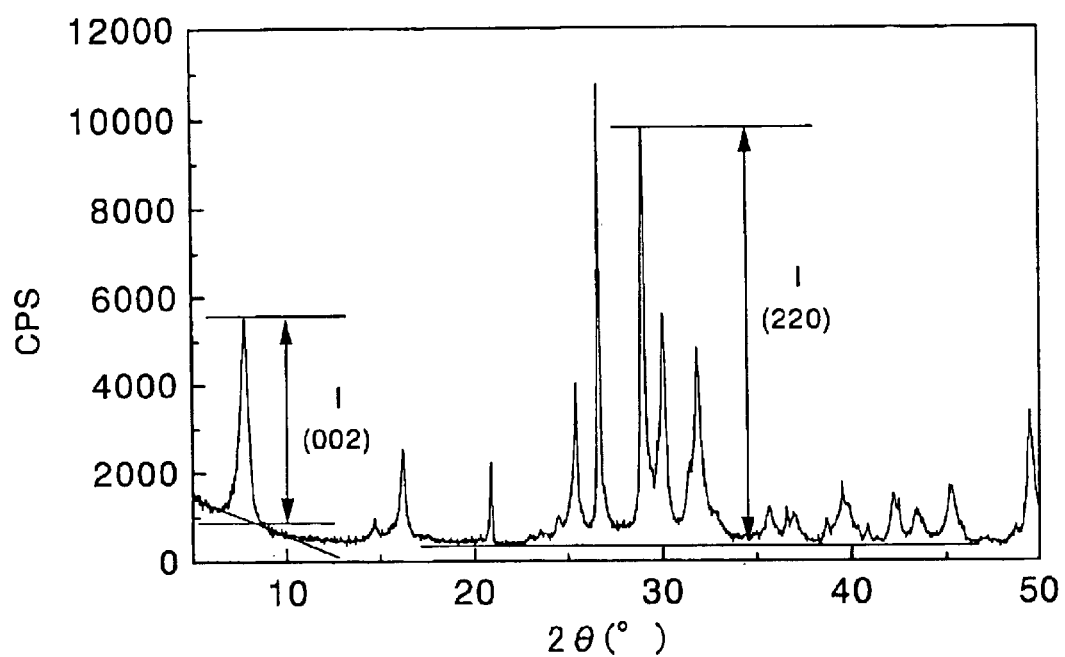
Figure 4:
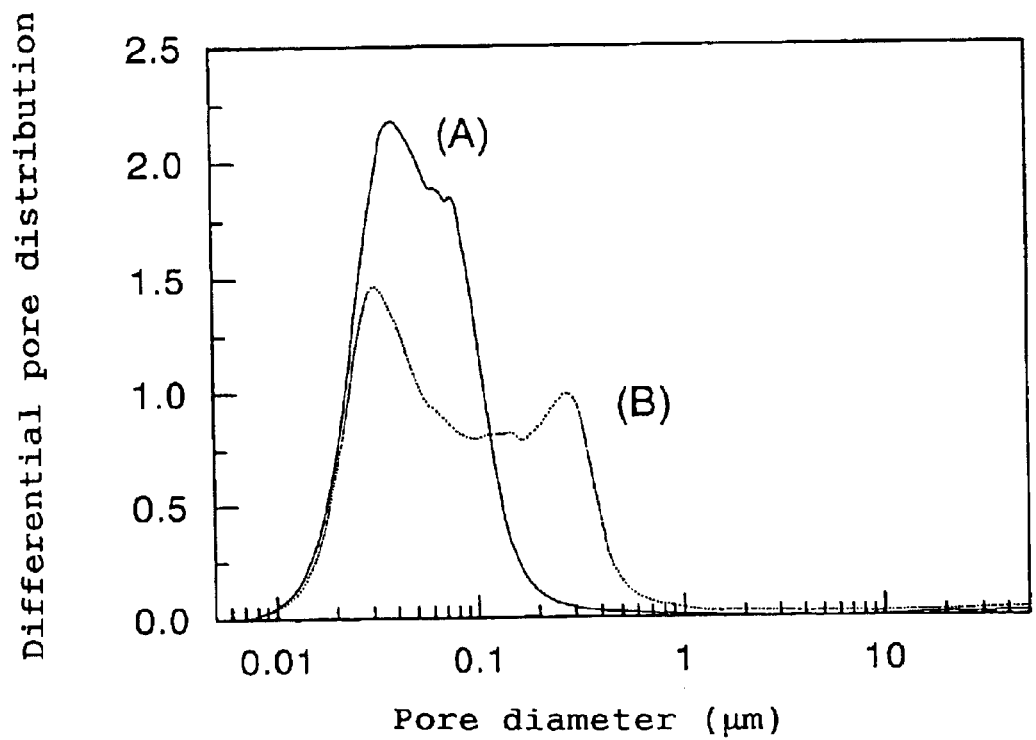
Figure 6:
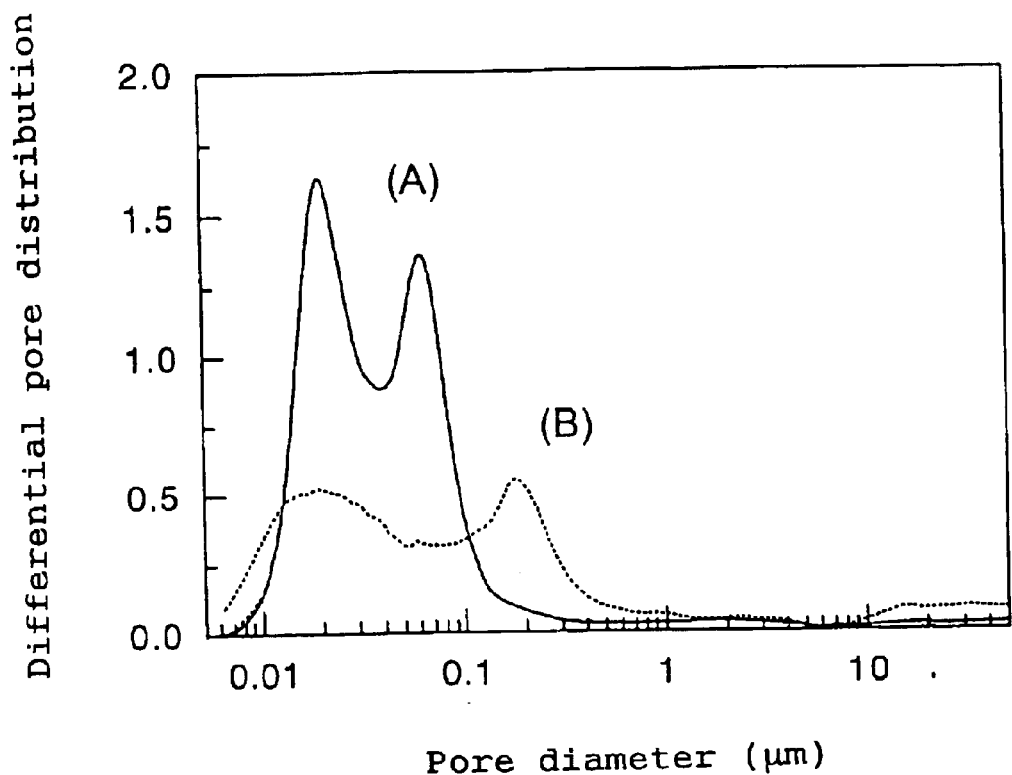
Figure 7:
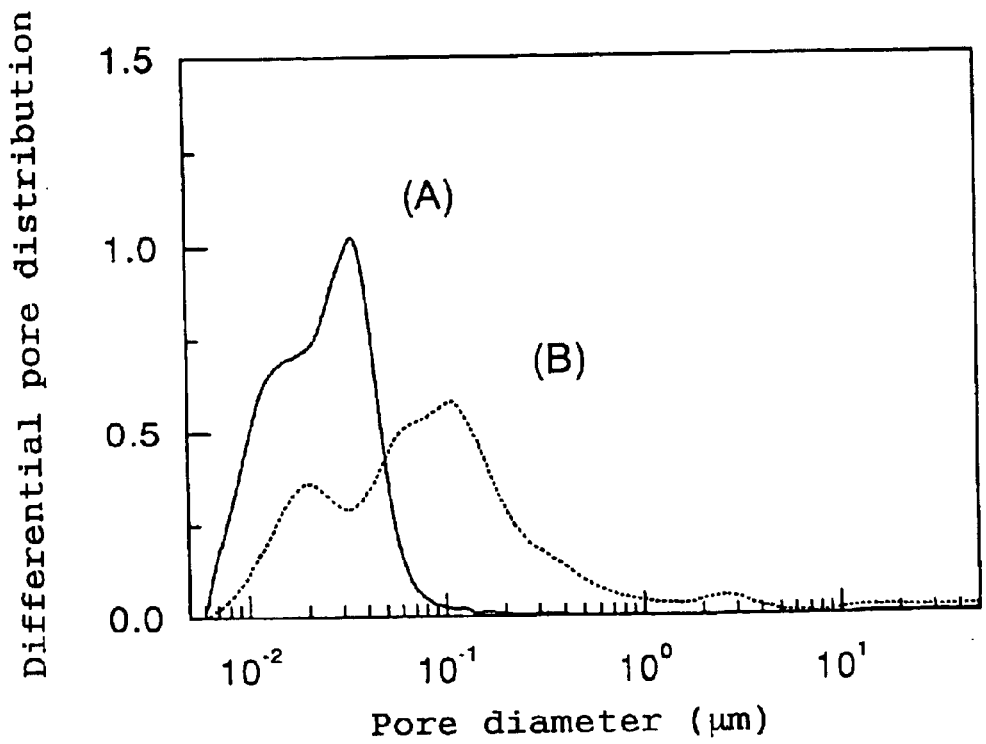
Figure 8:
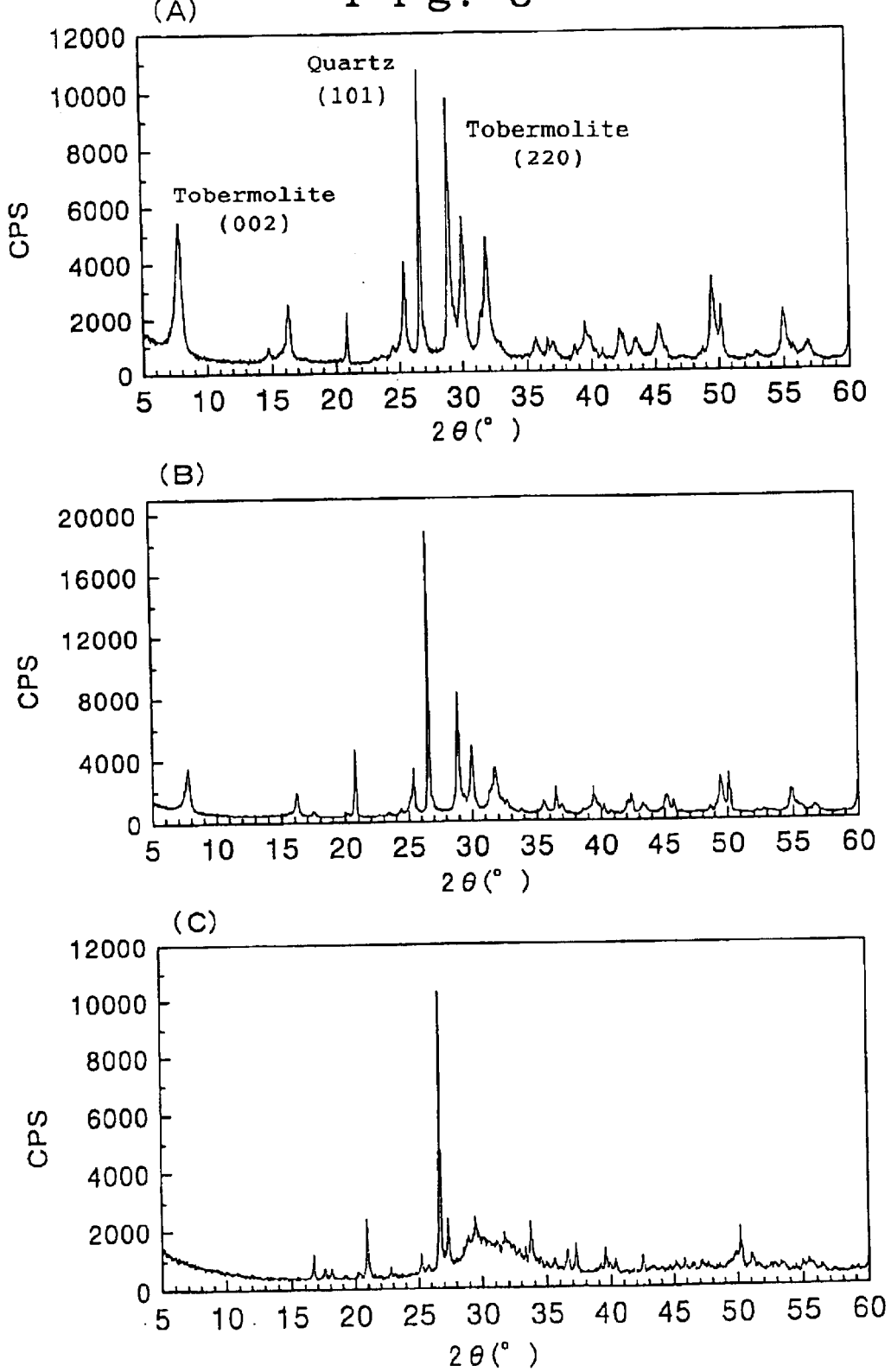
Figure 9:
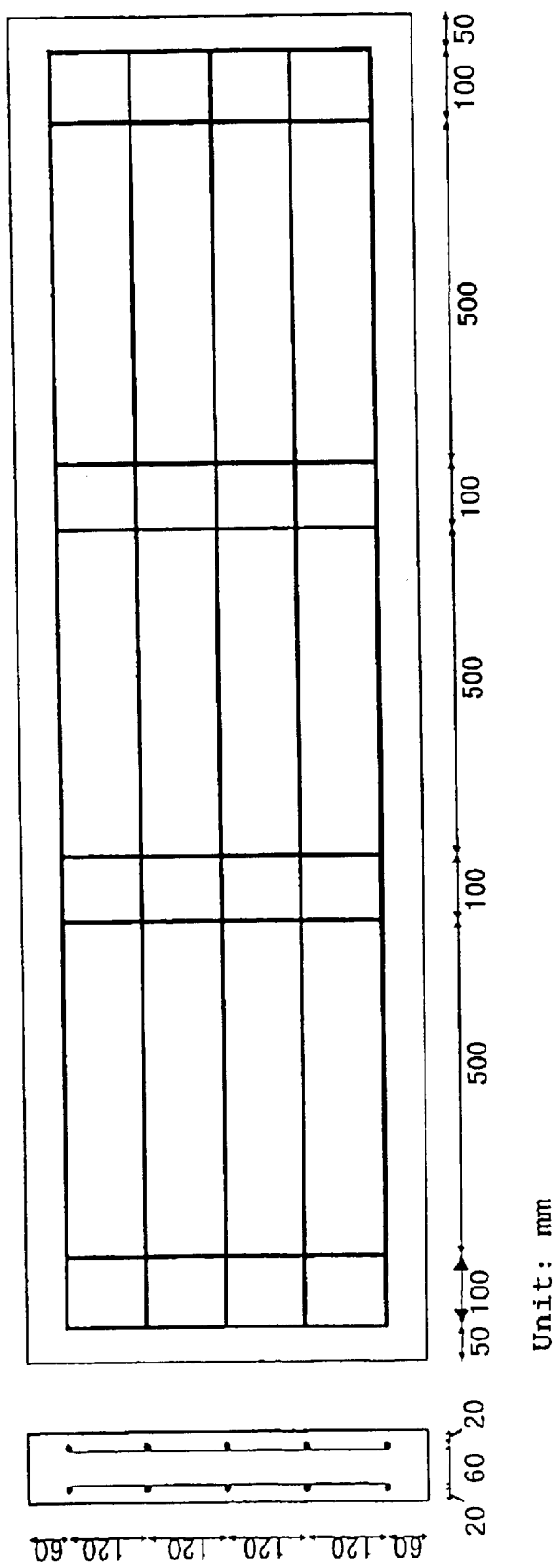

Each of FIGS. 2(A) to 2(C) is a graph showing the differential pore distribution curve obtained with respect to a cured form of calcium silicate by mercury porosimetry, wherein the method for determining the logarithmic width at ¼ height is also shown;

FIG. 2(A) is a graph showing one form of differential pore distribution curve which is obtained with respect to a cured form of calcium silicate produced in Example 1, wherein the method for determining the logarithmic width at ¼ height is shown;

FIG. 2(B) is a graph showing another form of differential pore distribution curve which is obtained with respect to the cured form of calcium silicate produced in Comparative Example 21, wherein the method for determining the logarithmic width at ¼ height is shown;

FIG. 2(C) is a graph showing still another form differential pore distribution curve, wherein the method for determining the logarithmic width at ¼ height is shown;

FIG. 3 is a graph showing the powder X-ray diffraction pattern obtained with respect to the cured form of calcium silicate produced in Example 1, wherein the methods for determining the values of I(002) and I(220) are indicated, and wherein "CPS" is an abbreviation for "counts per second";

FIG. 4 is a graph showing the differential pore distribution curves obtained with respect to cured forms of calcium silicate by mercury porosimetry, wherein solid line (A) shows a differential pore distribution curve obtained with respect to the cured form of calcium silicate produced in Example 2, and dotted line (B) shows a differential pore distribution curve obtained with respect to the cured form of calcium silicate produced in Comparative Example 2;

Each of FIGS. 5(A) to 5(D) is a scanning electron photomicrograph of a cured form of calcium silicate;

FIG. 5(A) is a representative example of scanning electron photomicrographs (at magnification of ×2,500) of the cured form of calcium silicate produced in Example 1, wherein the cured form is used for the evaluation of the ratio of the area which tobermorite occupies in a cross-section in which tobermorite is observed;

FIG. 5(B) is a scanning electron photomicrograph (at magnification of ×5,000) of the cured form of calcium silicate produced in Example 1;

FIG. 5(C) is a scanning electron photomicrograph (at magnification of ×5,000) of the cured form of calcium silicate produced in Comparative Example 27;

FIG. 5(D) is a scanning electron photomicrograph (at magnification of ×5,000) of the cured form of calcium silicate produced in Comparative Example 32;

FIG. 6 is a graph showing the differential pore distribution curves obtained with respect to cured forms of calcium silicate by mercury porosimetry, wherein solid line (A) shows the differential pore distribution curve obtained with respect to the cured form of calcium silicate produced in Example 20, and dotted line (B) shows the differential pore distribution curve with respect to the cured form of calcium silicate produced in Comparative Example 15;

FIG. 7 is a graph showing the differential pore distribution curves obtained with respect to cured forms of calcium silicate by mercury porosimetry, wherein solid line (A) shows the differential pore distribution curve obtained with respect to the cured form of calcium silicate produced in Example 18, and dotted line (B) shows the differential pore distribution curve obtained with respect to the cured form of calcium silicate produced in Comparative Example 27;

Each of FIGS. 8(A) to 8(C) is a graph showing the powder X-ray diffraction pattern obtained with respect to a cured form of calcium silicate, wherein "CPS" is an abbreviation for "counts per second";

FIG. 8(A) is a graph showing the powder X-ray diffraction pattern obtained with respect to the cured form of calcium silicate produced in Example 1;

FIG. 8(B) is a graph showing the powder X-ray diffraction pattern obtained with respect to the cured form of calcium silicate produced in Comparative Example 15;

FIG. 8(C) is a graph showing the powder X-ray diffraction pattern obtained with respect to the cured form of calcium silicate produced in Comparative Example 27; and FIG. 9 shows an explanatory diagrammatic view showing the arrangement of reinforcing iron rods in each of the reinforced calcium silicate composite structures produced in Example 39 and Comparative Example 42.

DETAILED DESCRIPTION OF THE INVENTION

According to the present invention, there is provided a cured form of calcium silicate, mainly comprising tobermorite and exhibiting: a powder X-ray diffraction pattern in which the diffraction peak intensity Ib ascribed to the (220) plane of the tobermorite and the minimum diffraction intensity Ia observed in the diffraction angle range between the two diffraction peaks respectively ascribed to the (220) plane and (222) plane of the tobermorite satisfy the relationship Ib/Ia≧3.0; an apparent specific gravity of from 0.14 to 1.0; and a differential pore distribution curve obtained by mercury porosimetry in which the logarithmic width of the pore diameter distribution as measured at a height of ¼ of the height of the maximum peak of the differential pore distribution curve is from 0.40 to 1.20.

For easy understanding of the present invention, the essential features and various preferred embodiments of the present invention are enumerated below.

1. A cured form of calcium silicate, mainly comprising tobermorite and exhibiting: a powder X-ray diffraction pattern in which the diffraction peak intensity Ib ascribed to the (220) plane of the tobermorite and the minimum diffraction intensity Ia observed in the diffraction angle range between the two diffraction peaks respectively ascribed to the (220) plane and (222) plane of the tobermorite satisfy the relationship Ib/Ia≧3.0; an apparent specific gravity of from 0.14 to 1.0; and a differential pore distribution curve obtained by mercury porosimetry in which the logarithmic width of the pore diameter distribution as measured at a height of ¼ of the height of the maximum peak of the differential pore distribution curve is from 0.40 to 1.20.

2. The cured form of calcium silicate according to item 1 above, which exhibits an apparent specific gravity of from 0.14 to 0.9.

3. The cured form of calcium silicate according to item 1 above, which exhibits an apparent specific gravity of from 0.2 to less than 0.7.

4. The cured form of calcium silicate according to any one of items 1 to 3 above, wherein the relationship Ib/Ia≧4.0 is satisfied in the powder X-ray diffraction pattern.

5. The cured form of calcium silicate according to any one of items 1 to 4 above, wherein the value of parameter a defined by formula (1) below is 7 or more and the value of parameter b defined by formula (2) below is 1.20 or more, $$a = (Y \times 10^{-3})/(D^{1.5}) \quad (1)$$

wherein Y and D respectively represent the modulus of elasticity (N/mm$^2$) of and the apparent specific gravity of the cured form of calcium silicate, $$b = S/(Y \times 10^{-3})^{1.5} \quad (2)$$

wherein S represents the compressive strength (N/mm$^2$) of the cured form of calcium silicate and Y is as defined above.

6. The cured form of calcium silicate according to item 5 above, wherein the value of parameter b defined by formula (2) is 1.30 or more.

7. The cured form of calcium silicate according to any one of items 1 to 6 above, wherein the number of cells having a cell size of greater than 200 μm in terms of the length of the long axis of the cross-section of each of the cells, in a 10 mm square on a cross-section of the cured form of calcium silicate, is larger than 20 and wherein the amount of the pore volume of pores having a pore diameter of 0.1 μm or less, as determined by mercury porosimetry, is:

from $V_1(D)$ to 98 vol % when the apparent specific gravity D of the cured form of calcium silicate is from 0.5 to 1.0, from $V_2(D)$ to 95 vol % when the apparent specific gravity D of the cured form of calcium silicate is from 0.3 to less than 0.5, or from $V_3(D)$ to 90 vol % when the apparent specific gravity D of calcium silicate is from 0.14 to less than 0.3, wherein each vol % is based on the total pore volume of the cured form of calcium silicate, and $V_1(D)$, $V_2(D)$ and $V_3(D)$ are, respectively, calculated by the following formulae (3), (4) and (5):

$$V_1(D)=50\times D+40 \quad (3),$$

$$V_2(D)=100\times D+15 \quad (4), \text{ and}$$

$$V_3(D)=200\times D-15 \quad (5).$$

8. The cured form of calcium silicate according to any one of items 1 to 6 above, wherein the number of cells having a cell size of greater than 200 μm in terms of the length of the long axis of the cross-section of each of the cells, in a 10 mm square on a cross-section of the cured form of calcium silicate, is 20 or less and wherein the amount of the pore volume of pores having a pore diameter of 0.1 μm or less, as determined by mercury porosimetry, is:

from 90 to 98 vol % when the apparent specific gravity D of the cured form of calcium silicate is from 0.8 to 1.0, from $V_4(D)$ to 97 vol % when the apparent specific gravity D of the cured form of calcium silicate is from 0.5 to less than 0.8, or from $V_5(D)$ to 92 vol % when the apparent specific gravity D of calcium silicate is from 0.14 to less than 0.5, wherein each vol % is based on the total pore volume of the cured form of calcium silicate, and $V_4(D)$ and $V_5(D)$ are, respectively, calculated by the following formulae (6) and (7):

$$V_4(D)=100\times D+10 \quad (6), \text{ and}$$

$$V_5(D)=150\times D-15 \quad (7).$$

9. The cured form of calcium silicate according to any one of items 1 to 8 above, which further comprises a coexisting highly crystalline substance and exhibits a powder X-ray diffraction pattern in which the diffraction peak intensity Ib ascribed to the (220) plane of the tobermorite and the maximum diffraction intensity Ic ascribed to the coexisting highly crystalline substance satisfy the relationship Ic/Ib≦3.0.

10. A calcium silicate composite structure comprising the cured form of calcium silicate of any one of items 1 to 9 above and a reinforcing iron rod or a reinforcing wire netting.

11. A method for producing a cured form of calcium silicate mainly comprising tobermorite, which comprises:

providing an aqueous slurry comprising water and solid materials including a siliceous material, a cementitious material, a calcareous material, at least one member selected from the group consisting of aluminum sulfate and a hydrate thereof, and a sulfate compound other than aluminum sulfate and a hydrate thereof, pouring the aqueous slurry into a mold, and precuring the aqueous slurry, followed by autoclaving, wherein 50% by weight or more of the siliceous material is a crystalline siliceous material, and wherein the at least one member selected from the group consisting of the aluminum sulfate and the hydrate thereof is contained in the aqueous slurry in an amount of from 0.09 to 10% by weight in terms of the amount of $Al_2O_3$, based on the total weight of the solid materials, and the sulfate compound other than aluminum sulfate and a hydrate thereof is contained in the aqueous slurry in an amount of from 0.15 to 15% by weight in terms of the amount of $SO_3$, based on the total weight of the solid materials, and wherein the amount of $SO_3$ is the sum of the amount of the $SO_3$ corresponding to the at least one member selected from the group consisting of the aluminum sulfate and the hydrate thereof and the amount of the $SO_3$ corresponding to the sulfate compound other than aluminum sulfate and a hydrate thereof.

12. The method according to item 11 above, wherein a precured form of aqueous slurry, which is obtained by the precuring of the aqueous slurry, is released from the mold and autoclaved.

13. The method according to item 11 or 12 above, wherein the aqueous slurry contains water in an amount of from 0.67 to 3.5 in terms of the ratio of the weight of water to the total weight of the solid materials and wherein the aqueous slurry is mixed with an aluminum powder as a foaming agent, wherein the aluminum powder is used in an amount of from 0.002 to 0.8% by weight in terms of the weight of solid aluminum, based on the total weight of the solid materials, to thereby obtain a foamable aqueous slurry, the foamable aqueous slurry being poured into the mold.

14. The method according to item 11 or 12 above, wherein the aqueous slurry contains water in an amount of from 0.67 to 3.5 in terms of the ratio of the weight of water to the total weight of the solid materials and wherein the aqueous slurry is mixed with a foam prepared by introducing air into a pre-foaming agent or an aqueous solution thereof, wherein the foam is used in an amount of from 5 to 300% by volume, based on the volume of the aqueous slurry, to thereby obtain a pre-foamed aqueous slurry, the pre-foamed aqueous slurry being poured into the mold.

15. The method according to item 11 or 12 above, wherein the aqueous slurry is a non-foamable aqueous slurry which contains water in an amount of from 0.77 to 5 in terms of the ratio of the weight of water to the total weight of the solid materials, the non-foamable aqueous slurry being poured into the mold.

16. The method according to any one of items 11 to 15 above, wherein the aqueous slurry comprising water and the solid materials including the siliceous material, the cementitious material, the calcareous material, the at least one member selected from the group consisting of the aluminum sulfate and the hydrate thereof, and the sulfate compound other than aluminum sulfate and a hydrate thereof is prepared by a process comprising the steps of:

(1) mixing together water, a siliceous material, a cementitious material, at least one member selected from the group consisting of aluminum sulfate and a hydrate thereof, a sulfate compound other than aluminum sulfate and a hydrate thereof, and a part of a calcareous material, to thereby obtain a mixture, and (2) adding the remainder of the calcareous material to the mixture obtained in step (1), followed by mixing.

17. The method according to any one of items 11 to 15 above, wherein the aqueous slurry comprising water and the solid materials including the siliceous material, the cementitious material, the calcareous material, the at least one member selected from the group consisting of the aluminum sulfate and the hydrate thereof, and the sulfate compound other than aluminum sulfate and a hydrate thereof is prepared by a process comprising the steps of:

(1) mixing together water, a siliceous material, a cementitious material, at least one member selected from the group consisting of aluminum sulfate and a hydrate thereof, and a part of a calcareous material, to thereby obtain a mixture, and (2) adding a sulfate compound other than aluminum sulfate and a hydrate thereof and the remainder of the calcareous material to the mixture obtained in step (1), followed by mixing.

18. The method according to any one of items 11 to 17 above, wherein the sulfate compound other than aluminum sulfate and a hydrate thereof is gypsum dihydrate.

19. The method according to any one of items 11 to 18 above, wherein the crystalline siliceous material is a finely pulverized form of massive siliceous material, wherein the finely pulverized form has a specific surface area of from 5,000 to 300,000 $cm^2/g$ as measured by the Blaine permeation method.

20. The method according to any one of items 11 to 19 above, wherein the mold has a reinforcing iron rod or a reinforcing wire netting arranged therein, to thereby enable production of a reinforced calcium silicate composite structure.

In the present invention, the expression "cured form of calcium silicate" is a generic term for cured forms usable as building materials, which are produced by curing a composition containing a calcium silicate compound. With respect to the shape of the cured form of calcium silicate, there is no particular limitation. Representative examples of cured forms of calcium silicate include concrete, cured mortar, autoclaved lightweight concrete (ALC), fiber reinforced calcium silicate board and calcium silicate board. The reinforced calcium silicate composite structure of the present invention means a structure usable as a building material, which comprises the cured form of calcium silicate of the present invention and a reinforcing iron rod or a reinforcing wire netting.

One of the characteristic features of the cured form of calcium silicate of the present invention is that the cured form of calcium silicate mainly comprises tobermorite ($5CaO.6SiO_2.5H_2O$). Tobermorite is a typical crystalline calcium silicate hydrate which is generally contained in the tissue of an ALC and the like. Tobermorite is present in the form of board-shaped or strip-shaped particles.

In the present invention, whether or not a cured form of calcium silicate mainly comprises tobermorite is judged by observation of a cross-section of the cured form of calcium silicate by means of a scanning electron microscope and analysis of the cured form of calcium silicate by powder X-ray diffractometry. Specifically, the judgment is made as follows.

Firstly, in the powder X-ray diffraction pattern of the cured form of calcium silicate, when there is no diffraction peak having an intensity higher than the intensity of the diffraction peak ascribed to the (220) plane of the tobermorite (i.e., higher than the maximum intensity among the intensities of the diffraction peaks ascribed to the planes of the tobermorite), it is judged that the cured form of calcium silicate mainly comprises tobermorite. It should, however, be noted that, when the cured form of calcium silicate further comprises at least one coexisting highly crystalline substance selected from the group consisting of crystalline silica, calcium carbonate and gypsum, it is possible that the intensity of the diffraction peak ascribed to the coexisting substance (wherein, when the cured form of calcium silicate contains two or more of the coexisting substances, the intensity of the diffraction peak ascribed to the coexisting substance means the maximum intensity among the intensities of the diffraction peaks ascribed to the coexisting substances) exceeds the intensity of the diffraction peak ascribed to the (220) plane of the tobermorite, even if the cured form of calcium silicate mainly comprises tobermorite. Therefore, secondly, a cross-section of the cured form is observed by means of a scanning electron microscope at magnification of ×2,500 as follows. 20 portions (each having a size of 35.4 $\mu$m×18.9 $\mu$m) in the cross-section are randomly chosen, wherein each of 20 portions is in the matrix of the cured form (i.e., except coarse cell portions formed by using a foaming agent). Then, the 20 portions are observed by means of a scanning electron microscope at magnification of ×2,500 and, with respect to each of the 20 portions, the ratio of the area of the portion which the board-shaped and strip-shaped particles of tobermorite occupy to the area of the portion having a size of 35.4 $\mu$m×18.9 $\mu$m was obtained, followed by calculation of the average of the thus obtained 20 area ratios. When the average of the 20 area ratios is 50% or more, it is judged that the cured form mainly comprises tobermorite (see FIG. 5(A)). It is preferred that the average of the 20 area ratios is 60% or more, more advantageously 80% or more. The expression "coarse cell portion" means a coarse cell itself plus a portion in the vicinity thereof within a distance of about 5 $\mu$m from the coarse cell. Since a coarse cell portion has a void space, tobermorite is likely to be formed in a coarse cell portion. Even in the case where the cured form of calcium silicate comprises the above-mentioned at least one coexisting highly crystalline substance as well as tobermorite and where the above-mentioned average of the 20 area ratios is 50% or more, it is preferred that the cured form of calcium silicate exhibits a powder X-ray diffraction pattern in which the diffraction peak intensity Ib ascribed to the (220) plane of the tobermorite and the diffraction intensity Ic ascribed to the coexisting highly crystalline substance satisfy the relationship $Ic/Ib \leq 3.0$, more advantageously $Ic/Ib \leq 2.0$, wherein, when the cured form of calcium silicate contains two or more of the coexisting substances, the intensity Ic means the maximum intensity among the intensities of the diffraction peaks ascribed to the coexisting substances. In the above-mentioned observation by means of a scanning electron microscope at magnification of ×2,500, the expression "board-shaped or strip-shaped particle" of tobermorite means a particle having the following characteristics. The tobermorite particle is further observed by means of the scanning electron microscope at magnification of ×5,000. The distance of two surfaces of the particle which are substantially parallel to each other is equal to the minimum length of the particle (hereinafter, the minimum length of the particle is frequently referred to simply as the "thickness" of the particle). When the maximum length of the particle is 5 times or more the minimum length of the particle, the particle is defined as a board-shaped or strip-shaped particle of tobermorite (see FIG. 5(B)). Needless to say, each of the maximum length and thickness of the particle means a two-dimensionally projected length. With respect to the size of the tobermorite particle, there is no particular limitation. However, it is preferred that the maximum length of the tobermorite particle is from several micrometers to 10 $\mu$m.

In general, tobermorite coexists with a low crystalline calcium silicate hydrate (CSH). It is known that a CSH takes various particle forms. Since CSH is generally present in a particulate form, such as a fiber, a granule or a mass, a CSH can be distinguished from tobermorite particles by observation by means of electron microscope (see FIGS. 5(C) and 5(D)). The cured form of calcium silicate of the present invention may contain such a CSH so long as the skeleton of the tobermorite is not broken. However, since the presence of a CSH in the cured form of calcium silicate deteriorates the properties (such as strength, weatherability and durability) of the cured form which are required as a building material, it is preferred to lower the CSH content in the cured form of calcium silicate as much as possible. Further, the cured form of calcium silicate of the present invention may also contain a small amount of a lightweight aggregate, a reinforcing fiber, a resin or the like so long as the skeleton of the tobermorite is not broken.

The cured form of calcium silicate of the present invention exhibits a powder X-ray diffraction pattern in which the diffraction peak intensity Ib ascribed to the (220) plane of the tobermorite and the minimum diffraction intensity Ia observed in the diffraction angle range between the two diffraction peaks respectively ascribed to the (220) plane and (222) plane of the tobermorite satisfy the relationship Ib/Ia≧3.0. As mentioned above, when a CSH is contained in a large amount in the cured form of calcium silicate, various properties of the cured form as a building material are lowered. In the present invention, the expression "powder X-ray diffraction pattern" means a powder X-ray diffraction pattern obtained by using Cu Kα line as X-ray. When a CSH is contained in a large amount in the cured form of calcium silicate, the dimensional stability of the cured form of calcium silicate is lowered after drying and moistening are repeated. Further, when the cured form of calcium silicate is allowed to stand in the air for a long period of time, the CSH is susceptible to a carbonation reaction with carbon dioxide in the air, so that is likely to be decomposed into calcium carbonate and amorphous silicate. The carbonization reaction is accompanied by a volume shrinkage of the cured form of calcium silicate, so that the cured form of calcium silicate suffers cracking and tissue deterioration. When the cured form of calcium silicate has an apparent specific gravity of 1.0 or less, the cured form of calcium silicate is defective in that the cured form of calcium silicate has air-permeability to a certain extent, so that the carbonation reaction is likely to occur even in the inside of the body of the cured form of calcium silicate. This defect is fatal when the cured form of calcium silicate is used as an external building material. In the powder X-ray diffraction pattern of a cured form of calcium silicate in which a CSH coexists with tobermorite, a broad diffraction peak ascribed to the CSH is observed in the diffraction angle range between the two diffraction peaks respectively ascribed to the (220) plane and (222) plane of the tobermorite. This diffraction peak ascribed to the CSH generally appears at an angle in the range of from about 29.1° to about 29.4° (2θ). When the amount of the CSH is smaller than that of the tobermorite, the diffraction peak ascribed to the CSH is merged into a diffraction peak ascribed to the tobermorite, so that it is generally impossible to measure the intensity of the diffraction peak ascribed to the CSH.

On the other hand, however, when a large amount of CSH is contained in the cured form of calcium silicate, the intensities of the diffraction in the diffraction angle range between the two diffraction peaks respectively ascribed to the (220) plane and (222) plane of the tobermorite are higher than that of the background, so that whether or not a CSH is contained in the cured form of calcium silicate can be judged. When the cured form of calcium silicate contains no CSH and is composed mainly of a highly crystalline tobermorite, the minimum diffraction intensity in the above-described angle range is equal to the intensity of the background.

Further, even in the case where no CSH is contained in the cured form of calcium silicate, the ratio Ib/Ia becomes small when the crystallinity of the tobermorite is low. The reason for this is that the diffraction peaks respectively ascribed to the (220) plane and (222) plane of the tobermorite are positioned closely to each other, so that the two peaks overlap at the bases thereof. When the crystallinity of the tobermorite is low, the strength and weatherability of the cured form of calcium silicate are lowered.

Therefore, when no CSH is contained in the cured form of calcium silicate, the larger the ratio Ib/Ia (i.e., the ratio of the diffraction peak intensity Ib ascribed to the (220) plane of the tobermorite to the minimum diffraction intensity Ia observed in the diffraction angle range between the two diffraction peaks respectively ascribed to the (220) plane and (222) plane of the tobermorite), the higher the crystallinity of the tobermorite. When a CSH is contained in the cured form of calcium silicate, the larger the ratio Ib/Ia, the higher the crystallinity of the tobermorite, and the smaller the CSH content in the cured form of calcium silicate.

Figure 1:
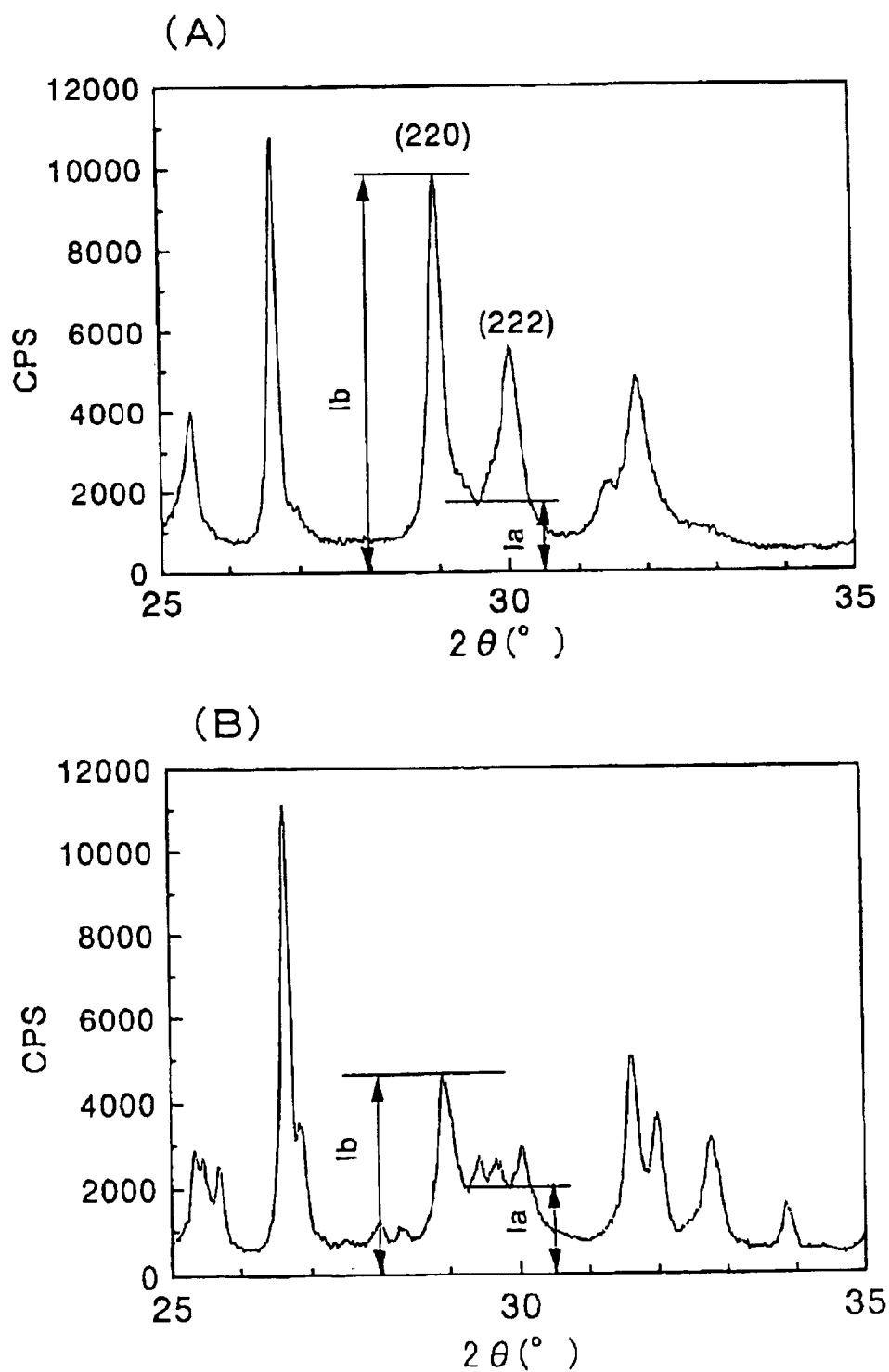
FIG. 1(A) is a graph showing the powder X-ray diffraction pattern obtained with respect to the cured form of calcium silicate produced in Example 1, wherein the values of Ia and Ib are also indicated.
FIG. 1(B) is a graph showing the powder X-ray diffraction pattern obtained with respect to the cured form of calcium silicate produced in Comparative Example 32, wherein the values of Ia and Ib are also indicated.

In the present invention, the ratio Ib/Ia is always required to be 3 or more, preferably 4 or more, more preferably 5 or more. In the case where the cured form of calcium silicate exhibits an apparent specific gravity of 0.5 or more, the compressive strength and modulus of elasticity of the cured form become advantageously high when the ratio Ib/Ia is 5 or more. In many cases, a commercially available autoclaved lightweight concrete is produced using a highly crystalline silica material, so that the crystallinity of the tobermorite contained in the ALC is high, and, hence, the ratio Ib/Ia is high. Despite that the ratio Ib/Ia is high, the autoclaved lightweight concrete exhibits low strength. The reason for this is as follows. A large amount of the silica material remains unreacted in the ALC and, hence, tobermorite does not become a main component of the ALC. Further, as described below, the pores which are present in the matrix of the ALC has a broad pore diameter distribution. Therefore, the ALC exhibits low strength. Each of the intensities Ia and Ib includes the intensity of the background, whereas the below-described I(220) does not include the intensity of the background. Examples of values of Ia and Ib are indicated in FIG. 1. Ia is defined as the minimum diffraction intensity observed in the diffraction angle range between the two diffraction peaks respectively ascribed to the (220) plane and (222) plane of the tobermorite, wherein the intensity includes that of the background. Ib is defined as the diffraction peak intensity ascribed to the (220) plane of the tobermorite, wherein the intensity includes that of the background.

The apparent specific gravity of the cured form of calcium silicate of the present invention is from 0.14 to 1.0, preferably from 0.14 to 0.9, more preferably from 0.2 or higher to less than 0.7. In the present invention, the expression "apparent specific gravity" means the apparent specific gravity as measured after drying the cured form at 105° C. for 24 hours, i.e., the absolute dry specific gravity. When the apparent specific gravity is lower than 1.4, a high strength aimed at in the present invention cannot be achieved. On the other hand, when the apparent specific gravity is higher than 1.0, the cured form of calcium silicate becomes too heavy, so that the cured form of calcium silicate is not suitable for use as a lightweight building material.

The cured form of calcium silicate of the present invention exhibits a differential pore distribution curve obtained by mercury porosimetry in which the logarithmic width of the pore diameter distribution as measured at a height of ¼ of the height of the maximum peak of the differential pore distribution curve is from 0.40 to 1.20, preferably from 0.40 to 1.10, more preferably from 0.40 to 1.00.

The mercury porosimetry means a method in which an external pressure is applied to force mercury into the pores in a cured form of calcium silicate, the amount of mercury forced into the pores is recorded in terms of a function of the pressure applied, and, based on this record, the pore diameter distribution of the cured form is obtained. In the calculation for obtaining the pore diameter distribution of the cured form, it is assumed that pores have a cylindrical shape. In the mercury porosimetry, the measurement can be conducted with respect to the pores having a pore diameter in the range of from 6 nm to 360 $\mu$m. These pore diameter values do not indicate the true pore diameters of the pores, but can be used as a yardstick for the diameters of the pores which are present in the cured form. The mercury porosimetry is especially useful for analyzing the pore structure of the cured form of calcium silicate of the present invention. A cumulative pore volume with respect to the pore diameters measured is obtained by the mercury porosimetry. The cumulative pore distribution curve relative to the pore diameters measured is differentiated to obtain a differential pore distribution curve. In general, the differential pore distribution is present in the pore diameter range of from 6 nm to 50 $\mu$m in the case of a cured form of calcium silicate having an apparent specific gravity as low as 0.14 to 1.4.

Figure 2:
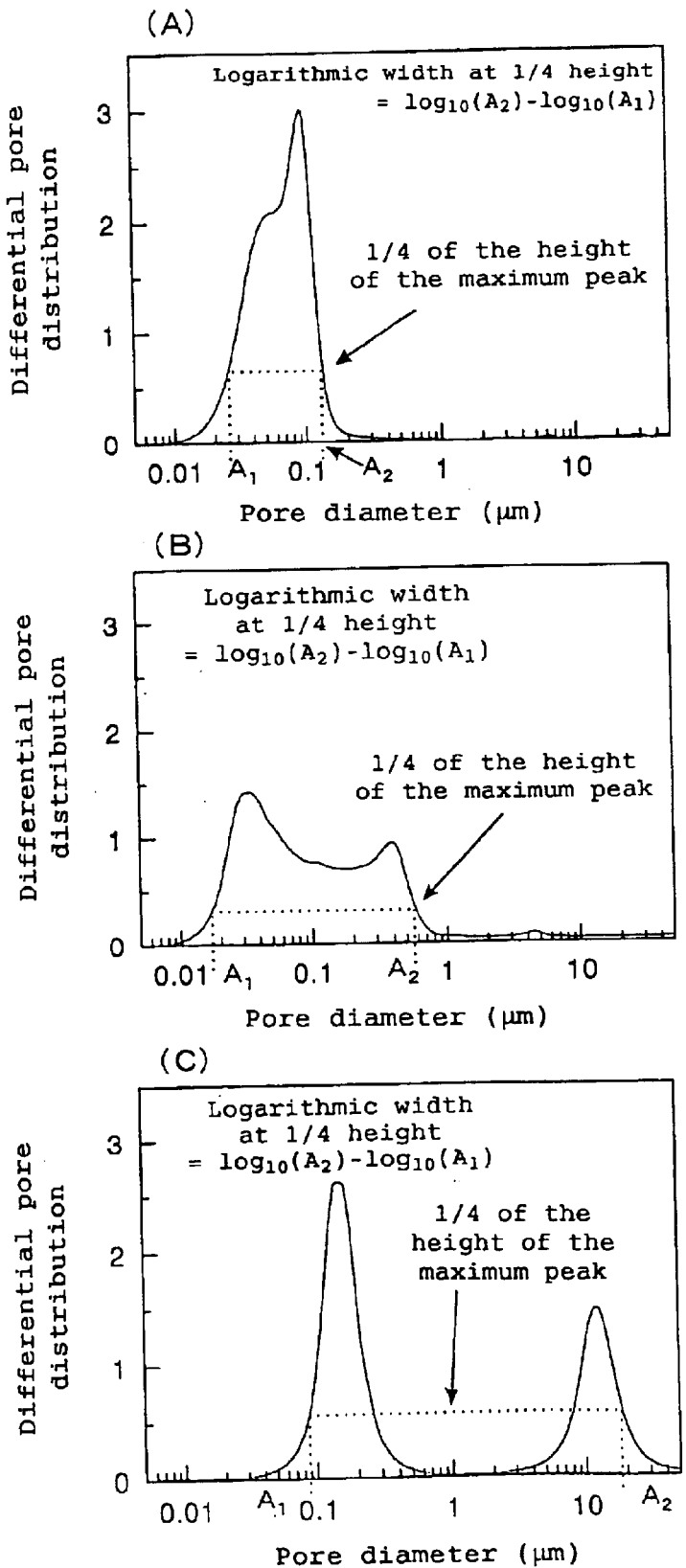

The logarithmic width of the pore diameter distribution (of a cured form of calcium silicate) at a height of ¼ of the height of the maximum peak of the differential pore distribution curve (as mentioned above, this logarithmic width is frequently referred to simply as the "logarithmic width at ¼ height") is a yardstick for the pore diameter distribution of the cured form. The logarithmic width at ¼ height means the width of the pore diameter distribution at a height of ¼ of the height of the maximum peak of the differential pore distribution curve, in terms of a logarithmic width. The method for determining the logarithmic width at ¼ height is shown in FIG. 2. Specifically, the logarithmic width at ¼ height is defined as follows. In the differential pore distribution curve which is obtained by differentiating the cumulative pore distribution curve, when there are two pore diameters which correspond to the ¼ height of the height of the maximum peak (such cases are shown in FIGS. 2(A) and 2(B)), the larger pore diameter is defined as $A_2$, and the smaller pore diameter is defined as $A_1$. The logarithmic width at ¼ height is defined as the difference between the common logarithm of $A_2$ and the common logarithm of $A_1$. When there are more than two pore diameters which correspond to the ¼ height of the height of the maximum peak (such a case is shown in FIG. 2(C)), the largest pore diameter is defined as $A_2$, and the smallest pore diameter is defined as $A_1$. The logarithmic width at ¼ height is defined as the difference between the common logarithm of $A_2$ and the common logarithm of $A_1$. When the logarithmic width at ¼ height is larger than 1.20, the pore diameter distribution in the pore diameter range of 50 $\mu$m has a broad distribution. This means that the cured form of calcium silicate has a poor uniformity with respect to the diameters of the pores present in the portion forming the skeleton of the cured form which portion sustains stress (hereinafter, the skeletal portion is frequently referred to as the "matrix" of the cured form). In such a case, stress is likely to be concentrated on a small portion of the cured form of calcium silicate, so that the cured form of calcium silicate is lowered with respect to the modulus of elasticity, the compressive strength and the ratio of the compressive strength to the modulus of elasticity. The lower the logarithmic width at ¼ height, the better properties (such as strength) of the cured form. However, even in the method of the present invention, it is difficult to obtain a cured form of calcium silicate in which the logarithmic width at ¼ height is less than 0.40. In a conventional building material, such as an autoclaved lightweight concrete, the pores present in the portion other than the above-mentioned coarse cell portions (which are introduced by using a foaming agent), i.e., the pores present in the matrix forming the skeleton of the cured form, have a broad distribution. The present inventors presume that, in the conventional building material, the presence of not only the coarse cell portions but also the above-mentioned pores having a broad pore diameter distribution makes it difficult to improve properties (such as strength and modulus of elasticity) of the conventional building material.

In general, a CSH is present in a particulate form, such as a fiber, a granule or a mass, and the CSH particle is fine as compared to crystalline tobermorite. Further, a CSH comprises a large amount of pores having a pore diameter of 0.1 $\mu$m or less (such a pore is referred to as a "gel pore"). Therefore, even when the cured form of calcium silicate contains a large amount of a CSH, it is possible that the logarithmic width at ¼ height becomes very small. However, even in a cured form of calcium silicate in which the logarithmic width at ¼ height is small, when a large amount of a CSH is contained in the cured form of calcium silicate or when the crystallinity of the tobermorite in the cured form of calcium silicate is low, the cured form of calcium silicate cannot exhibit high modulus of elasticity, high compressive strength or high ratio of the compressive strength to the modulus of elasticity.

The cured form of calcium silicate of the present invention has characteristics that the cured form of calcium silicate mainly comprises tobermorite; that the tobermorite in the cured form of calcium silicate has a high crystallinity, that is, the above-described ratio Ib/Ia is 3.0 or more; and that the cured form of calcium silicate has a matrix composed of board-shaped or strip-shaped tobermorite particles, wherein the diameters of the pores present between the tobermorite particles have a uniform distribution, that is, the pores in the matrix have a uniform distribution. By virtue of these characteristics, each of the compressive strength, modulus of elasticity, and ratio (of compressive strength to modulus of elasticity) of the cured form of calcium silicate is 1.7 to 2.2 times as high as that of a conventional autoclaved lightweight concrete even when the cured form of calcium silicate contains coarse cells which are formed by the use of a foaming agent. Also, when the cured form of calcium silicate does not contain coarse cells, each of the above-mentioned properties of the cured form of calcium silicate is 1.5 to 2 times that of a cured form containing coarse cells.

The novel microstructure of the cured form of calcium silicate of the present invention is realized by a matrix which mainly comprises tobermorite. By virtue of this matrix, each of the compressive strength, modulus of elasticity, and ratio (of compressive strength to modulus of elasticity) of the cured form of calcium silicate is high as compared to that of a conventional autoclaved lightweight concrete. The above-mentioned facts that each of the above-mentioned properties of the cured form of calcium silicate is 1.7 to 2.2 times that of a conventional autoclaved lightweight concrete even when the cured form of calcium silicate contains coarse cells which are formed by the use of a foaming agent; and that, when the cured form of calcium silicate does not contain coarse cells, each of the above-mentioned properties of the cured form of calcium silicate is 1.5 to 2 times as high as that of a cured form containing coarse cells, have important meanings as explained below.

With respect to a conventional ALC, high productivity is achieved by the presence of coarse cells in the ALC. By the method of the present invention, a novel building material (i.e., the cured form of calcium silicate) in which each of the above-mentioned properties is several times that of a conventional building material (such as an ALC) can be produced with an advantage in that the cured form of calcium silicate is produced in high productivity by the use of a conventional apparatus generally used in the art, or the combination of the apparatus with a minimum additional apparatus. Further, when the cured form of calcium silicate does not contain coarse cells which are formed by the use of a foaming agent, the cured form of calcium silicate is advantageous in that the properties of the cured form of calcium silicate are further greatly improved, so that the use of the cured form of calcium silicate is not limited even when the cured form of calcium silicate is used in the form of a composite structure having a reinforcing iron rod arranged therein, which solves the problem accompanied by the prior art. Specifically, the cured form of calcium silicate can be used not only in a part of a building which is carried by supporting members arranged at long intervals, but also in a high-rise building. Such uses are quite unexpected, and the effect of the uses is sufficient to compensate for the lowering of the productivity.

When the cured form of calcium silicate of the present invention contains a substantial amount of cells having a cell size of greater than 200 µm, the amount of the pore volume of pores having a pore diameter of 0.1 µm or less, as determined by mercury porosimetry, is:

preferably from $V_1(D)$ to 98 vol %, more preferably from $V_{12}(D)$ to 98 vol %, when the apparent specific gravity D of the cured form of calcium silicate is from 0.5 to 1.0;

preferably from $V_2(D)$ to 95 vol %, more preferably from $V_{22}(D)$ to 95 vol %, when the apparent specific gravity D of the cured form of calcium silicate is from 0.3 to less than 0.5; or preferably from $V_3(D)$ to 95 vol %, more preferably from $V_{32}(D)$ to 95 vol %, when the apparent specific gravity D of the cured form of calcium silicate is from 0.14 to less than 0.3;

wherein each vol % is based on the total pore volume of the cured form of calcium silicate, and $V_1(D)$, $V_2(D)$, $V_3(D)$, $V_{12}(D)$, $V_{22}(D)$ and $V_{32}(D)$ are, respectively, calculated by the following formulae (3), (4), (5), (3'), (4') and (5'):

$$V_1(D)=50 \times D+40 \qquad (3),$$

$$V_2(D)=100 \times D+15 \qquad (4),$$

$$V_3(D)=200 \times D-15 \qquad (5),$$

$$V_{12}(D)=50 \times D+45 \qquad (3'),$$

$$V_{22}(D)=100 \times D+20 \qquad (4'), \text{ and}$$

$$V_{32}(D)=200 \times D-10 \qquad (5').$$

On the other hand, when the cured form of calcium silicate of the present invention does not contain a substantial amount of cells having a cell size of greater than 200 µm, the amount of the pore volume of pores having a pore diameter of 0.1 µm or less, as determined by mercury porosimetry, is:

preferably from 90 to 98 vol %, more preferably from 95 to 98 vol %, when the apparent specific gravity D of the cured form of calcium silicate is from 0.8 to 1.0;

preferably from $V_4(D)$ to 97 vol %, more preferably from $V_{42}(D)$ to 97 vol %, when the apparent specific gravity D of the cured form of calcium silicate is from 0.5 to less than 0.8; or preferably from $V_5(D)$ to 92 vol %, more preferably from $V_{52}(D)$ to 92 vol %, when the apparent specific gravity D of the cured form of calcium silicate is from 0.14 to less than 0.5, wherein each vol % is based on the total pore volume of the cured form of calcium silicate, and $V_4(D)$, $V_5(D)$, $V_{42}(D)$, $V_{52}(D)$ are, respectively, calculated by the following formulae (6), (7), (6') and (7'):

$$V_4(D)=100 \times D+10 \qquad (6),$$

$$V_5(D)=150 \times D-15 \qquad (7),$$

$$V_{42}(D)=100 \times D+15 \qquad (6'), \text{ and}$$

$$V_{52}(D)=150 \times D-10 \qquad (7').$$

When the amount of the pore volume of pores having a pore diameter of 0.1 µm or less is in the above-mentioned range in accordance with the range of the apparent specific gravity of the cured form of calcium silicate, the cured form of calcium silicate exhibits a further high modulus of elasticity, a further high compressive strength, and a further high ratio of the compressive strength to the modulus of elasticity. Further, in each of the above-mentioned ranges of the apparent specific gravity of the cured form of calcium silicate, the upper limit of the preferred range of the ratio of the pore volume of pores having a pore diameter of 0.1 µm or less is the upper limit which can be achieved by the methods currently employed for producing a cured form of calcium silicate.

In the present invention, the expression "the cured form of calcium silicate contains a substantial amount of cells having a cell size of greater than 200 µm" means that, with respect to the cured form of calcium silicate which contains cells having a cell size of from 100 µm to 1 mm formed by the use of a foaming agent as in the case of a conventional ALC, the cured form of calcium silicate has the below-mentioned specific property. That is, such expression means that the number of cells having a cell size of greater than 200 µm in terms of the length of the long axis of the cross-section of each of the cells, in a 10 mm square on a cross-section of the cured form of calcium silicate, is larger than 20. The expression "cell" means a void which is formed during the production of the cured form of calcium silicate (wherein a foaming agent may or may not be used) as follows. When raw materials are mixed together to obtain an aqueous slurry or when the aqueous slurry is precured to obtain a precured form of the aqueous slurry, it is possible that gas is trapped in the aqueous slurry or the precured form thereof to form a void and that the formed void remains in the cured form of calcium silicate. This void in the cured form of calcium silicate is defined as a cell. A cell generally has a globular shape, an ellipsoidal shape, a droplet-like shape, or a combination of these shapes. Therefore, the cell can be easily distinguished from a void which is formed by cracking, chipping or the like.

On the other hand, the expression "the cured form of calcium silicate does not contain a substantial amount of cells having a cell size of greater than 200 µm" means that the cured form of calcium silicate does not contain cells having a cell size of from 100 µm to 1 mm formed by the use of a foaming agent. More specifically, such expression means that the number of cells having a cell size of greater than 200 µm in terms of the length of the long axis of the cross-section of each of the cells, in a 10 mm square on a cross-section of the cured form of calcium silicate, is 20 or less.

The length of the long axis of the cross-section of the cell means the longest length of the cross-section of the cell. The cross-section of the cell has a circular shape, an elliptic shape, a droplet-like shape, a combination of these shapes, or the like. The cell can be easily observed by means of a stereoscopic microscope or the like.

In each of the above-mentioned ranges of the apparent specific gravity of the cured form of calcium silicate, the above-mentioned amount of the pore volume of pores having a pore diameter of 0.1 μm or less is a yardstick for the fineness (or degree of the denseness) of the pores present in the matrix of the cured form. By combining the distribution of the pores (which is evaluated by the above-mentioned logarithmic width at ¼ height) with the amount of the pore volume of pores having a pore diameter of 0.1 μm or less, a yardstick for the degree of fineness and uniformity of the pore diameters in the matrix of the cured form of calcium silicate (wherein the matrix is the skeleton sustaining stress) can be obtained. When the cured form of calcium silicate has the above-mentioned amount of the pore volume of pores having a pore diameter of 0.1 μm or less, which amount is determined in accordance with the range of the apparent specific gravity, this means that, in each of the above-mentioned ranges of the apparent specific gravity of the cured form of calcium silicate, the pore diameters of the pores in the matrix is minimized, and the pore diameter distribution is uniform. Such an excellent microstructure of the cured form of calcium silicate is realized by the matrix mainly comprising tobermorite. By virtue of the excellent microstructure, properties of cured form have been greatly improved.

In the present invention, the value of parameter a defined by formula (1) below is preferably 7 or more, more preferably 8.5 or more, still more preferably 9 or more, and the value of parameter b defined by formula (2) below is preferably 1.20 or more, more preferably 1.30 or more, still more preferably 1.40 or more, most preferably 1.50 or more, $$a=(Y\times 10-3)/(D1.5) \qquad (1)$$

wherein Y and D respectively represent the modulus elasticity (N/mm$^2$) of and the apparent specific gravity of the cured form of calcium silicate, $$b=S/(Y\times 10-3)1.5 \qquad (2)$$

wherein S represents the compression strength (N/mm$^2$) of the cured form of calcium silicate and Y is as defined above.

The excellent microstructure of the cured form of calcium silicate of the present invention is realized by the matrix mainly comprising tobermorite. By virtue of the excellent microstructure, the cured form of calcium silicate has advantages not only in that the cured form of calcium silicate has high modulus of elasticity and high compressive strength as compared to the case of a conventional ALC, but also in that the cured form of calcium silicate is greatly improved with respect to the ratio of the compressive strength to the modulus of elasticity, whereas such an improvement has been impossible in the case of a conventional building material, such as an ALC. When the value of parameter a defined by formula (1) is lower than 7, disadvantages are likely to occur wherein, even if a reinforcing iron rod is arranged in the cured form of calcium silicate to obtain a reinforced material, the obtained reinforced material is likely to suffer a large deflection, so that the use of the reinforced material in a structural material (especially in a part of a building which is carried by supporting members arranged at long intervals) is inevitably limited.

A conventional autoclaved lightweight concrete and a material produced by a conventional method which is substantially the same as or similar to a method for producing the ALC have a value of parameter b (defined by formula (2)) of approximately 1, so that there is an unfavorable limitation wherein the compressive strength of the material is determined depending solely, simply, on the modulus of elasticity thereof. The present inventors has for the first time succeeded in developing a material having an increased ratio of the compressive strength to the modulus of elasticity, thereby solving the above-mentioned problem of the unfavorable limitation.

In general, the strain of a material at break, i.e., the critical strain is represented by the formula: critical strain=(breaking strength)/(modulus of elasticity). The value of the critical strain is equal to the value of parameter b defined by formula (2) above. Therefore, it can be said that the cured form of calcium silicate of the present invention exhibits a critical strain value which has not yet been achieved in the prior art. Accordingly, the cured form of calcium silicate can be used in a manner whrerein a large local strain occurs. For example, when the cured form of calcium silicate of the present invention is fixed using a nail or a screw or when a building material is fixed onto the cured form of calcium silicate using a nail or a screw, the cured form calcium silicate exhibits a high retention strength. Further, the cured form calcium silicate can also be used in a roof bed, which is required to have a high retention strength.

In a preferred embodiment of the present invention, the cured form calcium silicate of the present invention satisfies the requirement defined in formulae (1) and (2). Such a cured form calcium silicate exhibits excellent properties as a building material.

In the present invention, the modulus of elasticity of a material means the dynamic modulus of elasticity of the material, namely, a modulus elasticity which is calculated from the resonance frequency of the material. The dynamic modulus of elasticity is different from the static modulus of elasticity, which is calculated from the displacement response to the stress applied to the material. Evaluation of the material by the dynamic modulus of elasticity is advantageous in that it becomes possible to evaluate the average of the performances in all directions, namely, the intrinsic property of the material.

With respect to the specific surface area of the cured form of calcium silicate of the present invention as measured by nitrogen adsorption method (BET adsorption method, i.e., Brunauer-Emmett Teller equation adsorption method), the specific surface area is preferably from 20 to 85 m$^2$/g, more preferably 60 m$^2$/g or less, still more preferably 50 m$^2$/g or less. It has been reported in a paper that the higher the crystallinity of the tobermorite, the smaller the specific surface area of tobermorite, and that the specific surface area of a tobermorite having a high crystallinity is from about 40 to 50 m$^2$/g (see "Sekkou to Sekkai (Gypsum and Lime)" (published by The Society of Gypsum & Lime Japan), No. 214 (1988), page 129. In this paper, it is stated that the specific surface area of a CSH is at a level of from 200 to 250 m$^2$/g, which is very high. The specific surface area is regarded as a yardstick for the crystallinity of tobermorite in and CSH content of the cured form of calcium silicate, namely, one of the properties which characterize a building material containing tobermorite. When the specific surface area is larger than 85 m$^2$/g, the crystallinity of the tobermorite in or CSH content of the cured form of calcium silicate is lowered, so that not only do the strength and modulus of elasticity of the cured form become lowered, but also properties (such as weatherability and dimensional stability) of the cured form as a building material become lowered. On the other hand, when the specific surface area is markedly lowered, it means that the cured form of calcium silicate contains a large amount of a substance (other than tobermorite) having a low specific surface area. Therefore, the specific surface area is preferably 20 $m^2/g$ or more.

As in the case of the pore volume as measured by mercury porosimetry, the specific surface area of the cured form of calcium silicate varies depending heavily on the apparent specific gravity thereof. A preferred range of the specific surface area of the cured form of calcium silicate is determined depending on the range of the apparent specific gravity of the cured form of calcium silicate, as follows. When the apparent specific gravity is from 0.5 to 1.0, the specific surface area is preferably from 20 to 60 $m^2/g$, more preferably 50 $m^2/g$ or less; when the apparent specific gravity is from 0.35 to less than 0.5, the specific surface area is preferably from 20 to 70 $m^2/g$, more preferably 60 $m^2/g$ or less; and when the apparent specific gravity is from 0.14 to less than 0.35, the specific surface area is preferably from 20 to 85 $m^2/g$, more preferably 70 $m^2/g$ or less. When the specific surface area of the cured form of calcium silicate is markedly lowered, it means that the cured form of calcium silicate contains a large amount of a substance (other than tobermorite) having a low specific surface area. Therefore, the specific surface area is preferably 20 $m^2/g$ or more.

It is preferred that the cured form of calcium silicate of the present invention exhibits a powder X-ray diffraction pattern in which the ratio of the diffraction peak intensity I(002) ascribed to the (002) plane of the tobermorite to the diffraction peak intensity I(220) ascribed to the (220) plane of the tobermorite satisfies the relationship I(002)/I(220)≧0.25, more advantageously I(002)/I(220)≧0.35. It is considered that, in a board-shaped or strip-shaped particle of the tobermorite, the thicknesswise direction (i.e., direction perpendicular to the plane) of the particle is the C axis of the crystal. Therefore, when the relative intensity of I(002) to I(220) increases, the relative regularity with respect to the C axis of the crystal is improved, so that the thickness of the board-shaped or strip-shaped crystal is increased. In the JCPDS Card No. 19-1364, it is described that the ratio I(002)/I(220) is 0.8 in an ideal tobermorite crystal. As the ratio I(002)/I(220) becomes near 0.8, the thickness of the tobermorite increases, so that the strength of the crystal increases. As a result, the strength of the cured form of calcium silicate comprising the tobermorite crystal also increases. Further, as the regularity of the crystal increases, not only does the modulus of elasticity of the cured form of calcium silicate increase, but also properties (such as weatherability, e.g., carbonation resistance) of the cured form as a building material are improved. The methods for calculating I(002) and I(220) are shown in FIG. 3. I(002) is a true diffraction intensity obtained by linear approximation of the background around the diffraction angles of from 6 to 9° (2θ) (see FIG. 3). Similarly, I (220) is a true diffraction intensity obtained by linear approximation of the background around the diffraction angles of from 20 to 40° (2θ).

It is preferred that the cured form of calcium silicate of the present invention contains a water repellent substance in an amount of from 0.1 to 3.0% by weight. Examples of water repellent substances include siloxane compounds, alkoxysilane compounds, fatty acids, salts of fatty acids, and resin emulsions comprising water and at least one resin selected from the group consisting of an epoxy resin, a urethane resin, a silicone resin, a vinyl acetate resin, an acrylic resin and a styrene/butadiene resin. These water repellent substances can be used individually or in combination. Of these water repellent substances, especially preferred are siloxane compounds, such as silicone oils (e.g., a polydimethylsiloxane wherein the methyl group is unsubstituted or is substituted with a hydrogen atom, a phenyl group, a trifluoropropyl group or the like); and alkoxysilane compounds, such as an alkyl alkoxysilane (e.g., methyltriethoxysilane, ethyltriethoxysilane, propyltriethoxysilane or isobutyltriethoxysilane).

The cured form of calcium silicate of the present invention has a novel microstructure. By virtue of the combination of the novel microstructure of the cured form of calcium silicate with the action of a hydrophobic group of a water repellent substance, the cured form of calcium silicate exhibits excellent water repellency. The reason for this is presumed as follows. In each of the above-mentioned ranges of the apparent specific gravity of the cured form of calcium silicate, the pore diameters of the pores in the matrix is minimized, and the pore diameter distribution is uniform. By the synergistic action of this novel microstructure with the water repellent substance, excellent water repellency has been achieved. More specifically, when the contact angle of water against the surface of the cured form is larger than 90°, a larger osmotic pressure of water is needed in the case for intrusion of water into the pore of the cured form where the cured form of calcium silicate has a smaller pore diameter distribution, even if the contact angle is the same. The content of the water repellent substance in the cured form of calcium silicate is preferably from 0.1 to 3.0% by weight, more preferably from 0.5 to 2% by weight. When the content of the water repellent substance is smaller than 0.1% by weight, the desired water repellency cannot be exerted. On the other hand, when the content of the water repellent substance is larger than 3.0% by weight, a cured form of calcium silicate having an excellent microstructure and excellent strength which are characteristic of the present invention cannot be obtained.

It is preferred that the cured form of calcium silicate of the present invention contains 0.05 to 3% by volume of a reinforced fiber. Examples of reinforced fibers include inorganic fibers, such as an alkali-proof glass fiber, a carbon fiber, a stainless steel fiber and a ceramic fiber; and organic fibers, such as an aramid fiber, a vinylon fiber and a polypropylene fiber. These reinforced fibers can be used individually or in combination. Of these reinforced fibers, an aramid fiber, an alkali-proof glass fiber and a carbon fiber are preferred. The aramid fiber is most preferred.

A conventional autoclaved lightweight concrete is disadvantageous in that it contains coarse cells, so that, even if reinforced fiber is incorporated into the ALC, it is not likely the resultant reinforced ALC exhibits an improved resistance to chipping and an improved impact strength which is an important property as a building material. On the other hand, fine pores are uniformly distributed even when the cured form of calcium silicate contains coarse cells in the cured form of calcium silicate of the present invention, so that the cured form of calcium silicate of the present invention can exhibit a greatly improved impact strength. The fiber length of the reinforced fiber used in the present invention is generally from 1 to 20 mm, preferably from 3 to 10 mm, more preferably from 5 to 8 mm. The amount of the reinforced fiber in the cured form is preferably from 0.05 to 3% by volume, more preferably from 0.1 to 2% by volume, based on the volume of the cured form of calcium silicate, wherein the volume of the cured form includes the volume of pores contained therein. When the amount of the reinforced fiber is smaller than 0.05% by volume, the improvement in the strength of the cured form of calcium silicate by the use of the reinforced fiber is unsatisfactory. On the other hand, when the amount of the reinforced fiber is larger than 3% by volume, fiber holes are likely to be formed during mixing of raw materials (including the reinforced fiber) for producing the cured form of calcium silicate, rendering it difficult for the reinforced fiber to be uniformly dispersed in the cured form.

The reinforced calcium silicate composite structure of the present invention comprises the cured form of calcium silicate of the present invention and, arranged therein, a reinforcing iron rod or a reinforcing wire netting. In general, the reinforcing iron rod or the reinforcing wire netting is embedded in the cured form of calcium silicate. The expression "reinforcing iron rod" generally means a structure comprising a plurality of reinforcing iron rods arranged so that the reinforcing iron rods intersect, wherein the reinforcing iron rods are welded at the intersecting points. The expression "reinforcing wire netting" means an iron structure processed in the form of a wire. Representative examples of reinforcing wire nettings include a lath wire. The shape and size of each of the reinforcing iron rod and the reinforcing wire netting, the thickness of the reinforcing iron rod, the mesh size of the net reinforcing wire netting, and the arrangement (such as location) of the reinforcing iron rod or reinforcing wire netting embedded in the calcium silicate composite, are determined depending on the size, use and the like of the reinforced calcium silicate composite structure. It is preferred that the reinforcing iron rod and the reinforcing wire netting are, prior to use, treated with an anticorrosive agent for improving the durability thereof.

As the anticorrosive agent, a conventional anticorrosive agent, such as a synthetic resin, can be used.

By embedding the reinforcing iron rod or reinforcing wire netting in the cured form of calcium silicate, the resultant reinforced calcium silicate composite structure exhibits a greatly improved resistance to breakage. Especially, the cured form of calcium silicate of the present invention exhibits, by virtue of the high crystallinity, a very high modulus of compressive elasticity as compared to that of a conventional building material, so that the reinforcement of the cured form of calcium silicate by the reinforcing iron rod or reinforcing wire netting is very effective. Further, the cured form of calcium silicate has the above-mentioned uniform, fine pores, so that the cured form of calcium silicate exhibits a greatly improved adherence to a reinforcing iron rod as compared to that of a conventional autoclaved lightweight concrete.

With respect to the method for producing the cured form of calcium silicate of the present invention, an explanation is made below.

The method for producing the cured form of calcium silicate of the present invention comprises:

providing an aqueous slurry comprising water and solid materials including a siliceous material, a cementitious material, a calcareous material, at least one member selected from the group consisting of aluminum sulfate and a hydrate thereof, and a sulfate compound other than aluminum sulfate and a hydrate thereof, pouring the aqueous slurry into a mold, and precuring the aqueous slurry, followed by autoclaving, wherein 50% by weight or more of the siliceous material is a crystalline siliceous material, and wherein the at least one member selected from the group consisting of the aluminum sulfate and the hydrate thereof is contained in the aqueous slurry in an amount of from 0.09 to 10% by weight in terms of the amount of $Al_2O_3$, based on the total weight of the solid materials, and the sulfate compound other than aluminum sulfate and a hydrate thereof is contained in the aqueous slurry in an amount of from 0.15 to 15% by weight in terms of the amount of $SO_3$, based on the total weight of the solid materials, and wherein the amount of $SO_3$ is the sum of the amount of the $SO_3$ corresponding to the at least one member selected from the group consisting of the aluminum sulfate and the hydrate thereof and the amount of the $SO_3$ corresponding to the sulfate compound other than aluminum sulfate and a hydrate thereof.

In the present invention, the expression "precured form" means a substance which is obtained by precuring an aqueous slurry in a mold but has not been autoclaved.

The expression "siliceous material" means a material containing 70% by weight or more of $SiO_2$. Examples of siliceous materials include a massive siliceous material, siliceous sand, quartz (each of the massive siliceous material, siliceous sand and quartz are crystalline), a rock having a high content of a massive siliceous material, siliceous sand or quartz, diatomaceous earth, silica fume, fly ash, natural clay mineral, and a calcination product of diatomaceous earth, silica fume, fly ash or natural clay mineral. Examples of crystalline siliceous materials include a massive siliceous material, siliceous sand, quartz, and a rock having a high content of a massive siliceous material, siliceous sand or quartz. The expression "crystalline siliceous material" means a siliceous material which exhibits a powder X-ray diffraction pattern wherein sharp diffraction peaks of α-quartz, cristobalite and the like are observed. Examples of noncrystalline siliceous materials include diatomaceous earth, silica fume and fly ash. The expression "noncrystalline siliceous material" means a siliceous material which exhibits a powder X-ray diffraction pattern wherein sharp diffraction peaks are not observed.

In the present invention, the expression "cementitious material" means a cement composed mainly of a silicate component and a calcium component. Examples of cementitious materials include ordinary portland cement, high-early portland cement and belite cement. The expression "calcareous material" means a calcium-containing material having a calcium content of 50% by weight or more in terms of CaO, based on the weight of the material. Examples of calcareous materials include quick lime and slaked lime.

In the method for producing the cured form of calcium silicate of the present invention, it is required that 50% by weight or more of the siliceous material be a crystalline siliceous material. The reason for this is as follows. Among siliceous materials, noncrystalline siliceous material (such as silica fume) has a very high reactivity as compared to that of a crystalline siliceous material. Due to this high reactivity of the noncrystalline siliceous material, when the noncrystalline siliceous material is precured together with a cementitious material and a calcareous material to obtain a precured form, a CSH having a $CaO/SiO_2$ molar ratio of about 1 is very easily produced even at room temperature. The CSH is a very stable substance. Therefore, even when the precured form is autoclaved at a high temperature under high pressure, the conversion of the CSH to tobermorite is very slow, so that the resultant cured form of calcium silicate inevitably contains a large amount of the CSH, which causes a lowering of the dimensional stability and weatherability of the cured form of calcium silicate. Further, the crystallinity of the tobermorite in the cured form of calcium silicate is markedly lowered by the presence of a large amount of the CSH. Furthermore, the pores in the cured form of calcium silicate do not have a small pore diameter and a uniform pore distribution, so that the cured form of calcium silicate does not exhibit a satisfactorily high elasticity or a satisfactorily high compressive strength. Accordingly, the content of the crystalline siliceous material in the siliceous material needs to be 50% by weight or more. It is preferred that the content of the crystalline siliceous material in the siliceous material is 60% by weight or more.

Of crystalline siliceous materials, from the viewpoint of price, crystalline massive siliceous material is preferred. Of crystalline massive siliceous material, it is preferred to use a finely pulverized form of massive siliceous material, which has a specific surface area of 5,000 cm$^2$/g or more, more advantageously 7,000 cm$^2$/g or more, as measured by the Blaine permeation method. An extremely finely pulverized form of massive siliceous material is disadvantageous in that such a form of massive siliceous material is difficult to handle. Therefore, it is preferred that the specific surface area of the finely pulverized form of massive siliceous material is 300,000 cm$^2$/g or less. Since the finely pulverized form of massive siliceous material is crystalline, the finely pulverized form of massive siliceous material is almost not reactive during the precuring of the aqueous slurry. However, the finely pulverized form of massive siliceous material has a high reactivity during the autoclaving of the precured form, and, therefore, it becomes possible to produce a large amount of tobermorite having a high crystallinity. The use of a finely pulverized form of massive siliceous material having a specific surface area of 5,000 cm$^2$/g or more is advantageous in that even when a massive siliceous material remains unreacted after the autoclaving, the size of voids formed on the interface of the massive siliceous materials remaining in the matrix of the cured form can be suppressed to a small level.

When it is intended either to obtain a cured form of calcium silicate containing a substantial amount of cells having a cell size of greater than 200 μm (i.e., to obtain a cured form of calcium silicate having an apparent specific gravity of 0.5 or less without using a foaming agent), or to obtain a cured form of calcium silicate having an apparent specific gravity of 0.3 or less by using a foaming agent, it is necessary to increase the water/solid materials ratio. In such a case, it is preferred to use a noncrystalline siliceous material as a part of the siliceous material for the purpose of preventing sedimentation of solids during the production of the cured form and improving the curing rate during the precuring. In this case, however, the use of a large amount of the noncrystalline siliceous material is disadvantageous in that the amount of tobermorite formed is lowered and the crystallinity of the tobermorite is lowered. In view of this, the amount of the noncrystalline siliceous material in the siliceous material is preferably from 5 to less than 50% by weight, more preferably from 5 to 40% by weight, based on the weight of the siliceous material. The "water/solid materials ratio" means the ratio of the weight of the water to the total weight of the solid materials, wherein, when at least one of the solid materials contains water of crystallization, the weight of the water of crystallization is not included in the total weight of the solid materials, but in the weight of the water. The amount of the at least one member selected from the group consisting of the aluminum sulfate and the hydrate thereof in the aqueous slurry is from 0.09 to 10% by weight in terms of the amount of Al$_2$O$_3$, based on the total weight of the solid materials. When the water/solid materials ratio is less than 0.95, the amount of the at least one member selected from the group consisting of the aluminum sulfate and the hydrate thereof in the aqueous slurry is preferably from 0.09 to 3% by weight, more preferably from 0.12 to 2% by weight. On the other hand, when the water/solid materials ratio is from 0.95 to less than 1.9, the amount of the at least one member selected from the group consisting of the aluminum sulfate and the hydrate thereof in the aqueous slurry is preferably from 0.15 to 6% by weight, more preferably from 0.2 to 4% by weight. Further, when the water/solid materials ratio is 1.9 or more, the amount of the at least one member selected from the group consisting of the aluminum sulfate and the hydrate thereof in the aqueous slurry is preferably from 0.2 to 10% by weight, more preferably from 0.25 to 6% by weight. When the amount of the at least one member selected from the group consisting of the aluminum sulfate and the hydrate thereof in the aqueous slurry is less than 0.09% by weight, the effect of the present invention cannot be achieved. On the other hand, when the amount of the at least one member selected from the group consisting of the aluminum sulfate and the hydrate thereof in the aqueous slurry is more than 10% by weight, the viscosity of the aqueous slurry becomes too high, so that the moldability of the slurry becomes unsatisfactory.

The expression "aluminum sulfate" means a substance comprising a compound represented by the formula: Al$_2$(SO$_4$)$_3$. The expression "hydrate of aluminum sulfate" means a hydration product of the aluminum sulfate. Examples of hydrates of aluminum sulfate include a substance comprising the aluminum sulfate and water of crystallization, such as a substance represented by the formula: Al$_2$(SO$_4$)$_3$.17H$_2$O. In the present invention, it is required that the amount of Al$_2$(SO$_4$)$_3$ in the hydrate of aluminum sulfate be 80% by weight or more, based on the weight of the hydrate, wherein the weight of water of crystallization is excluded from the weight of the hydrate. Each of the aluminum sulfate and the hydrate thereof can be used in the form of a powder, a solution or a slurry.

The amount of the sulfate compound other than aluminum sulfate and a hydrate thereof in the aqueous slurry is from 0.15 to 15% by weight, preferably from 0.2 to 10% by weight, in terms of the amount of SO$_3$, based on the total weight of the solid materials, wherein the amount of SO$_3$ is the sum of the amount of the SO$_3$ corresponding to the at least one member selected from the group consisting of the aluminum sulfate and the hydrate thereof and the amount of the SO$_3$ corresponding to the sulfate compound other than aluminum sulfate and a hydrate thereof. When the amount of the sulfate compound other than aluminum sulfate and a hydrate thereof in the aqueous slurry is less than 0.15% by weight, the curing rate of the precured form becomes lowered. On the other hand, when the amount of the sulfate compound other than aluminum sulfate and a hydrate thereof in the aqueous slurry is more than 15% by weight, the total amount of the at least one member selected from the group consisting of the aluminum sulfate and the hydrate thereof and the sulfate compound other than aluminum sulfate and a hydrate thereof becomes too large, so that the content of tobermorite in the cured form of calcium silicate is lowered.

In the present invention, there is no particular limitation with respect to the sulfate compound other than aluminum sulfate and a hydrate thereof so long as the sulfate compound contains SO$_3$ or SO$_4$. Examples of such sulfate compounds include: sulfurous acid; sulfuric acid; gypsum anhydride (CaSO$_4$), hydrates of gypsum, such as gypsum dihydrate (CaSO$_4$.2H$_2$O) and gypsum hemihydrate (CaSO$_4$.1/2H$_2$O); and metal sulfates. Examples of metal sulfates include alkaline earth metal sulfates, such as magnesium sulfate;

alkali metal sulfates, such as sodium sulfite, potassium sulfite, sodium sulfate and potassium sulfate; copper sulfate; and silver sulfate. The above-mentioned sulfate compounds can be used individually or in combination. The sulfate compounds other than aluminum sulfate and a hydrate thereof are used for forming a large amount of high crystalline tobermorite, thereby obtaining a cured form having fine pores and a uniform pore diameter distribution. Of the above-mentioned sulfate compounds, gypsum dihydrate is especially preferred because gypsum dihydrate is contained in a cementitious material, which is used as one of the main raw materials for producing the cured form of calcium silicate of the present invention.

In the method of the present invention, the use of at least one member selected from the group consisting of aluminum sulfate and a hydrate thereof in combination with a sulfate compound other than aluminum sulfate and a hydrate thereof is advantageous in that sedimentation of a solid material can be prevented and precuring of the aqueous slurry can be promoted even when the water/solid materials ratio is high, so that the obtained cured form of calcium silicate exhibits an improved strength and an improved modulus of elasticity. Therefore, the use of at least one member selected from the group consisting of aluminum sulfate and a hydrate thereof in combination with a sulfate compound other than aluminum sulfate and a hydrate thereof is crucial for producing the cured form of calcium silicate of the present invention.

In the method for producing the cured form of calcium silicate of the present invention, it is preferred that at least one member selected from the group consisting of aluminum sulfate and a hydrate thereof, the other solid materials and water are mixed together at 40 to 100° C. for 10 minutes or more, more advantageously for 30 minutes or more, to thereby obtain an aqueous slurry. By mixing the raw materials (including water and the solid materials) under the above-mentioned conditions, it becomes possible not only to prevent solid-liquid separation even when the water/solid materials ratio is as high as 5, but also to precure the aqueous slurry in a mold in a short period of time so that the obtained precured form is solid enough to be releasable from the mold.

It is preferred that the aqueous slurry has a water/solid materials ratio in the range of from 0.67 to 5. By curing the aqueous slurry (having a water/solid materials ratio in range of from 0.67 to 5) as such or in the form of a mixture thereof with an appropriate amount of a foaming agent (such as aluminum powder), it becomes possible to produce a cured form of calcium silicate having a desirable low apparent specific gravity and having an appropriately controlled quality of coarse cells.

Further, it becomes possible, by using aluminum sulfate and/or a hydrate thereof in combination with the above-mentioned finely pulverized form of a crystalline massive siliceous material, to obtain a cured form of calcium silicate wherein the pore diameters of the pores in the matrix of the cured form of calcium silicate are minimized and wherein the pore diameter distribution is uniform. In such a cured form, the modulus of elasticity, the compressive strength and the ratio of the compressive strength to the modulus of elasticity are greatly improved. The reason why the use of aluminum sulfate and/or a hydrate thereof in combination with the finely pulverized form of a crystalline massive siliceous material makes it possible to produce such an excellent cured form of calcium silicate has not been elucidated, but is presumed to be that, by virtue of the use of the aluminum sulfate and/or the hydrate thereof in combination with the finely pulverized form of massive siliceous material, the dispersion state and uniformity of the aqueous slurry are improved, a large amount of high crystalline tobermorite can be produced, and the diameters of voids which are formed between the matrix and the remaining massive siliceous material can be made small.

In the present invention, when it is intended to obtain a cured form of calcium silicate which does not contain a substantial amount of cells having a cell size of greater than 200 $\mu$m, the solid materials (including a siliceous material, a cementitious material, a sulfate compound and a calcareous material) are mixed with water in a water/solid materials ratio of from 0.77 to 5 to obtain an aqueous slurry. When it is intended to obtain the above-mentioned cured form of calcium silicate which does not contain a substantial amount of cells having a cell size of greater than 200 $\mu$m and which, hence, exhibits a high strength, a high modulus of elasticity and a low apparent specific gravity, the water/solid materials ratio is in the range of from 0.77 to 5, preferably from 0.9 to 4, more preferably from 1.2 to 3.

On the other hand, when it is intended to obtain a cured form of calcium silicate which contains a substantial amount of cells having a cell size of greater than 200 $\mu$m, it is preferred that the solid materials and water are mixed together in a water/solid materials ratio of from 0.67 to 3.5, more advantageously from 0.85 to 3.3, still more advantageously from 0.96 to 2.7, to obtain an aqueous slurry, followed by addition of aluminum powder as a foaming agent to thereby obtain a foamable aqueous slurry, and pouring the obtained foamable aqueous slurry into a mold. The aluminum powder is used in an amount of from 0.002 to 0.8% by weight in terms of the weight of solid aluminum, based on the total weight of the solid materials. When the water/solid materials ratio is less than 1.1, the amount of the aluminum powder is preferably from 0.002 to 0.15% by weight, more preferably from 0.003 to 0.1% by weight. On the other hand, when the water/solid materials ratio is from 1.1 to less than 1.5, the amount of the aluminum powder is preferably from 0.005 to 0.2% by weight, more preferably from 0.008 to 0.15% by weight. Further, when the water/solid materials ratio is from 1.5 to less than 2.2, the amount of the aluminum powder is preferably from 0.008 to 0.3% by weight, more preferably from 0.015 to 0.2% by weight. Furthermore, when the water/solid materials ratio is 2.2 or more, the amount of the aluminum powder is preferably from 0.02 to 0.6% by weight, more preferably from 0.03 to 0.4% by weight. There is no particular limitation with respect to the form of the aluminum powder when the aluminum powder is added to the aqueous slurry. The aluminum powder can be added in a form in which the aluminum powder is generally used in the production of an ALC. For example, the aluminum powder as such can be added to the aqueous slurry. Alternatively, the aluminum powder can be added to the aqueous slurry, in the form of an aluminum slurry which is obtained by mixing the aluminum powder with a part of the water used as a raw material. Further, the aluminum powder can be added to the aqueous slurry, in the form of an aluminum paste which is used for producing an autoclaved lightweight concrete (see U.S. Pat. No. 4,318,270). The amount of the aluminum powder as a foaming agent is determined, taken into consideration the water/solid materials ratio of the aqueous slurry and the desired apparent specific gravity of the cured form. The formation of a foam in the aqueous slurry can be done by a method in which aluminum powder is not used. Preferred examples of such methods include a conventional pre-foaming method in which air is introduced into a pre-foaming agent or an aqueous solution thereof to form a foam, followed by mixing the foam with the aqueous slurry (see Unexamined Japanese Patent Application Laid-Open Specification No. Sho 63-295487), and a method in which a pre-foaming agent is mixed with the aqueous slurry, and the resultant slurry is caused to have a foam by means of a pre-foaming machine. The type of the pre-foaming agent is not specifically limited, and a conventional pre-foaming agent used in the art can be used. Examples of pre-foaming agents include a synthetic surfactant type pre-foaming agent, a resin soap type pre-foaming agent and a hydrolysis protein type pre-foaming agent.

In the aqueous slurry which is first provided in the method of the present invention, the $CaO/SiO_2$ molar ratio is from 0.5 to 1.5, preferably from 0.6 to 1.3, more preferably 0.65 to 1.1. When the $CaO/SiO_2$ molar ratio is more than 1.5, disadvantages are likely to be caused wherein the amount of the siliceous material becomes insufficient to form tobermorite, so that not only is the amount of tobermorite produced markedly lowered, but also highly crystalline tobermorite cannot be formed. On the other hand, when the $CaO/SiO_2$ molar ratio is less than 0.5, the amount of the siliceous material is satisfactory, but a large amount of the siliceous material remains unreacted, so that the amount of tobermorite produced is lowered.

With respect to the temperature at which the solid materials and water are mixed together for obtaining the aqueous slurry, there is no particular limitation. However, it should be noted that if, by the mixing, the initial hydration of the cementitious material and the reaction of the siliceous material with the calcareous advances before pouring of the aqueous slurry into the mold, then the precuring of the aqueous slurry after pouring thereof into the mold can be effectively performed. When the mixing temperature is too low, the initial hydration of the cementitious material and the reaction of the siliceous material with the calcareous material do not satisfactorily advance, so that the rate of the precuring of the aqueous slurry after pouring of the slurry into the mold is disadvantageously low. In view of this, it is preferred that the temperature immediately after the mixing of the solid materials with water is from 40 to 100° C., more advantageously from 50 to 100° C. With respect to the mixing time for obtaining the aqueous slurry, there is no particular limitation. However, when the mixing time is too short, it is impossible to obtain a uniform aqueous slurry in which each of the solid materials is satisfactorily dispersed, and neither the initial hydration of the cementitious material nor the reaction of the siliceous material with the calcareous material satisfactorily advances. On the other hand, when the mixing time is too long, the initial hydration of the cementitious material and the reaction of the siliceous material with the calcareous material advance excessively, so that the rate of the precuring of the aqueous slurry is disadvantageously lowered. In view of this, the mixing time is preferably from 10 minutes to less than 5 hours, more preferably from 30 minutes to less than 3 hours.

Furthermore, when the whole amount of the calcareous material is mixed at one time with the siliceous material and the cementitious material, it is possible that the calcareous material lowers the rate of the initial hydration of the cementitious material. Therefore, when it is intended to accelerate the precuring of the aqueous slurry after pouring thereof into the mold, it is preferred that the aqueous slurry to be provided in the method of the present invention is prepared by a process comprising the steps of: (1) mixing water with the solid materials other than the calcareous material to obtain a mixture, wherein the mixing is conducted at a temperature of from 40 to 100° C. for from 10 minutes to less than 5 hours; (2) adding the calcareous material to the mixture obtained in the step (1), followed by mixing at a temperature of from 40 to 100° C. for 30 seconds to less than 1 hour. The resultant aqueous slurry is poured into the mold. In the step (1) of the above-mentioned process, instead of using the whole amount of the calcareous material, a part of the calcareous material may be used. In this case, the remainder of the calcareous material is used in the step (2). Hereinafter, the charging of raw materials in the step (1) is referred to as "primary charging", and the charging of raw materials in the step (2) is referred to as "secondary charging".

The use of a sulfate compound other than aluminum sulfate and a hydrate thereof is effective not only in that sedimentation of a solid material can be prevented, but also in that the precuring of the aqueous slurry can be accelerated. The effect of preventing the sedimentation of a solid material is remarkable when the sulfate compound other than aluminum sulfate and a hydrate thereof is mixed with other solid materials and water at 40° C. or higher for 10 minutes or more in the above-mentioned step (1). On the other hand, the effect of accelerating the precuring the aqueous slurry (which precuring is conducted after the step (2)) is remarkable when a part or the whole amount of the sulfate compound other than aluminum sulfate and a hydrate thereof is added, followed by mixing at 40° C. or higher for 30 seconds or more in the above-mentioned step (2).

When the water/solid materials ratio is high (especially when the water/solid materials ratio is 2 or more), it is preferred from the viewpoint of preventing the sedimentation of a solid material that the sulfate compound other than aluminum sulfate and a hydrate thereof is added to the other solid materials and water in the above-mentioned step (1). On the other hand, when the water/solid materials ratio is low, it is preferred that the sulfate compound other than aluminum sulfate and a hydrate thereof is added in the above-mentioned step (2).

The use of at least one member selected from the group consisting of aluminum sulfate and a hydrate thereof is also effective for preventing the sedimentation of a solid material and accelerating the precuring of the aqueous slurry. For achieving such effects, it is preferred that at least one member selected from the group consisting of aluminum sulfate and a hydrate thereof is mixed with the other solid materials and water in the above-mentioned step (1) at a temperature of from 40 to 100° C. for 10 minutes to less than 5 hours.

As apparent from the above, with respect to each of the calcareous material, at least one member selected from the group consisting of aluminum sulfate and a hydrate thereof, and the sulfate compound other than aluminum sulfate and its hydrates, the effect achieved by the use thereof varies depending on whether the material is used in the step (1) (i.e., primary charging) or in the step (2) (i.e., secondary charging). Whether the material is charged in a whole amount at one time, or charged portionwise at several times, is determined taking into consideration the water/solid materials ratio, mixing conditions (the mixing temperature, the mixing time and the like), the process employed, and the like.

When the sulfate compound other than aluminum sulfate and a hydrate thereof, and the calcareous material are used in the secondary charging, there is no particular limitation with respect to the temperature at which these materials are mixed with the mixture obtained in the above-mentioned step (1). However, when the mixing temperature is too low, the rate of the precuring of the aqueous slurry after the step (2) is lowered. Therefore, it is preferred that the temperature immediately after the addition of the above-mentioned two materials to the mixture obtained in step (1) is from 40 to 100° C. Similarly, there is no particular limitation with respect to the period of time (mixing time) for which the above-mentioned two materials are mixed with the mixture obtained in the step (1). However, when the mixing time is too short, it becomes impossible to obtain an aqueous slurry in which the solid materials are uniformly dispersed. On the other hand, when the mixing time is too long, the rate of the precuring of the aqueous slurry is lowered. Therefore, the mixing time is preferably from 30 seconds to less than 1 hour, more preferably from 1 minute to less than 10 minutes.

The solid materials and water can be mixed together by means of a mixer which is commercially available. Of such mixers, it is preferred to use a mixer equipped with a high speed rotation blade usable for a low viscosity mortar, such as a paddle mixer equipped with an obstructing board. The mixing of the solid materials with water can be performed, for example, by a method using the above-mentioned mixer having a high speed rotation blade usable for a low viscosity mortar. Specifically, the solid materials are added in this method to water having been heated at 60° C. to obtain a mixture, and the mixture is mixed in a vessel using the above-mentioned mixer at 60° C. under atmospheric pressure for 2 hours. With respect to the revolution rate of the mixer, there is no particular limitation. However, when the revolution rate of the mixer is too low, sedimentation of a solid material is likely to occur. Therefore, the revolution rate of the mixer is generally from 100 to 2,500 rpm. The mixing of the solid materials with water can be conducted in the air or in an inert gas atmosphere, such as nitrogen. However, from the viewpoint of easy operation, it is preferred that the mixing is conducted in the air. Further, it is preferred that, after the above-mentioned step (2), a further mixing is conducted under reduced pressure for a short period of time (e.g., for approximately 1 to 5 minutes), thereby reducing the number of foams formed during the stirring of the mixture. In this case, it is preferred that the total of the mixing time in the step (2) and the mixing time after the step (2) under reduced pressure is less than 1 hour, more advantageously 10 minutes or less.

In the method of the present invention, any additive may be used so long as the properties of the cured form of calcium silicate are not impaired. Examples of additives include: organic lightweight aggregates, such as pulp, foamed styrene beads and organic microballoon; inorganic lightweight aggregates, such as pearlite and silastic balloon; thickening agents, such as methyl cellulose and polyacrylic acid; dispersants which are generally used in a cementitious material, such as a water reducing agent and a high-performance water reducing agent; carbonate compounds, such as calcium carbonate and dolomite; curing accelerating agents, such as sodium silicate; curing retardants which are generally used in a cementitious material, such as lignin sulfonic acid and a gulconate; and foaming retardants, such as phosphoric acid. The additive can be used in an amount which has conventionally been employed in the art. The additive can be added simultaneously with the addition of the raw materials. Alternatively, the additive can be added after the above-mentioned step (2), that is, after the mixing of all the raw materials has been completed. When the mixing time for the additive is too short, an aqueous slurry in which the additive is uniformly dispersed cannot be obtained. On the other hand, when the mixing time is too long, the total mixing time in all steps becomes disadvantageously long. In view of this, it is preferred that the mixing time is from 1 to 5 minutes.

Of the above-mentioned additives, pulp is preferred because pulp is cheap and is not deteriorated very much by autoclaving. Examples of pulps include virgin pulp and recycled paper pulp, each of which may be manufactured from broad-leaved tree or a coniferous tree. Pulp can be effectively used as a thickening agent, a dispersion stabilizer or a cure shrinkage reducing agent (which is used during the precuring of the aqueous slurry). A pulverized pulp is preferred for the following reasons. The pulverized pulp can prevent the sedimentation of a solid material when the water/solid materials ratio is high; the pulverized pulp can impart an appropriate viscosity to the aqueous slurry; the pulverized pulp can suppress occurrence of cracking during the precuring and subsequent autoclaving of the aqueous slurry; and the pulverized pulp can improve not only the moldability of the aqueous slurry but also the strength of the cured form of calcium silicate. Examples of pulverized pulps include a commercially available pulverized pulp, a dry pulverized product and a pulverized pulp obtained by homogenizing a pulp slurry by means of a high-pressure homogenizer. The content of the pulp in the cured form of calcium silicate is preferably from 0.1 to 3.0% by weight, more preferably 0.2 to 2.0% by weight. When the content of the pulp is less than 0.1% by weight, the above-mentioned effects are not achieved. On the other hand, when the content of the pulp is more than 3.0% by weight, the viscosity of the aqueous slurry is markedly increased when the pulp is added to the aqueous slurry, thereby causing not only defective pouring of the aqueous slurry into the mold but also foaming.

The aqueous slurry obtained by mixing the raw materials is poured into the mold and precured, followed by autoclaving. If desired, a water repellent substance or a reinforcing fiber may be incorporated into the aqueous slurry prior to the pouring of the aqueous slurry into the mold. If desired, the mold has a reinforcing iron rod or a reinforcing wire netting arranged therein. In this case, it is preferred that the above-mentioned reinforcing iron rod or reinforcing wire netting has been subjected to a rust proof treatment. The aqueous slurry in the mold is precured either by self-generated heating of the aqueous slurry or by heating of the aqueous slurry from the outside. It is preferred that the precuring of the aqueous slurry is conducted at 40 to 100° C. for 1 to 48 hours. As the mold, an autoclaving chamber or an autoclaving vessel can be used. It is preferred that the precuring of the aqueous slurry is performed while suppressing evaporation of water in the aqueous slurry. Further, the precuring can be performed by heating the mold while preventing the evaporation of water from the upper surface of the mold. By precuring the aqueous slurry, a precured form is obtained. The obtained precured form is subjected to high temperature and high pressure autoclaving by means of an autoclave. If desired, prior to the autoclaving of the precured form, the precured form is cut into a desired shape. The cutting of the precured form can be conducted by any conventional method which has generally been employed in the production of an autoclaved lightweight concrete. Examples of such conventional methods include a method using a wire. For improving the efficiency of autoclaving, it is preferred that the autoclaving is conducted after the precured form is released from the mold. It is preferred that the autoclaving of the precured form is performed at a temperature of from 160° C. (gauge pressure: approximately 5.3 kgf/cm$^2$) to 220° C. (gauge pressure: approximately 22.6 kgf/cm$^2$). The cured form obtained by autoclaving of the precured form is dried, thereby obtaining the cured form of calcium silicate of the present invention in a dried form.

In the present invention, a water repellent substance can be added to the aqueous slurry before pouring thereof into the mold, to the precured form, or to the cured form of calcium silicate which has been autoclaved. The content of the water repellent substance in the cured form is preferably from 0.1 to 3% by weight, more preferably 0.5 to 2% by weight. When the water repellent substance is added to the aqueous slurry, it is preferred that the water repellent substance as such is added. On the other hand, when the water repellent substance is added to the precured form or to the cured form which has been autoclaved, it is preferred that the addition of the water repellent substance is conducted by spraying or the like, followed by a heat treatment, such as drying. When it is intended to cause the cured form to exhibit water repellency throughout the cured form, it is preferred that the water repellent substance is added to the aqueous slurry.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, various measurements and analyses were conducted by the following methods.

[Flexural Strength and Compressive Strength]

A cured form of calcium silicate which had been autoclaved was placed in a constant temperature, constant humidity vessel in which the temperature and relative humidity (RH) were maintained at 20° C. and 60%, respectively. The condition of the cured form of calcium silicate was adjusted so that the water content in the cured form became 10±2%, based on the weight of the cured form in the absolutely dry state. This cured form having a water content of 10±2% was used as a sample for measuring the flexural strength and compressive strength. Tests for measuring the flexural strength and compressive strength of the cured form of calcium silicate were conducted in accordance with JIS R 5201. Specifically, a sample having a size of 40 mm×40 mm×160 mm was subjected to the flexural strength test, wherein the span was 100 mm. By conducting the flexural strength test, the sample was split in two to obtain two samples each having half a size of the sample prior to the flexural strength test. Using one of the obtained two samples, the compressive strength was measured as follows. The maximum loading which could be borne by the sample was measured, wherein the load was placed on the 40 mm×40 mm surface of the obtained sample. The found value of the maximum loading is defined as the compressive strength of the cured form. When the samples in the form of a board (i.e., the shaped article of the cured form of calcium silicate obtained by dehydration molding or a paper sheet making method) had a thickness of less than 40 mm, a plurality of such samples having a thickness of less than 40 mm were attached together using an adhesive to obtain a mass of the cured form, followed by cutting out from the mass a cube having a size of 40 mm×40 mm×40 mm, which cube was used as a sample for measuring the compressive strength. In this case, the compressive strength was measured in at least three different directions which were perpendicular to each other, and the average of the at least three found values of the compressive strength is defined as the compressive strength of the cured form of calcium silicate.

[Dynamic Modulus of Elasticity]

The dynamic modulus of elasticity was measured in accordance with JIS A-1127, which prescribes a method for measuring the dynamic modulus of elasticity of a concrete using resonance vibration. For measuring the dynamic modulus of elasticity, a sample of a cured form of calcium silicate was used, wherein the sample had the same shape and water content as those of the sample used in the flexural strength test. The longitudinal vibration of the sample was measured by means of a PC autoscanning type dynamic Young's modulus tester (MODEL MIN-011-0-08; manufactured and sold by Marui & Co., Ltd., Japan). From the primary resonance frequency of the longitudinal vibration, the dynamic modulus of the sample was calculated. The calculated value of the dynamic modulus was defined as the dynamic modulus of elasticity of the cured form of calcium silicate.

[Impact Strength]

A cured form of calcium silicate which had been autoclaved was placed in a constant temperature, constant humidity vessel in which the temperature and relative humidity (RH) were maintained at 20° C. and 60%, respectively. The cured form of calcium silicate was adjusted so that the water content in the cured form became 10±2%, based on the weight of the cured form in the absolutely dry state. This cured form having a water content of 10±2% was used for measuring the impact strength. The impact strength was measured in accordance with the Charpy impact test by means of a digital impact tester (trade name: DG-UG; manufactured and sold by Toyo Seiki Seisaku-sho, Ltd., Japan). An unnotched sample having a size of 10 mm×10 mm×100 mm was fixed at both ends thereof at a span of 60 mm. The impact strength was measured under conditions wherein the hammer had a weight of 1 J and a moment of 0.357 Nm; the distance between the center of the hammer revolving axis and the strike point was 23.0 cm; the start angle of the hammer was 150°; and the period of the swing was 0.969 second. The weight of the hammer means the potential energy which the hammer possesses when the hammer is held high to be swung downward to the sample.

[Hardness of a Precured Form of Calcium Silicate]

With respect to a precured form of calcium silicate, which had been precured for 5 hours in a mold, the hardness thereof was measured by means of a Yamanaka soil hardness tester (No. 351: standard type) manufactured in Japan. The hardness was measured at three different points on the surface of the cured form of calcium silicate which surface was not contacted with the mold, wherein the three points were 3 cm or more distant from each other. The average of the three found values of the hardness is defined as the hardness of the precured form of calcium silicate.

[Apparent Specific Gravity]

From a cured form of calcium silicate which had been autoclaved, a sample having the same size as the sample of a cured form of calcium silicate used for the flexural strength test mentioned above was obtained. This sample was dried at 105° C. for 24 hours, and then the weight and dimension (volume) of the sample were measured. From the found values of the weight and volume of the sample, the apparent specific gravity of the sample was calculated.

[Observation of the Diameter of a Cell]

The cross-section of the sample which had been used for the flexural strength test mentioned above (wherein the cross-section was obtained by splitting the sample in two in the flexural strength test) was observed by means of a stereoscopic microscope (trade name: SZ; manufactured and sold by Olympus Optical Co., Ltd., Japan) at a magnification of ×40, and the number of cells having a cell size of greater than 200 $\mu$m (in terms of the length of the long axis of the cross-section of each of the cells) in a 10 mm square on the cross-section was counted. With respect to five different 10 mm squares on the cross-section, the observation and counting was conducted. The average of the five found values of the number of cells is defined as the number of cells.

[Mercury Porosimetry: Logarithmic Width at ¼ Height, and Pore Volume Ratio]

The porosity and pore diameter distribution properties of a cured form of calcium silicate can be measured by mercury porosimetry. The surface area of a cured form of calcium silicate can also be measured by mercury porosimetry. In this method, a sample is placed in a vacuum chamber containing mercury, and a pressure is applied from the outside of the vacuum chamber to thereby force mercury into pores in the sample. The amount of mercury forced into the pores is recorded in terms of a function of the pressure applied. Based on this record, the total pore volume of the sample can be calculated, and the pore diameter distribution properties of the sample can be obtained.

A cured form of calcium silicate which had been autoclaved was pulverized. The pulverized cured form of calcium silicate was classified to collect particles having a size of from 2 to 4 mm. The particles were dried at 105° C. for 24 hours to obtain a sample of the cured form of calcium silicate used for mercury porosimetry. The pore diameter distribution of the sample was measured by mercury porosimetry by means of an apparatus for measuring a pore diameter distribution (trade name: Pore Sizer 9320; manufactured and sold by Micromeritics Instrument Corporation, U.S.A.). The value of pressure exerted was converted into the pore diameter on the supposition that the contact angle between mercury and the sample was 130°, and that the surface tension of mercury was 484 dyn/cm.

The cumulative pore volume was plotted against the pore diameter to obtain a cumulative pore distribution curve. The cumulative pore distribution curve was differentiated to obtain a differential pore distribution curve. The logarithmic width of the pore diameter distribution at a height of ¼ of the height of the maximum peak of the differential pore distribution curve (hereinafter, this logarithmic width is frequently referred to simply as the "logarithmic width at ¼ height") is defined as follows: When there are two pore diameters which correspond to the ¼ height of the height of the maximum peak, the larger pore diameter is defined as $A_2$, and the smaller pore diameter is defined as $A_1$. The logarithmic width at ¼ height is defined as the difference between the common logarithm of $A_2$ and the common logarithm of $A_1$ (such cases are shown in FIGS. 2(A) and 2(B)). When there are more than two pore diameters which correspond to the ¼ height of the height of the maximum peak, the largest pore diameter is defined as $A_2$, and the smallest pore diameter is defined as $A_1$. The logarithmic width at ¼ height is defined as the difference between the common logarithm of $A_2$ and the common logarithm of $A_1$ (such a case is shown in FIG. 2(C)).

With respect to the pores having pore diameters in the range of 0.1 $\mu$m or less, the amount of such pores is expressed in terms of the percentage of the total volume of the pores having pore diameters in the range of 0.1 $\mu$m or less, based on the total volume of the pores having pore diameters in the range of from 6 nm to 360 $\mu$m.

[Specific Surface Area as Measured by Nitrogen Adsorption]

A dried sample obtained in substantially the same manner as in the case of the above-mentioned mercury porosimetry was further dried under vacuum conditions at 70° C. for 3 hours, thereby obtaining a sample for measurement. The specific surface area of the obtained sample was measured by the BET adsorption method (the Brunauer-Emmett-Teller equation adsorption method) by means of an apparatus for measuring a specific surface area (trade name: Autosorb 1-MP; manufactured and sold by Quantachrome Instruments, U.S.A.). With respect to six different portions of the sample, measurements were done.

[Specific Surface Area as Measured by the Blaine Permeation Method]

The specific surface area was measured in accordance with the test (for measuring specific surface area) which is prescribed in JIS R 5201, which prescribes tests for measuring various properties of cement.

[Powder X-ray Diffractometry: Measurements of Ia and Ib]

Substantially the same sample as used in the above-mentioned flexural strength test was pulverized by means of a mortar to obtain a sample for powder X-ray diffractometry. The above-mentioned diffraction peak intensity Ib and minimum diffraction intensity Ia were measured by means of an X-ray diffraction apparatus (trade name: RINT 2000; manufactured and sold by Rigaku Corporation, Japan) with respect to K$\alpha$ line of Cu. The measurement was conducted under conditions wherein the acceleration voltage was 40 kV, the acceleration current was 200 mA, the slit width of the light receiving slits was 0.15 mm, the scanning speed was 4°/min, and the sampling was 0.02°. The diffracted X-rays were counted after monochromation thereof by a graphite monochromator.

Ia is defined as the minimum diffraction intensity observed in the diffraction angle range between the two diffraction peaks respectively ascribed to the (220) plane and (222) plane of tobermorite, wherein the intensity includes that of the background. Ib is defined as the diffraction peak intensity ascribed to the (220) plane of tobermorite, wherein the intensity includes that of the background. As shown in FIGS. 1(A) and(B), the diffraction rays ascribed to the (220) plane and (222) plane of tobermorite are diffraction rays having diffraction angles of about 29.5° and about 28.9° (2$\theta$), respectively.

[Powder X-ray Diffractometry: Measurements of I(002) and I(220)]

The sample used and the measurement conditions were substantially the same as in the above-mentioned measurements of Ia and Ib. I(002) is a true diffraction intensity obtained by linear approximation of the background around the diffraction angles of from 6 to 9° (2$\theta$) (see FIG. 3). Similarly, I (220) is a true diffraction intensity obtained by linear approximation of the background around the diffraction angles of from 20 to 40° (2$\theta$). As shown in FIG. 3, the diffraction ray ascribed to the (002) plane of tobermorite is a diffraction ray having a diffraction angle of about 7.7° (2$\theta$).

[Flexural Strength of a Panel]

A flexural strength test was conducted in accordance with the "flexural strength test for an autoclaved lightweight concrete panel (9.5 panel)" prescribed in JIS A 5416 under conditions wherein L=1,900 mm. From the panel flexural strength test, a load/central portion displacement curve was obtained. In the load/central portion displacement curve, the load (W) corresponding to the first inflection point is defined as the initial cracking load, and the displacement ($\delta$) of the central portion corresponding to the first inflection point is defined as the initial cracking deflection. The stiffness of the panel is given by the formula: $(11 \times W \times L^3)/(768 \times \delta)$. The flexural strength test was continued until the panel was broken. The breaking load is defined as the maximum load in the load/central portion displacement curve.

[Impact Response Test for a Panel]

One piece of panel was simply supported at a span of 1,800 mm. At a point near the center of the panel was exerted one stroke of the standard heavy impact defined in item (1) for the impact force properties prescribed in appendix 2 of JIS A 1418-2 (Method for measuring impact sound insulation performance of building flooring; part 2: method using standard heavy impact source). The vertical displacement beneath the impact point was measured using a non-contact capacitive displacement meter until no displacement was observed. From the results of the measurement, an impact response curve was obtained. The forced response displacement, the half-life of the amplitude (i.e., the period of from the point in time at which the displacement reached a maximum value to the point in time at which the displacement was reduced to half the maximum value), and the resonance frequency were obtained from the impact response curve.

[One-Side Water Absorption]

Provided was a sample of a cured form of calcium silicate which had been autoclaved and had a size of 40 mm×40 mm×160 mm, wherein the sample had been dried in a constant temperature, constant humidity vessel in which the temperature and relative humidity (RH) were maintained at 20° C. and 60%, respectively, until the weight of the sample reached the equilibrium weight. The sample was used for measuring the one-side water absorption. The sample was immersed in water having a temperature of 20° C. while keeping the 40 mm×40 mm surface of the sample upward so that the water surface was 1 cm above the undersurface of the sample. One day after and one week after the immersion of the sample in water, the weight of the sample was measured. The one-side water absorption is defined as the percentage of the weight of water absorbed by the sample of the cured form, based on the weight of the sample before the immersion thereof in water.

[Dimensional Stability]

Provided was a sample of a cured form of calcium silicate which had been autoclaved and had a size of 40 mm×40 mm×160 mm, wherein the sample had been dried in a constant temperature, constant humidity vessel in which the temperature and relative humidity (RH) were maintained at 20° C. and 60%, respectively, until the weight of the sample reached the equilibrium weight. The sample was used for measuring the strain. A strain gage (trade name: KFW-5-120-C1-11 L5M3R; manufactured and sold by Kyowa Electronic Instruments Co., Ltd., Japan) was attached to the sample. The sample was immersed in water while keeping the 40 mm×160 mm surface of the sample upward so that the water surface was 3 cm above the top of the sample, thereby allowing the sample to absorb water at each surface of the sample. One day after and one week after the start of the test (i.e., from the immersion of the sample in water), the amount of strain of the strain gauge was measured. From the found value of the amount of strain of the strain gauge, the amount of strain of the sample of the cured form per 1 m was calculated.

[Carbonation Shrinkage]

As a yardstick for the long-term durability of a cured form of calcium silicate, the shrinkage of the cured form in an accelerated carbonation reaction was measured. A cured form of calcium silicate which had been autoclaved and had a size of 20 mm×40 mm×160 mm was dried in a constant temperature, constant humidity vessel in which the temperature and relative humidity (RH) were maintained at 20° C. and 60%, respectively, until the weight of the cured form reached the equilibrium weight. The resultant cured form of calcium silicate was introduced into an accelerated neutralization test chamber (i.e., an accelerated carbonation test chamber) (trade name: ASAHI-LUNAIRE; manufactured and sold by ASAHI KAGAKU CO., LTD., Japan), in which the temperature, the relative humidity and the carbon dioxide gas concentration were maintained at 20° C., 60% and 10% by volume, respectively. Three days, seven days and fourteen days after the placement of the cured form in the carbonation test chamber, the change in the gauge length (originally 150 mm) was measured by means of a microscope, and carbonation shrinkages were calculated by the following formula:

$$\text{Shrinkage } (\%) = 100 \times (L_0 - L_1)/L_0$$

wherein:

$L_0$: gauge length at the start of the neutralization test (i.e., when the placement of the cured form in the carbonation test chamber); and $L_1$: gauge length on the third, seventh or fourteenth day after the start of the neutralization test (i.e., after the placement of the cured form in the carbonation test chamber).

[Nail Holding Strength Test]

A cured form of calcium silicate which had been autoclaved was placed in a constant temperature, constant humidity vessel in which the temperature and relative humidity (RH) are maintained at 20° C. and 60%, respectively. The cured form of calcium silicate was dried so that the water content in the cured form became 10±2% in terms of the weight percentage of the water in the cured form, based on the weight of the cured form in the absolutely dry state. From this cured form having a water content of 10±2% was obtained a sample having a size of 180 mm×180 mm×50 mm. At the central portion of the sample, a pilot hole having a size of 3.0 mm$\phi$ and a depth of 25 mm was formed by means of a drill. Then, a flat head wood screw (trade name: 4-020-04145; manufactured and sold by Yahata Neji Corporation, Japan) was screwed manually 30 mm deep into the hole. The pull-out strength was measured by means of an pull-out strength tester (manufactured and sold by YAMAMOTO KOJYUKI CO., LTD., Japan; ability: 1.5 t; lift: 10 mm) in accordance with the guideline of Architectural Research Institute, Ministry of Construction. The results of the pull-out strength test were classified into two categories. That is, when the nail holding strength of the sample was low, the screw was just pulled out of the sample; when the nail holding strength was high, the sample was broken around the screw so that a cone-shaped hole was formed in the sample (cone breakage).

EXAMPLES 1 TO 19

(Production of a cured form of calcium silicate, wherein, in a 10 mm square on a cross-section of the cured form of calcium silicate, the number of cells having a cell size of greater than 200 $\mu$m in terms of the length of the long axis of the cross-section of each of the cells is 20 or less)

In Examples 1 to 19, cured forms of calcium silicate were produced using solid materials and water, wherein the type and amount of each solid material and the amount of water are indicated in Tables 1 and 2. Specifically, a finely pulverized form of massive siliceous material, or a combination of a finely pulverized form of massive siliceous material and silica fume (manufactured and sold by EFACO, Egypt) was used as a siliceous material; quick lime was used as a calcareous material; ordinary portland cement (in Tables 1 to 7, this substance is referred to as "OPC") was used as a cementitious material; aluminum sulfate octadecahydrate was used as aluminum sulfate; gypsum dihydrate was used as a sulfate compound other than aluminum sulfate and a hydrate thereof; and a finely pulverized form of pulp was used as an organic fiber. With respect to each of aluminum sulfate octadecahydrate and gypsum dihydrate, the amount thereof is indicated in terms of parts by weight of the anhydrous form thereof in Tables 1 and 2.

In each of Examples 1 to 19, the following operation was performed. As a primary charging of raw materials, the finely pulverized form of massive siliceous material, silica fume (charged only in Examples 8 to 11), quick lime, ordinary portland cement, aluminum sulfate octadecahydrate and gypsum dihydrate (charged only in Examples 8 to 11) were charged into a stainless steel bath having a volume of 10 liters, which contained water having been heated at 60° C. The contents of the stainless steel bath were stirred by means of a stirrer (ultra stirrer DC-CHRM25; manufactured and sold by Iuchi Seieido Co., Ltd., Japan) at a rotation rate of 1,200 rpm under atmospheric pressure for two hours while heating the stainless steel bath at 60° C. and suppressing evaporation of water in the stainless steel bath. Then, as a secondary charging of raw materials, quick lime and gypsum dihydrate (charged in Examples other than Examples 8 to 11) were charged into the stainless steel bath. The contents of the stainless steel bath were stirred for 1 minute under substantially the same conditions as in the case of the primary charging of raw materials. Further, in Examples 2, 7, 10, 13 and 16, a finely pulverized form of pulp was charged into the stainless steel bath, and stirred for 1 minute under substantially the same conditions as described above.

By the above-mentioned charging of raw solid materials and water into the stainless steel bath and subsequent stirring of the contents of the stainless steel bath, a slurry was obtained. The obtained slurry was poured into a mold having a size of 25 cm×15 cm×7 cm and precured at 60° C. for 5 hours while suppressing evaporation of water from the slurry, thereby obtaining a precured form. The precured form was released from the mold and subjected to a high temperature and high pressure autoclaving at 180° C. in a saturated vapor atmosphere for 4 hours, followed by drying, thereby producing a cured form of calcium silicate.

Various properties of the cured forms of calcium silicate obtained in Examples 1 to 19 are shown in Tables 8 and 9. The cured form of calcium silicate obtained in Example 1 was subjected to an accelerated carbonation test and a nail holding strength test. The results of the accelerated carbonation test and nail holding strength test are shown in Tables 16 and 17, respectively. Also, with respect to the cured form of calcium silicate obtained in Example 1, the one-side water absorption and dimensional stability thereof were measured. The results are shown in Table 18.

The cured form of calcium silicate obtained in Example 1 was analyzed by powder X-ray diffractometry. The powder X-ray diffraction patterns obtained by the analysis are shown in FIGS. 1(A), 3 and 8(A). The cured form of calcium silicate obtained in Example 1 was analyzed by mercury porosimetry. The differential pore distribution curve obtained by the analysis is shown in FIG. 2(A). The cured form of calcium silicate obtained in Example 1 was observed by means of a scanning electron microscope at magnifications of ×2,500 and ×5,000. The scanning electron photomicrographs obtained by the observation at magnifications of ×2,500 and ×5,000 are shown in FIGS. 5(A) and 5(B), respectively. Further, the cured forms of calcium silicate obtained in Examples 2 and 18 were analyzed by mercury porosimetry. The differential pore distribution curves obtained by the analyses of the cured forms of calcium silicate obtained in Examples 2 and 18 are shown by solid lines (A) in FIGS. 4 and 7, respectively.

With respect to the cured forms of calcium silicate produced in Examples 1 to 19, cross-sections thereof were observed by means of a scanning electron microscope. As a result of the observations, it was found that each of the cured forms of calcium silicate produced in Examples 1 to 19 was composed of board-shaped particles of tobermorite (representative examples of such particles are shown in FIGS. 5(A) and 5(B) which show scanning electron photomicrographs obtained with respect to the cured form of calcium silicate produced in Example 1) and a very small amount of finely pulverized particles of massive siliceous material. In addition, 20 portions in a cross-section of each of the cured forms (wherein each portion had a size of 35.4 μm×18.9 μm) were chosen at random and observed by means of a scanning electron microscope at a magnification of ×2,500. With respect to each of the 20 portions, the ratio of the area of the portion which the tobermorite particles occupied to the area of the portion was obtained, followed by calculation of the average of the thus obtained 20 area ratios. As a result, it was found that, in each of the cured forms, the average area ratio was 80% or more. Further, the cured forms of calcium silicate were analyzed by powder X-ray diffractometry. As a result, it was found that each of the cured forms of calcium silicate exhibited a powder X-ray diffraction pattern wherein the diffraction peak ascribed to the (220) plane of the tobermorite showed a maximum diffraction intensity, or exhibited a powder X-ray diffraction pattern wherein only a diffraction peak ascribed to the (101) plane of quartz was observed as a diffraction peak having a diffraction intensity which is slightly higher than the maximum intensity of the diffraction peak ascribed to the (220) plane of the tobermorite.

EXAMPLES 20 TO 33

(Production of a cured form of calcium silicate, wherein, in a 10 mm square on a cross-section of the cured form of calcium silicate, the number of cells having a cell size of greater than 200 μm in terms of the length of the long axis of the cross-section of each of the cells is 21 or more)

In Examples 20 to 33, in addition to water and the solid materials used in Examples 1 to 19, an aluminum powder as a foaming agent and methyl cellulose as a thickening agent were used as raw materials for producing cured forms of calcium silicate, wherein the type and amount of each raw material are indicated in Tables 3 and 4. Gypsum dihydrate was used in a primary charging (Examples 20, 21, 25 to 28 and 31) or in a secondary charging (Examples other than Examples 20, 21, 25 to 28 and 31). A finely pulverized form of pulp was used only in Examples 23 and 26.

In each of Examples 20 to 33, the following operation was performed. Charging of the solid materials and water and subsequent stirring of the resultant mixture were performed in substantially the same manner as in Examples 1 to 19. To the resultant, stirred mixture was added methyl cellulose, followed by stirring, thereby obtaining a slurry. To the obtained slurry was added the aluminum powder, followed by stirring at 60° C. for 1 minute. The resultant slurry was poured into a mold having a size of 25 cm×15 cm×7 cm to obtain a foaming slurry. From the foaming slurry was produced a cured form of calcium silicate in substantially the same manner as in Examples 1 to 19.

Various properties of the cured forms of calcium silicate obtained in Examples 20 to 33 are shown in Tables 10 and 11. The cured form of calcium silicate obtained in Example 20 was subjected to an accelerated carbonation test and a nail holding strength test. The results of the accelerated carbonation test and nail holding strength test are shown in Tables 16 and 17, respectively. The cured form of calcium silicate obtained in Example 20 was analyzed by mercury porosimetry. The differential pore distribution curve obtained by the analysis is shown by solid line (A) in FIG. 6.

With respect to the cured forms of calcium silicate produced in Examples 20 to 33, cross-sections thereof were observed by means of a scanning electron microscope. By the observations, it was found that each of the cured forms of calcium silicate produced in Examples 20 to 33 was comprised of coarse cell portions (comprised of coarse cells and, disposed in the vicinity thereof, board-shaped particles of tobermorite), and a matrix composed of board-shaped particles of tobermorite (representative examples of such particles are shown in FIGS. 5(A) and 5(B) which show scanning electron photomicrographs obtained with respect to the cured form of calcium silicate produced in Example 1) and a very small amount of finely pulverized particles of massive siliceous particles. In addition, 20 portions in a cross-section of the matrix of each of the cured forms (wherein each portion had a size of 35.4 μm×18.9 μm) were chosen at random and observed by means of a scanning electron microscope at a magnification of ×2,500, and, with respect to each of the 20 portions, the ratio of the area of the portion which the tobermorite particles occupied to the area of the portion was obtained, followed by calculation of the average of the thus obtained 20 area ratios. As a result, it was found that the average area ratio was 80% or more in each of the cured forms. Further, the cured forms of calcium silicate were analyzed by powder X-ray diffractometry. As a result, it was found that each of the cured forms of calcium silicate exhibited a powder X-ray diffraction pattern wherein the diffraction peak ascribed to the (220) plane of the tobermorite had the maximum diffraction intensity, or exhibited a powder X-ray diffraction pattern wherein only a diffraction peak ascribed to the (101) plane of quartz was observed as a diffraction peak having a diffraction intensity which is slightly higher than the maximum intensity of the diffraction peak ascribed to the (220) plane of the tobermorite.

EXAMPLE 34

An aqueous solution containing 2.5% by weight of a cell liquid (Mearl P liquid; manufactured and sold by Aso Foam Crete Co., Ltd., Japan) for a cementitious material was charged into a foaming apparatus (manufactured and sold by CELLUFOAM ENGINEERING LABORATORY CO., LTD., Japan) to produce a foam under conditions wherein the air pressure was 0.25 kg/cm² and the liquid feeding pressure was 0.25 kg/cm². The density of the produced foam was 0.093 g/cm³. A slurry was prepared in substantially the same manner as in Example 12 (needless to say, the types and amounts of the solid materials and the amount of the water were the same as in the case of Example 12). Using this slurry, a cured form of calcium silicate was produced in substantially the same manner as in Example 12, except that the above-produced foam was added to the slurry in an amount of 27% by volume, based on the volume of the slurry, and the resultant, foam-containing slurry was stirred for 1 minute and then poured into the mold.

Various properties of the produced cured form of calcium silicate are shown in Table 11. With respect to the cured form of calcium silicate, a cross-section thereof was observed by a scanning electron microscope. By the observation, it was found that the cured form of calcium silicate was comprised of coarse cell portions (comprised of coarse cells and, disposed in the vicinity thereof, board-shaped particles of tobermorite), and a matrix composed of board-shaped particles of tobermorite (representative examples of such particles are shown in FIGS. 5(A) and 5(B) which show scanning electron photomicrographs obtained with respect to the cured form of calcium silicate produced in Example 1) and a very small amount of finely pulverized particles of massive siliceous particles. In addition, 20 portions in a cross-section of the matrix of the cured form (wherein each portion had a size of 35.4 μm×18.9 μm) were chosen at random and observed by means of a scanning electron microscope at a magnification of ×2,500, and, with respect to each of the 20 portions, the ratio of the area of the portion which the tobermorite particles occupied to the area of the portion was obtained, followed by calculation of the average of the thus obtained 20 area ratios. As a result, it was found that the average area ratio was 80% or more in the cured form. Further, the cured form of calcium silicate was analyzed by powder X-ray diffractometry. As a result, it was found that the cured form of calcium silicate exhibited a powder X-ray diffraction pattern wherein the diffraction peak ascribed to the (220) plane of the tobermorite had a maximum diffraction intensity.

EXAMPLES 35 AND 36

In Example 35, a slurry was prepared in substantially the same manner as in Example 12 (needless to say, the types and amounts of the solid materials and the amount of the water were the same as in the case of Example 12), and a foam was prepared in substantially the same manner as in Example 34. Then, using the slurry and the foam, a cured form of calcium silicate was produced in substantially the same manner as in Example 34, except that the amount of the foam was 140% by volume, based on the volume of the slurry.

On the other hand, in Example 36, a slurry was prepared in substantially the same manner as in Example 1 (needless to say, the types and amounts of the solid materials and the amount of the water were the same as in the case of Example 1), and a foam was prepared in substantially the same manner as in Example 34. Then, using the slurry and the foam, a cured form of calcium silicate was produced in substantially the same manner as in Example 34, except that the amount of the foam was 58% by volume, based on the volume of the slurry.

Various properties of the cured forms of calcium silicate obtained in Examples 35 and 36 are shown in Table 11. With respect to the cured forms of calcium silicate in Examples 35 and 36, cross-sections thereof were observed by means of a scanning electron microscope. By the observations, it was found that each of the cured forms of calcium silicate in Examples 35 and 36 was comprised of coarse cell portions (comprised of coarse cells and, disposed in the vicinity thereof, board-shaped particles of tobermorite), and a matrix composed of board-shaped particles of tobermorite (representative examples of such particles are shown in FIGS. 5(A) and 5(B) which show scanning electron photomicrographs obtained with respect to the cured form of calcium silicate produced in Example 1) and a very small amount of finely pulverized particles of massive siliceous particles. In addition, 20 portions in a cross-section of the matrix of each of the cured forms (wherein each portion had a size of 35.4 μm×18.9 μm) were chosen at random and observed by means of a scanning electron microscope at a magnification of ×2,500, and, with respect to each of the 20 portions, the ratio of the area of the portion which the tobermorite particles occupied to the area of the portion was obtained, followed by calculation of the average of the thus obtained 20 area ratios. As a result, it was found that the average area ratio was 80% or more in each of the cured forms. Further, the cured forms of calcium silicate were analyzed by powder X-ray diffractometry. As a result, it was found that each of the cured forms of calcium silicate exhibited a powder X-ray diffraction pattern wherein the diffraction peak ascribed to the (220) plane of the tobermorite had a maximum diffraction intensity.

EXAMPLE 37

A cured form of calcium silicate was produced in substantially the same manner as in Example 1, except that, as the secondary charging, a silicone oil (KF96-100CS; manufactured and sold by Shin-Etsu Chemical Co., Ltd., Japan) as a water repellent substance was charged in an amount of 1.14 parts together with gypsum dihydrate, wherein the silicone oil was mainly comprised of a polydimethylsiloxane. Various properties of the cured form of calcium silicate are shown in Table 18, together with those of the cured form of calcium silicate obtained in Example 1.

EXAMPLE 38

A cured form of calcium silicate was produced in substantially the same manner as in Example 1, except that an aramid short fiber having a length of 6 mm (Technora 320; manufactured and sold by Teijin Ltd., Japan) was added to a slurry (immediately after completion of the mixing of the solid materials and water and the subsequent stirring of the resultant mixture), and the resultant slurry containing the aramid short fiber was mixed by means of an omnimixer for 3 minutes, and then poured into the mold, wherein the amount of the aramid short fiber was 0.5% by volume, based on the volume of the cured form of calcium silicate finally obtained after autoclaving and drying, and wherein the volume of the cured form included the volumes of voids present therein.

Various properties of the cured form of calcium silicate obtained in Example 38 are shown in Table 19, together with those of the cured form of calcium silicate obtained in Example 1. Further, the compressive strength and impact strength of the cured form of calcium silicate obtained in Example 38 and the amount of the fiber used in Example 38 are shown in Table 20, together with the compressive strength and impact strength of the cured form of calcium silicate obtained in Example 1 and the amount of the fiber used in Example 1. With respect to the cured form of calcium silicate obtained in Example 38, a cross-section thereof was observed by means of a scanning electron microscope. By the observation, it was found that the cured form of calcium silicate was composed of board-shaped particles of tobermorite (representative examples of such particles are shown in FIGS. 5(A) and 5(B) which show scanning electron photomicrographs obtained with respect to the cured form of calcium silicate produced in Example 1), the aramid short fiber and a very small amount of the finely pulverized form of massive siliceous material. In addition, 20 portions in a cross-section of the cured form (wherein the portion had a size of 35.4 μm×18.9 μm) were chosen at random and observed by means of a scanning electron microscope at a magnification of ×2,500, and, with respect to each of the 20 portions, the ratio of the area of the portion which the tobermorite particles occupied to the area of the portion was obtained, followed by calculation of the average of the thus obtained 20 area ratios. As a result, it was found that the average area ratio was 80% or more. Further, the cured form of calcium silicate was analyzed by powder X-ray diffractometry. As a result, it was found that the cured form of calcium silicate exhibited a powder X-ray diffraction pattern wherein only a diffraction peak ascribed to the (101) plane of quartz was observed as a diffraction peak having a diffraction intensity which is slightly higher than the maximum intensity of the diffraction peak ascribed to the (220) plane of the tobermorite.

EXAMPLE 39

A slurry was obtained using the same types of the raw materials as in Example 2, wherein the amount of each raw material was about 4,500 times the amount of the material in Example 2. The obtained slurry was poured into a mold which had an inner height of 600 mm, an inner length of 2,000 mm and an inner width of 100 mm and had arranged therein a reinforcing iron rod having a diameter of 6 mm, and precured for 5 hours, thereby obtaining a precured form of calcium silicate. The obtained precured form of calcium silicate was released from the mold, followed by cutting by means of a wire, thereby obtaining a panel of calcium silicate having a thickness of 100 mm, a length of 2,000 mm and a width of 600 mm. The panel was subjected to a high temperature and high pressure autoclaving at 180° C. for 4 hours, followed by drying, thereby obtaining a reinforced calcium silicate composite structure in the form of a panel. The reinforced calcium silicate composite structure had a water content of 20% by weight and suffered no cracking. FIG. 9 shows an explanatory diagrammatic view showing the arrangement of reinforcing iron rods used in the reinforced calcium silicate composite structure.

The reinforced calcium silicate composite structure in the form of a panel was subjected to a flexural strength test and an impact response test. The results of the flexural strength test and impact response test are shown in Tables 21 and 22, respectively. With respect to the impact response test, the measurement was done three times, and the average value is calculated. Further, with respect to the calcium silicate portion of the panel of the reinforced calcium silicate composite structure (i.e., the portion of the panel excluding the reinforcing iron rods), properties thereof were measured. As a result, it was found that the properties of the calcium silicate portion of the panel produced in Example 39 were almost the same as those of the cured form of calcium silicate obtained in Example 2.

COMPARATIVE EXAMPLE 1

A slurry was prepared in substantially the same manner as in Example 1, except that aluminum sulfate was not used. The slurry was poured into a mold, and precured at 60° C. for 5 hours. However, precipitation of the solid materials (i.e., separation of water from the solid materials) occurred and, hence, it was impossible to obtain a cured form of calcium silicate having a desired apparent specific gravity. The amount of water separated from the solid materials was 15% by weight, based on the weight of the water used.

COMPARATIVE EXAMPLE 2

A cured form of calcium silicate was produced in substantially the same manner as in Example 2, except that aluminum sulfate was not used. Various properties of the cured form of calcium silicate are shown in Table 12. The cured form of calcium silicate was analyzed by mercury porosimetry. The differential pore distribution curve of the cured form of calcium silicate is shown by dotted line (B) in FIG. 4. With respect to the cured form of the calcium silicate, the cross-section thereof was observed by means of a scanning electron microscope. By the observation, it was found that the cured form of calcium silicate was composed of board-shaped particles of tobermorite, a small amount of fiber-shaped particles, and a small amount of finely pulverized particles of massive siliceous material. Further, the cured form of calcium silicate was analyzed by powder X-ray diffractometry. As a result, it was found that the cured form of calcium silicate exhibited a powder X-ray diffraction pattern wherein only a diffraction peak ascribed to the (101) plane of quartz was observed as a diffraction peak having a diffraction intensity which is slightly higher than the maximum intensity of the diffraction peak ascribed to the (220) plane of the tobermorite.

COMPARATIVE EXAMPLE 3

A cured form of calcium silicate was produced in substantially the same manner as in Example 7, except that aluminum sulfate was not used. Various properties of the obtained cured form of calcium silicate are shown in Table 12. With respect to the cured form of the calcium silicate, a cross-section thereof was observed by means of a scanning electron microscope. By the observation, it was found that the cured form of calcium silicate was composed of board-shaped particles of tobermorite, a small amount of fiber-shaped particles and a small amount of finely pulverized particles of massive siliceous material. Further, the cured form of calcium silicate was analyzed by powder X-ray diffractometry. As a result, it was found that the cured form of calcium silicate exhibited a powder X-ray diffraction pattern wherein only a diffraction peak ascribed to the (101) plane of quartz was observed as a diffraction peak having a diffraction intensity which is much higher than the maximum intensity of the diffraction peak ascribed to the (220) plane of the tobermorite.

COMPARATIVE EXAMPLE 4

A slurry was prepared in substantially the same manner as in Example 9, except that aluminum sulfate was not used. The slurry was poured into a mold, and precured at 60° C. for 5 hours. However, precipitation of the solid materials (i.e., separation of water from the solid materials) occurred and, hence, it was impossible to obtain a cured form of calcium silicate having a desired apparent specific gravity. The amount of water separated from the solid materials was 35% by weight, based on the weight of the water used.

COMPARATIVE EXAMPLE 5

A cured form of calcium silicate was produced in substantially the same manner as in Example 10, except that aluminum sulfate was not used. Various properties of the obtained cured form of calcium silicate are shown in Table 12. With respect to the cured form of the calcium silicate, a cross-section thereof was observed by means of a scanning electron microscope. By the observation, it was found that the cured form of calcium silicate was composed of board-shaped particles of tobermorite, a small amount of fiber-shaped particles and a small amount of finely pulverized particles of massive siliceous material. Further, the cured form of calcium silicate was analyzed by powder X-ray diffractometry. As a result, it was found that the diffraction peak ascribed to the (220) plane of the tobermorite had a maximum intensity.

COMPARATIVE EXAMPLE 6

A cured form of calcium silicate was produced in substantially the same manner as in Example 16, except that aluminum sulfate was not used. Various properties of the cured form of calcium silicate are shown in Table 12. With respect to the cured form of the calcium silicate, a cross-section thereof was observed by means of a scanning electron microscope. By the observation, it was found that the cured form of calcium silicate was composed of board-shaped particles of tobermorite, a small amount of fiber-shaped particles and a small amount of finely pulverized particles of massive siliceous material. Further, the cured form of calcium silicate was analyzed by powder X-ray diffractometry. As a result, it was found that the diffraction peak ascribed to the (220) plane of the tobermorite had a maximum intensity.

COMPARATIVE EXAMPLE 7

A cured form of calcium silicate was produced in substantially the same manner as in Example 20, except that aluminum sulfate was not used. Various properties of the cured form of calcium silicate are shown in Table 12. With respect to the cured form of calcium silicate, a cross-section thereof was observed by means of a scanning electron microscope. By the observation, it was found that the cured form of calcium silicate was comprised of coarse cell portions (comprised of coarse cells and, disposed in the vicinity thereof, board-shaped particles of tobermorite), and a matrix composed of board-shaped particles of tobermorite, a small amount of fiber-shaped particles and a small amount of finely pulverized particles of massive siliceous material. Further, the cured form of calcium silicate was analyzed by powder X-ray diffractometry. As a result, it was found that the diffraction peak ascribed to the (220) plane of the tobermorite had a maximum intensity.

COMPARATIVE EXAMPLE 8

A cured form of calcium silicate was produced in substantially the same manner as in Example 22, except that aluminum sulfate was not used. In Comparative Example 8, with respect to the precured form which was prepared by pouring a slurry into the mold and precuring the slurry at 60° C. for 5 hours, the hardness of the precured form was 0 mm, whereas the hardness of the precured form produced in Example 22 was 10 mm. Various properties of the cured form of calcium silicate in Comparative Example are shown in Table 12. With respect to the cured form of the calcium silicate, a cross-section thereof was observed by means of a scanning electron microscope. By the observation, it was found that the cured form of calcium silicate was comprised of coarse cell portions (comprised of coarse cells and, disposed in the vicinity thereof, board-shaped particles of tobermorite), and a matrix composed of board-shaped particles of tobermorite, a small amount of fiber-shaped particles and a small amount of finely pulverized particles of massive siliceous material. Further, the cured form of calcium silicate was analyzed by powder X-ray diffractometry. As a result, it was found that the diffraction peak ascribed to the (220) plane of the tobermorite had a maximum intensity.

COMPARATIVE EXAMPLE 9

A cured form of calcium silicate was produced in substantially the same manner as in Example 23, except that aluminum sulfate was not used. In Comparative Example 9, with respect to the precured form which was prepared by pouring a slurry into the mold and precuring the slurry at 60° C. for 5 hours, the hardness of the precured form was 4 mm, whereas the hardness of the precured form produced in Example 23 was 10 mm. Various properties of the cured form of calcium silicate produced in Comparative Example 9 are shown in Table 12. With respect to the cured form of the calcium silicate, a cross-section thereof was observed by means of a scanning electron microscope. By the observation, it was found that the cured form of calcium silicate was comprised of coarse cell portions (comprised of coarse cells and, disposed in the vicinity thereof, board-shaped particles of tobermorite), and a matrix composed of board-shaped particles of tobermorite, a small amount of fiber-shaped particles and a small amount of finely pulverized particles of massive siliceous material. Further, the cured form of calcium silicate was analyzed by powder X-ray diffractometry. As a result, it was found that the diffraction peak ascribed to the (220) plane of the tobermorite has a maximum intensity.

COMPARATIVE EXAMPLE 10

A slurry was prepared in substantially the same manner as in Example 25, except that aluminum sulfate was not used. The slurry was poured into a mold and precured at 60° C. for 5 hours, thereby obtain a precured form. However, separation of water from the solid materials occurred, and water was accumulated at the bottom of the precured form. Therefore, a cured form of calcium silicate having a desired apparent specific gravity was not obtained. The amount of water separated from the solid materials was 25% by weight, based on the weight of the water used.

COMPARATIVE EXAMPLE 11

A cured form of calcium silicate was prepared in substantially the same manner as in Example 26, except that aluminum sulfate was not used. In Comparative Example 11, with respect to the precured form which was prepared by pouring a slurry into the mold and precuring the slurry at 60° C. for 5 hours, the hardness of the precured form was 2 mm, whereas the hardness of the precured form produced in Example 26 was 10 mm. Various properties of the cured form of calcium silicate are shown in Table 12. With respect to the cured form of the calcium silicate, a cross-section thereof was observed by means of a scanning electron microscope. By the observation, it was found that the cured form of calcium silicate was comprised of coarse cell portions (comprised of coarse cells and, disposed in the vicinity thereof, board-shaped particles of tobermorite), and a matrix composed of board-shaped particles of tobermorite, a small amount of fiber-shaped particles and a small amount of finely pulverized particles of massive siliceous material. Further, the cured form of calcium silicate was analyzed by powder X-ray diffractometry. As a result, it was found that the diffraction peak ascribed to the (220) plane of the tobermorite had a maximum intensity.

COMPARATIVE EXAMPLE 12

A cured form of calcium silicate was prepared in substantially the same manner as in Example 31, except that aluminum sulfate was not used. Various properties of the cured form of calcium silicate are shown in Table 12. With respect to the cured form of the calcium silicate, a cross-section thereof was observed by means of a scanning electron microscope. By the observation, it was found that the cured form of calcium silicate was comprised of coarse cell portions (comprised of coarse cells and, disposed in the vicinity thereof, board-shaped particles of tobermorite), and a matrix composed of board-shaped particles of tobermorite, a small amount of fiber-shaped particles and a small amount of finely pulverized particles of massive siliceous material. Further, the cured form of calcium silicate was analyzed by powder X-ray diffractometry. As a result, it was found that the cured form of calcium silicate exhibited a powder X-ray diffraction pattern wherein only a diffraction peak ascribed to the (101) plane of quartz was observed as a diffraction peak having a diffraction intensity which is much higher than the maximum intensity of the diffraction peak ascribed to the (220) plane of the tobermorite.

COMPARATIVE EXAMPLES 13 TO 16

In each of Comparative Examples 13 to 16, raw materials shown in Table 5 were mixed together to obtain a slurry wherein the temperature of the slurry immediately after the mixing of the raw materials was 50° C. As a siliceous material, a finely pulverized form of massive siliceous material having a specific surface area of 2,500 cm$^2$/g as measured by the Blaine permeation method was used (hereinafter, the expression "specific surface area as measured by the Blaine permeation method" is frequently referred to simply as "Blaine value"). As a foaming agent, an aluminum powder was used in an amount indicated in Table 5 in terms of parts by weight, relative to 100 parts by weight of the siliceous material. The foaming magnification was changed by the amount of the aluminum powder added. To the above-obtained slurry was added the aluminum powder. The resultant mixture (i.e., raw materials for a concrete) was immediately poured into a mold and precured at 60° C. for 3 hours, thereby obtaining a precured form. The precured form was released from the mold and subjected to a high temperature and high pressure autoclaving at 180° C. for 4 hours, followed by drying, thereby obtaining an ALC (a cured form of calcium silicate). The ALC obtained in Comparative Examples 13 to 16 had different apparent specific gravities.

Various properties of the obtained ALCs are shown in Table 13. The ALC obtained in Comparative Example 15 was subjected to an accelerated carbonation test and a nail holding strength test. The results of the accelerated carbonation test and nail holding strength test are shown in Tables 16 and 17, respectively. Further, the ALC obtained in Comparative Example 15 was analyzed by mercury porosimetry. The differential pore distribution curve obtained by the analysis is shown by dotted line (B) in FIG. 6. The ALC obtained in Comparative Example 15 was analyzed by powder X-ray diffractometry. The powder X-ray diffraction pattern obtained by the analysis is shown in FIG. 8(B). With respect to the ALCs obtained in Comparative Examples 13 to 16, cross-sections thereof were observed by means of a scanning electron microscope. By the observations, it was found that each of the ALCs obtained in Comparative Examples 13 to 16 was composed of coarse cell portions (comprised of coarse cells and, disposed in the vicinity thereof, board-shaped particles of tobermorite), a matrix comprised of board-shaped particles of tobermorite and finely pulverized particles of massive siliceous material remaining unreacted, and coarse voids present around finely pulverized particles of massive siliceous material. Further, the ALCs obtained in Comparative Examples 13 to 16 were analyzed by powder X-ray diffractometry. As a result, it was found that each of the ALCs exhibited a powder X-ray diffraction pattern in which only a diffraction peak ascribed to the (101) plane of quartz was observed as a diffraction peak having a diffraction intensity which is much higher than the maximum intensity of the diffraction peak ascribed to the (220) plane of the tobermorite, as shown in 8(B).

COMPARATIVE EXAMPLES 17 TO 19

From each of three types of commercially available ALCs having reinforcing iron rods arranged therein, a portion which did not contain a reinforcing iron rod was taken out to measure various properties of the ALC. The results are shown in Table 13. With respect to the three ALCs, cross-sections thereof were observed by means of a scanning electron microscope. By the observations, it was found that each of the ALCs was composed of coarse cell portions (comprised of coarse cells and, disposed in the vicinity thereof, board-shaped particles of tobermorite), a matrix composed of board-shaped particles of tobermorite and finely pulverized particles of massive siliceous material remaining unreacted, and coarse voids present around finely pulverized particles of massive siliceous material. Further, the three ALCs were analyzed by powder X-ray diffractometry. As a result, it was found that each of the three ALCs exhibited a powder X-ray diffraction pattern in which only a diffraction peak ascribed to the (101) plane of quartz was observed as a diffraction peak having a diffraction intensity which is much higher than the maximum intensity of the diffraction peak ascribed to the (220) plane of the tobermorite.

COMPARATIVE EXAMPLE 20

31 Parts by weight of ordinary portland cement, 42 parts by weight of quick lime, 27 parts by weight of a finely pulverized form of massive siliceous material having a Blaine value of 7,500 cm$^2$/g, and 160 parts by weight of water were mixed together at 60° C. while stirring using a stirrer, to obtain a mixture. Then, the stirring of the mixture was stopped, and the mixture was allowed to stand at 60° C. for 4 hours to thereby effect curing of the mixture. The resultant cured form was pulverized. 50 Parts by weight of the resultant pulverized cured form, 8.4 parts by weight of ordinary portland cement, 8.4 parts by weight of quick lime, 30.1 parts by weight of a finely pulverized form of massive siliceous material having a Blaine value of 11,000 cm$^2$/g, 3 parts by weight of gypsum dehydrate, 53.9 parts by weight of water and 0.42 part by weight of a fiber obtained by subjecting recycled paper pulp to microfibrication were mixed together to thereby obtain a slurry. The obtained slurry was poured into a mold, and precured at 60° C. for 12 hours while suppressing evaporation of water from the slurry, thereby obtaining a precured form. The precured form was released from the mold and subjected to a high temperature and high pressure autoclaving at 180° C. for 4 hours, followed by drying, thereby obtaining a cured form of calcium silicate. The amounts of the raw materials are shown in Table 5, wherein the amounts of the raw materials are indicated in terms of parts by weight, relative to 100 parts by weight of the siliceous material (i.e., the finely pulverized form of massive siliceous material).

Various properties of the cured form of calcium silicate are shown in Table 13. A cross-section of the cured form of calcium silicate was observed by means of a scanning electron microscope. As a result, it was found that the cured form of calcium silicate comprised board-shaped particles of tobermorite and a small amount of fibrous particles. Further, the cured form of calcium silicate was analyzed by powder X-ray diffractometry. As a result, it was found that the cured form of calcium silicate exhibited a powder X-ray diffraction pattern in which the diffraction peak ascribed to the (220) plane of the tobermorite had a maximum diffraction intensity.

COMPARATIVE EXAMPLE 21

31 Parts by weight of ordinary portland cement, 42 parts by weight of quick lime, 27 parts by weight of a finely pulverized form of massive siliceous material having a Blaine value of 11,000 cm$^2$/g and 160 parts by weight of water were mixed together at 60° C. while stirring using a stirrer to obtain a mixture. Then, the stirring of the mixture was stopped, and the mixture was allowed to stand at 60° C. for 4 hours to thereby effect curing of the mixture. The resultant cured form was pulverized. 40 parts by weight of the resultant pulverized cured form, 13.6 parts by weight of ordinary portland cement, 13.6 parts by weight of quick lime, 29.8 parts by weight of a finely pulverized form of massive siliceous material having a Blaine value of 11,000 cm$^2$/g, 3 parts by weight of gypsum dihydrate, 118 parts by weight of water and 1 part by weight of a fiber obtained by subjecting recycled paper pulp to microfibrication, were mixed together to thereby obtain a slurry. The obtained slurry was poured into a mold, and a cured form of calcium silicate was obtained in substantially the same manner as in Comparative Example 20. The amounts of the raw materials are shown in Table 5, wherein the amounts of the raw materials are indicated in terms of parts by weight, relative to 100 parts by weight of the siliceous material (i.e., the finely pulverized form of massive siliceous material).

Various properties of the cured form of calcium silicate are shown in Table 13. Further, the result of the nail holding strength test of the cured form of calcium silicate is shown in Table 17, and the differential pore distribution of the cured form of calcium silicate as measured by mercury porosimetry is shown in FIG. 2 (B). Furthermore, a cross-section of the cured form of calcium silicate was observed by means of a scanning electron microscope. As a result, it was found that the cured form of calcium silicate comprised board-shaped particles of tobermorite and a small amount of fibrous particles. Moreover, the cured form of calcium silicate was analyzed by powder X-ray diffractometry. As a result, it was found that the cured form of calcium silicate exhibited a powder X-ray diffraction pattern in which the diffraction peak ascribed to the (220) plane of the tobermorite had a maximum diffraction intensity.

COMPARATIVE EXAMPLE 22

38.3 Parts by weight of ordinary portland cement, 43.2 parts by weight of quick lime, 4.3 parts by weight of a finely pulverized form of massive siliceous material having a Blaine value of 11,000 cm$^2$/g, 14.2 parts by weight of silica fume and 416 parts by weight of water were mixed together at 60° C. for 4 hours while stirring using a stirrer to obtain a slurry. 89.65 parts by weight of the obtained slurry, 9.15 parts by weight of a finely pulverized form of massive siliceous material having a Blaine value of 11,000 cm$^2$/g, 1.2 parts by weight of gypsum dihydrate, 5.8 parts by weight of water and 0.8 part by weight of a fiber obtained by subjecting recycled paper pulp to microfibrication, were mixed together to obtain a slurry. The obtained slurry was poured into a mold, and a cured form of calcium silicate was obtained in substantially the same manner as in Comparative Example 20. The amounts of the raw materials are shown in Table 5, wherein the amounts of the raw materials are indicated in terms of parts by weight, relative to 100 parts by weight of the siliceous material (i.e., the finely pulverized form of massive siliceous material).

Various properties of the cured form of calcium silicate are shown in Table 14. A cross-section of the cured form of calcium silicate was observed by means of a scanning electron microscope. As a result, it was found that the cured form of calcium silicate comprised board-shaped particles of tobermorite and a small amount of fibrous particles. Further, the cured form of calcium silicate was analyzed by powder X-ray diffractometry. As a result, it was found that the cured form of calcium silicate exhibited a powder X-ray diffraction pattern in which the diffraction peak ascribed to the (220) plane of the tobermorite had a maximum diffraction intensity.

COMPARATIVE EXAMPLE 23

A cured form of calcium silicate was obtained in substantially the same manner as in Comparative Example 20, except that to the slurry (containing a fiber obtained by subjecting recycled paper pulp to microfibrication) was added 0.065 part by weight of an aluminum powder as a foaming agent, followed by mixing at 60° C. for 30 seconds, and the resultant slurry was poured into the mold. Various properties of the cured form of calcium silicate are shown in Table 14. Further, the result of the nail holding strength test of the cured form of calcium silicate is shown in Table 17. Furthermore, a cross-section of the cured form of calcium silicate was observed by means of a scanning electron microscope. As a result, it was found that the cured form of calcium silicate was comprised of coarse cell portions (comprised of coarse cells and, disposed in the vicinity thereof, board-shaped particles of tobermorite), and a matrix composed of board shaped particles of tobermorite, a small amount of fibrous particles, and a small amount of finely pulverized form of massive siliceous material. Moreover, the cured form of calcium silicate was analyzed by powder X-ray diffractometry. As a result, it was found that the cured form of calcium silicate exhibited a powder X-ray diffraction pattern in which the diffraction peak ascribed to the (220) plane of the tobermorite had a maximum diffraction intensity.

COMPARATIVE EXAMPLE 24

A cured form of calcium silicate was obtained in substantially the same manner as in Comparative Example 21, except that to the slurry (containing a fiber obtained by subjecting recycled paper pulp to microfibrication) was added 0.107 part by weight of an aluminum powder as a foaming agent, followed by mixing at 60° C. for 30 seconds, and the resultant slurry was poured into the mold. Various properties of the cured form of calcium silicate are shown in Table 14. A cross-section of the cured form of calcium silicate was observed by means of a scanning electron microscope. As a result, it was found that the cured form of calcium silicate was comprised of coarse cell portions (comprised of coarse cells and, disposed in the vicinity thereof, board-shaped particles of tobermorite) and a matrix composed of board-shaped particles of tobermorite, a small amount of fibrous particles, and a small amount of finely pulverized form of massive siliceous material. Further, the cured form of calcium silicate was analyzed by the powder X-ray diffractometry. As a result, it was found that the cured form of calcium silicate exhibited a powder X-ray diffraction pattern in which the diffraction peak ascribed to the (220) plane of the tobermorite had a maximum diffraction intensity.

COMPARATIVE EXAMPLE 25

6 Parts weight of ordinary portland cement, 39.4 parts by weight of quick lime, 13 parts by weight of slaked lime and 44.8 parts by weight of a silica powder having an average diameter of approximately 20 $\mu$m were mixed to obtain a mixture. Then, gypsum dehydrate was added to the obtained mixture in an amount of 3% by weight, based on the weight of the mixture. To the mixture was added water to obtain a slurry having a water/solid materials ratio of 0.62. The obtained slurry was heated to 40° C., and poured into a mold having a size of 10 cm×10 cm×40 cm used for the mortar strength test which is prescribed in JIS R 5201, wherein the mold did not have a reinforcing iron rod arranged therein and had its inner surface coated with mold release agent. The mold was allowed to stand in an atmosphere having a humidity of 80% and a temperature of 50° C. for 10 hours, thereby effecting precuring of the slurry to obtain a precured form. The precured form was released from the mold and autoclaved under steam at 180° C. for 7 hours, thereby obtaining a cured form of calcium silicate. The amounts of the raw materials are shown in Table 5, wherein the amounts of the raw materials are indicated in terms of parts by weight, relative to 100 parts by weight of the siliceous material (i.e., the finely pulverized form of massive siliceous material).

Various properties of the cured form of calcium silicate are shown in Table 14. A cross-section of the cured form of calcium silicate was observed by means of a scanning electron microscope. As a result, it was found that the cured form of calcium silicate was comprised mainly of fibrous particles, the remaining finely pulverized form of massive siliceous material, and coarse cells present around the finely pulverized form of massive siliceous material, and contained no board-shaped crystals. Further, the cured form of calcium silicate was analyzed by powder X-ray diffractometry. As a result, it was found that the cured form of calcium silicate exhibited no powder X-ray diffraction pattern in which the diffraction peak ascribed to the (101) plane of quarts had a maximum diffraction intensity, wherein no sharp diffraction peaks ascribed to the tobermorite were observed.

COMPARATIVE EXAMPLE 26

A cured form of calcium silicate was obtained in substantially the same manner as in Comparative Example 25, except that 14 parts weight of ordinary portland cement, 30.3 parts by weight of quick lime, 17.2 parts by weight of slaked lime and 43.2 parts by weight of a silica powder having an average diameter of approximately 20 $\mu$m were mixed together to obtain a mixture, followed by addition of gypsum dihydrate to the obtained mixture in an amount of 3% by weight, based on the weight of the mixture, and water was added to the mixture to obtain a slurry having a water/solid materials ratio of 0.66. The amounts of the raw materials are shown in Table 5, wherein the amounts of the raw materials are indicated in terms of parts by weight, relative to 100 parts by weight of the siliceous material (i.e., the finely pulverized form of massive siliceous material).

Various properties of the cured form of calcium silicate are shown in Table 14. A cross-section of the cured form of calcium silicate was observed by means of a scanning electron microscope. As a result, it was found that the cured form of calcium silicate was comprised mainly of fibrous particles, the remaining finely pulverized form of massive siliceous material, and coarse voids present around the finely pulverized form of massive siliceous material, and contained no board-shaped crystals. Further, the cured form of calcium silicate was analyzed by powder X-ray diffractometry. As a result, it was found that the cured form of calcium silicate exhibited no powder X-ray diffraction pattern in which the diffraction peak ascribed to the (101) plane of quarts had a maximum diffraction intensity, wherein no sharp diffraction peaks ascribed to the tobermorite were observed.

COMPARATIVE EXAMPLE 27

A cured form of calcium silicate was obtained in substantially the same manner as in Comparative Example 25, except that 18 parts weight of ordinary portland cement, 32.2 parts by weight of quick lime, 10.7 parts by weight of slaked lime and 41.7 parts by weight of a silica powder having an average diameter of approximately 20 μm were mixed to obtain a mixture, followed by addition of gypsum dihydrate to the obtained mixture in an amount of 3% by weight, based on the weight of the mixture, and water was added to the mixture to obtain a slurry having a water/solid materials ratio of 0.79. The amounts of the raw materials are shown in Table 6, wherein the amounts of the raw materials are indicated in terms of parts by weight, relative to 100 parts by weight of the siliceous material (i.e., the finely pulverized form of massive siliceous material).

Various properties of the cured form of calcium silicate are shown in Table 14. Further, the shrinkage of the cured form of calcium silicate obtained by the acceleration carbonation test is shown in Table 16. The differential pore distribution curve of the cured form of calcium silicate obtained by mercury porosimetry is shown by dotted line (B) in FIG. 7, together with the differential pore distribution curve of the cured form of calcium silicate (obtained in Example 18) obtained by mercury porosimetry, which was shown by solid line (A) in FIG. 7. Furthermore, the powder X-ray diffraction pattern of the cured form of calcium silicate is shown in FIG. 8(C). On the other hand, a cross-section of the cured form of calcium silicate was observed by means of a scanning electron microscope. As a result, it was found that the cured form of calcium silicate was comprised mainly of fibrous particles, the remaining finely pulverized form of massive siliceous material, and coarse voids present around the remaining finely pulverized form of massive siliceous material, and contained no board-shaped crystals. Further, the cured form of calcium silicate was analyzed by powder X-ray diffractometry. As a result, it was found that the cured form of calcium silicate exhibited no powder X-ray diffraction pattern in which the diffraction peak ascribed to the (101) plane of quarts had a maximum diffraction intensity, wherein no sharp diffraction peaks ascribed to the tobermorite were observed.

COMPARATIVE EXAMPLE 28

0.74 kg of quick lime was hydrated in 2.60 kg of hot water having a temperature of 70° C. to obtain a slaked lime slurry. The obtained slurry was cooled to obtain a slurry having a temperature of 32° C., followed by addition of 0.20 kg of diatomaceous earth (325 mesh, $SiO_2$ content of 79.0% by weight) and 0.70 kg of cooled water to obtain a slurry having a water/solid materials ratio of 3.5. The obtained slurry was subjected to gelation at 88° C. for 2 hours, and then immediately cooled to 60° C. To the gel were added 0.81 kg of a finely pulverized form of massive siliceous material used in Example 1, 0.11 kg of alkali-proof glass fiber and 0.11 kg of coniferous virgin pulp. The resultant mixture was uniformly mixed using an Omni mixer for 2 minutes. The resultant mixture was poured into a mold having an internal size of 40 mm×160 mm×40 mm, and subjected to dehydration molding under a pressure of 12 kgf/cm² while removing water through a wire mesh, thereby obtaining a shaped article having a thickness of about 20 mm. The shaped article was autoclaved at 180° C. in a saturated vapor atmosphere for 8 hours, followed by drying at 105° C. for 24 hours, thereby obtaining a cured form of calcium silicate having the same thickness as that of the shaped article. Two sheets of the cured form of calcium silicate each having a thickness of about 20 mm were attachedly laid one upon another by using an epoxy adhesive, thereby obtaining a mass of the cured form of calcium silicate. From the obtained mass of the cured form of calcium silicate was produced a cube having a size of 40 mm×40 mm×40 mm, which was used as a sample for measuring the compressive strength of the cured form of calcium silicate. The amounts of the raw materials are shown in Table 6, wherein the amounts of the raw materials are indicated in terms of parts by weight, relative to 100% by weight of the total of the siliceous material (i.e., the diatomaceous earth and the finely pulverized form of massive siliceous material).

Various properties of the cured form of calcium silicate are shown in Table 14. Further, the shrinkage of the cured form of calcium silicate obtained by the acceleration carbonation test is indicated in Table 16. A cross-section of the cured form of calcium silicate, wherein the cross-section was produced in the measurement of the compressive strength, was observed by means of a scanning electron microscope. As a result, it was found that the cured form of calcium silicate was composed mainly of pulp and glass fiber, and contained only a very small amount of board-shaped crystals. Furthermore, the cured form was analyzed by powder X-ray diffractometry. As a result, it was found that the cured form exhibited a powder X-ray diffraction pattern in which the diffraction peak ascribed to the (101) plane of quartz had a maximum diffraction intensity.

COMPARATIVE EXAMPLE 29

Various properties of a commercially available calcium silicate board for a flame retardant coating were measured. The results of the measurements are shown in Table 14. The compressive strength test of the calcium silicate board was performed in substantially the same manner in as Comparative Example 28. The calcium silicate board was analyzed by powder X-ray diffractometry. As a result, it was found that the calcium silicate board was composed mainly of xonotlite.

COMPARATIVE EXAMPLE 30

2.16 kg of water was added to a mixture of 0.4 kg of the diatomaceous earth used in Comparative Example 28 and 0.32 kg of a commercially available slaked lime having a purity of 99%, followed by heating at 90° C. for 3 hours while stirring, thereby effect gelation. To the resultant gel-like substance were added 0.2 kg of ordinary portland cement, 0.2 kg of a finely pulverized form of massive siliceous material and 0.016 kg of coniferous pulp was added to the obtained gel substance, followed by mixing. The resultant mixture was poured into a mold, and precured at 40° C. for 8 hours to obtain a precured form. The precured form was released from the mold and subjected to a high temperature and high pressure autoclaving at 180° C. for 8 hours, followed by drying, thereby obtaining a cured form of calcium silicate. The amounts of the raw materials are shown in Table 6, wherein the amounts of the raw materials are indicated in terms of parts by weight, relative to 100% by weight of the total of the siliceous materials (i.e., the diatomaceous earth and the finely pulverized form of massive siliceous material).

Various properties of the cured form of calcium silicate are shown in Table 14. Further, the shrinkage of the cured form of calcium silicate obtained by the acceleration carbonation test is indicated in Table 16. A cross-section of the cured form was observed by means of a scanning electron microscope. As a result, it was found that the cured form of calcium silicate was composed mainly of amorphous particles and short fiber-shaped particles. It was also found that the cured form of calcium silicate contained only a very small amount of board-shaped crystals. Furthermore, the cured form was analyzed by powder X-ray diffractometry. As a result, it was found that the cured form of calcium silicate exhibited a diffraction pattern in which the diffraction peak ascribed to the (220) plane of the tobermorite had a maximum diffraction intensity.

COMPARATIVE EXAMPLE 31

An aqueous suspension of calcium hydroxide having a concentration of 10% by weight in terms of CaO was added, while stirring, to a 5% by weight aqueous aluminum sulfate solution at a rate of 0.6 mol/min, thereby obtaining a slurry having a $CaO/Al_2O_3$ molar ratio of 6. The temperature of the slurry was adjusted to 60° C. The slurry was stirred at 60° C. for 1 hour, thereby obtaining a synthetic ettringite. A mixture comprising 30% by weight of the obtained synthetic ettringite, 26.9% by weight of slaked lime, 27.6% by weight of siliceous sand, 10.0% by weight of wollastonite, 5.0% by weight of wood pulp and 0.5% by weight of alkali-proof glass fiber was obtained by mixing these components together. To the obtained mixture was added water, thereby obtaining a slurry having a solids content of 10% by weight. The thus obtained slurry was shaped using a single-cylinder paper machine to thereby obtain a shaped article having a thickness of about 6 mm. The obtained shaped article was autoclaved at 180° C. in a saturated vapor atmosphere for 6 hours, followed by drying at 105° C. for 24 hours, thereby obtaining a cured form of calcium silicate. The amounts of the raw materials are shown in Table 6, wherein the amounts of the raw materials are indicated in terms of parts by weight, relative to 100 parts by weight of the siliceous material (i.e., the siliceous sand).

Various properties of the cured form of calcium silicate are shown in Table 15. Seven sheets of the cured form of calcium silicate each having a thickness of about 6 mm were attachedly laid one upon another by using an epoxy adhesive, thereby obtaining a mass of the cured forms of calcium silicate. From the obtained mass of the cured forms of calcium silicate was produced a cube having a size of 40 mm×40 mm×40 mm, which was used as a sample for measuring the compressive strength of the cured form of calcium silicate. A cross-section of the sample of the cured form of calcium silicate was observed by means of a scanning electron microscope. As a result, it was found that the cured form of calcium silicate was composed mainly of pulp, glass fiber and fibrous particles, and contained a small amount of particles of massive siliceous material. It was also found that the cured form of calcium silicate contained a small amount of laminar crystals. Further, the sample of the cured form of calcium silicate was analyzed by powder X-ray diffractometry. As a result, it was found that the cured form of calcium silicate exhibited a powder X-ray diffraction pattern in which the diffraction peak ascribed to the (101) plane of quartz had a maximum diffraction intensity.

COMPARATIVE EXAMPLE 32

A mixture of 10 parts by weight of slaked lime and 10 parts by weight of diatomaceous earth was heated at 90° C. for 2 hours to effect gelation. 20 Parts by weight of the resultant gel, 27% by weight of slaked lime, 27% by weight of siliceous sand, 10% by weight of wollastonite, 5% by weight of pulp, 1% by weight of glass fiber, and 10% by weight of type II anhydrous gypsum were mixed together. To the resultant mixture was added potassium sulfate in an amount of 3% by weight, based on the weight of the gypsum, followed by stirring. To the resultant mixture was added water in an amount of 12 times the weight of the mixture to thereby obtain a raw material slurry having a solids content of about 3.1% by weight. The thus obtained slurry was shaped into a shaped article having a thickness of about 6 mm. The obtained shaped article was subjected to a curing at 30° C. in a humid atmosphere (having a humidity of 95%) for 8 hours. Then, the shaped article was subjected to a hydrothermal reaction using a pressure vessel at 180° C. in a saturated vapor atmosphere for 10 hours, followed by drying, thereby obtaining a cured form of calcium silicate. The amounts of the raw materials are shown in Table 6, wherein the amounts of the raw materials are indicated in terms of parts by weight, relative to 100 parts by weight of the total of the siliceous materials (i.e., the diatomaceous earth and the siliceous sand).

Various properties of the cured form of calcium silicate are shown in Table 15. Seven sheets of the cured form of calcium silicate each having a thickness of about 6 mm were attachedly laid one upon another by using an epoxy adhesive, thereby obtaining a mass of the cured forms of calcium silicate. From the obtained mass of the cured forms of calcium silicate was produced a cube having a size of 40 mm×40 mm×40 mm, which was used as a sample for measuring the compressive strength of the cured form of calcium silicate. The powder X-ray diffraction pattern of the obtained cured form of calcium silicate is shown in FIG. 1(B). A cross-section of the sample of the cured form of calcium silicate was observed by means of a scanning electron microscope. As a result, it was found that the cured form of calcium silicate was composed mainly of pulp, glass fiber and fibrous particles as shown in the photomicrograph of FIG. 5(D), and contained a small amount of particles of massive siliceous material. It was also found that the cured form of calcium silicate contained a small amount of laminar crystals. Further, the sample of the cured form of calcium silicate was analyzed by powder X-ray diffractometry. As a result, it was found that the cured form of calcium silicate exhibited a powder X-ray diffraction pattern in which the diffraction peak ascribed to the (101) plane of quartz had a maximum diffraction intensity.

COMPARATIVE EXAMPLE 33

A quick lime was hydrated in a hot water having a temperature of 60° C., thereby obtaining a milk of quick lime. Then, a finely pulverized form of massive siliceous material having a Blaine value of 7,500 $cm^2/g$ was added to the obtained milk of quick lime. To the resultant mixture was added water, thereby obtaining a raw material slurry having a $Ca/SiO_2$ molar ratio of 1 and a water/solid materials ratio of 1/30. The thus obtained slurry was subjected to a hydrothermal reaction using an autoclave in a saturated vapor atmosphere having a temperture of 197° C. and a pressure of 14 $kg/cm^2$ for 2.5 hours, while stirring, thereby obtaining a quasi-crystalline slurry. To 100 parts by weight (in terms of the solids content) of the quasi-crystalline slurry was added 3 parts by weight of glass fiber, thereby obtaining an aqueous slurry. To the obtained aqueous slurry were added aluminum sulfate octadecahydrate and a silicone oil (trade name: BY-16-805; manufactured and sold by Toray Silicone Co., Ltd., Japan) which is a mixture of a methylhydrogen polysiloxane having a viscosity of 30 cp and a dimethyl polysiloxane (having a viscosity of 90 cp) having at both terminals thereof hydroxyl groups (the methylhydrogen polysiloxane/dimethyl polysiloxane weight ratio=1/1), wherein the amount of the aluminum sulfate octadecahydrate was 1.5 parts by weight (in terms of the anhydride thereof), relative to 100 parts by weight of the solids contained in the aqueous slurry, and the amount of silicone oil was 2.5 parts by weight relative to 100 parts by weight of the solids contained in the aqueous slurry. The resultant mixture was subjected to a press-dehydration molding under a pressure of 4 kg/cm$^2$, thereby obtaining a shaped article having a thickness of about 20 mm. The thus obtained shaped article was cured in an autoclave at 200° C. under a pressure of 15 kg/cm$^2$ for 7 hours, followed by drying at 130° C., thereby obtaining a water repellent, cured form of calcium silicate. The amounts of the raw materials are shown in Table 6, wherein the amounts of the raw materials are indicated in terms of parts by weight, relative to 100 parts by weight of the siliceous material (i.e., the finely pulverized form of massive siliceous material).

Various properties of the cured form of calcium silicate are shown in Table 15. Two sheets of the cured form of calcium silicate each having a thickness of about 20 mm were attachedly laid one upon another by using an epoxy adhesive, thereby obtaining a mass of the cured forms of calcium silicate. From the obtained mass of the cured forms of calcium silicate was produced a cube having a size of 40 mm×40 mm×40 mm, which was used as a sample for measuring the compressive strength of the cured form of calcium silicate. A cross-section of the sample of the cured form of calcium silicate was observed by means of a scanning electron microscope. As a result, it was found that the cured form of calcium silicate was composed of glass fiber, laminar particles which were presumed to be tobermorite, and fibrous particles. Further, the sample of the cured form of calcium silicate was analyzed by powder X-ray diffractometry. As a result, it was found that the cured form of calcium silicate exhibited a powder X-ray diffraction pattern in which the diffraction peak ascribed to the (220) plane of tobermorite had a maximum diffraction intensity. In the powder X-ray diffraction pattern, a diffraction peak ascribed to xonotlite was also observed.

COMPARATIVE EXAMPLE 34

A diatomaceous earth and a quick lime were mixed in a Ca/(SiO$_2$+Al) molar ratio of 0.95 to obtain a solid mixture. To the solid mixture was added water in an amount of 12 times the weight of the solid mixture, thereby obtaining a slurry. The thus obtained slurry was heated at 90° C. for 3 hours under atmospheric pressure, thereby producing a calcium silicate gel. To the thus obtained gel was added aluminum sulfate in an amount of 10% by weight, based on the total weight of the solids contained in the gel, followed by a press-dehydration molding under a pressure of 4 kg/cm$^2$, thereby obtaining a shaped article having a thickness of about 20 mm. The thus obtained shaped article was autoclaved in a saturated vapor atmosphere under a pressure of 10 kg/cm$^2$, followed by drying at 120° C., thereby obtaining a cured form of calcium silicate. The amounts of the raw materials are shown in Table 6, wherein the amounts of the raw materials are indicated in terms of parts by weight, relative to 100 parts by weight of the siliceous material (i.e., the diatomaceous earth).

Various properties of the cured form of calcium silicate are shown in Table 15. Two sheets of the cured form of calcium silicate, each having a thickness of about 20 mm, were attachedly laid one upon another by using an epoxy adhesive, thereby obtaining a mass of the cured forms of calcium silicate. From the obtained mass of the cured forms of calcium silicate was produced a cube having a size of 40 mm×40 mm×40 mm, which was used as a sample for measuring the compressive strength of the cured form of calcium silicate. A cross-section of the sample of the cured form of calcium silicate was observed by means of a scanning electron microscope. As a result, it was found that the cured form of calcium silicate was composed of laminar particles and fibrous particles. Further, the sample of the cured form of calcium silicate was analyzed by powder X-ray diffractometry. As a result, it was found that the cured form of calcium silicate exhibited a powder X-ray diffraction pattern in which the diffraction peak ascribed to the (220) plane of tobermorite had a maximum diffraction intensity.

COMPARATIVE EXAMPLE 35

Provided was a mixture of a finely pulverized form of massive siliceous material having a Blaine value of 11,000 cm$^2$/g and a slaked lime having a concentration of 74% of CaO, wherein the mixture had a Ca/SiO$_2$ molar ratio of 0.65. To the mixture was added water, thereby obtaining a slurry having a solids content of 30% by weight. The slurry was subjected to a hydrothermal autoclaving under a pressure of 10 kg/cm$^2$ for 1 hour, followed by slow cooling over 6 hours, thereby obtaining a gel of crystalline calcium silicate. Then, provided was a mixture comprising 54.5% by weight of the above-obtained gel of crystalline calcium silicate, 11.5% by weight of a commercially available β type hemihydrate, 11.5% by weight of a granulated blast furnace slag having a Blaine value of 6,000 cm$^2$/g, 5% by weight of pulp, 1.3% by weight of glass fiber, 0.2% by weight of vinylon fiber, 2% by weight of pearlite, 10.5% by weight of wollastonite, 1.5% by weight of slaked lime, 1.5% by weight of aluminum sulfate and 1.0% by weight of a proteinaceous retardant. To the mixture was added water, followed by mixing by using a mixer, thereby obtaining a uniform raw material slurry having a solids content of 10% by weight. The thus obtained raw material slurry was subjected to a press-dehydration molding using a filter press under a pressure of 4 kg/cm$^2$, thereby obtaining a partially fabricated product having a thickness of about 20 mm. The thus obtained partially fabricated product was cured at 60° C. for 10 hours, followed by drying, thereby obtaining a cured form of calcium silicate. The amounts of the raw materials are shown in Table 6, wherein the amounts of the raw materials are indicated in terms of parts by weight, relative to 100 parts by weight of the siliceous material (i.e., the finely pulverized form of massive siliceous material).

Various properties of the cured form of calcium silicate are shown in Table 15. Two sheets of the cured form of calcium silicate, each having a thickness of about 20 mm, were attached to each other by using an epoxy adhesive, thereby obtaining a mass of the cured form of calcium silicate. From the obtained mass of the cured form of calcium silicate was produced a cube having a size of 40 mm×40 mm×40 mm, which was used as a sample for measuring the compressive strength of the cured form of calcium silicate. A cross-section of the sample of the cured form of calcium silicate was observed by means of a scanning electron microscope. As a result, it was found that the cured form of calcium silicate was composed mainly of fibrous particles. It was also found that the cured form of calcium silicate contained a small amount of laminar crystals. Further, the sample of the cured form of calcium silicate was analyzed by powder X-ray diffractometry. As a result, it was found that the cured form of calcium silicate exhibited a powder X-ray diffraction pattern wherein only a diffraction peak ascribed to the (101) plane of quartz was observed as a diffraction peak having a diffraction intensity which is much higher than the maximum intensity of the diffraction peak ascribed to the (220) plane of the tobermorite.

COMPARATIVE EXAMPLE 36

Provided a mixture comprising 15.0 parts by weight of portland cement, 60.0 parts by weight of massive siliceous material, 22.0 parts by weight of slaked lime (wherein the amount of the slaked lime is indicated in terms of the weight of CaO, and the slaked lime had a slaked lime/cement weight ratio of about 2), 3.0 parts by weight of gypsum and 0.01 part by weight of an aluminum powder. To the mixture was added water, thereby obtaining an aqueous slurry having a water/solid materials ratio of 0.66 and a $CaO/SiO_2$ molar ratio of 0.6. The aqueous slurry was heated to 40° C. The aqueous slurry was poured into a mold having a size of 4 cm×4 cm×16 cm used for the mortar strength test which is prescribed in JIS R 5201, wherein the mold did not have a reinforcing iron rod arranged therein and had its inner surface coated with mold release agent. The mold was allowed to stand in an atmosphere having a humidity of 95% and a temperature of 45° C. for 10 hours, thereby effecting precuring of the slurry to obtain a precured form. The obtained precured form was released from the mold and autoclaved subjected to a high temperature and high pressure autoclaving at 180° C. under 10 atm for 8 hours, thereby obtaining a cured form of calcium silicate. The amounts of the raw materials are shown in Table 6, wherein the amounts of the raw materials are indicated in terms of parts by weight, relative to 100 parts by weight of the siliceous material (i.e., the massive siliceous material).

Various properties of the cured form of calcium silicate are shown in Table 15. A cross-section of the cured form of calcium silicate was observed by means of a scanning electron microscope. As a result, it was found that the cured form of calcium silicate was composed of coarse cell portions (comprised of coarse cells and, disposed in the vicinity thereof, board-shaped particles of tobermorite), and a matrix comprised of amorphous particles, short fibrous particles and a very small amount of board-shaped particles of tobermorite. 20 Portions (each having an area of 35.4 $\mu$m×18.9 $\mu$m) in the cross-section of the cured form were randomly chosen, wherein each of 20 portions is in the matrix of the cured form, and the 20 portions were observed by means of a scanning electron microscope at a magnification of ×2,500 and, with respect to each of the 20 portions, the ratio of the area of the portion which the board-shaped particles of tobermorite occupied to the area of the portion having a size of 35.4 $\mu$m×18.9 $\mu$m was obtained, followed by calculation of the average of the thus obtained 20 area ratios. The average of the 20 area ratios was 10%. Further, the cured form of calcium silicate was analyzed by powder X-ray diffractometry. As a result, it was found that the cured form of calcium silicate exhibited a powder X-ray diffraction pattern wherein only a diffraction peak ascribed to the (101) plane of quartz was observed as a diffraction peak having a diffraction intensity which is much higher than the maximum intensity of the diffraction peak ascribed to the (220) plane of the tobermorite.

COMPARATIVE EXAMPLE 37 AND 38

In Comparative Example 37, a cured form of calcium silicate was produced in substantially the same manner as in Comparative Example 36, except that the amount of the aluminum powder was changed to 0.020 part by weight. In Comparative Example 38, a cured form of calcium silicate was produced in substantially the same manner as in Comparative Example 36, except that the amount of the aluminum powder was changed to 0.050 part by weight. In each of Comparative Examples 37 and 38, the amounts of the raw materials are shown in Table 7, wherein the amounts of the raw materials are indicated in terms of parts by weight, relative to 100 parts by weight of the siliceous material (i.e., the massive siliceous material).

Various properties of the cured form of calcium silicate produced in Comparative Examples 37 and 38 are shown in Table 15. The shrinkage of the cured form of calcium silicate obtained by the acceleration carbonation test is indicated in Table 16. A cross-section of each of the cured forms of calcium silicate, produced in Comparative Examples 37 and 38, was observed by means of a scanning electron microscope. As a result, it was found that each of the cured forms of calcium silicate was composed of coarse cell portions comprised of coarse cells and, disposed in the vicinity thereof, board-shaped particles of tobermorite, and a matrix comprised of amorphous particles, short fibrous particles and a very small amount of board-shaped particles of tobermorite. 20 Portions (each having a size of 35.4 $\mu$m×18.9 $\mu$m) in the cross-section of the cured form were randomly chosen, wherein each of 20 portions was in the matrix of the cured form, and the 20 portions were observed by means of a scanning electron microscope at a magnification of ×2,500 and, with respect to each of the 20 portions, the ratio of the area of the portion which the board-shaped particles of tobermorite occupied to the area of the portion having a size of 35.4 $\mu$m×18.9 $\mu$m was obtained, followed by calculation of the average of the thus obtained 20 area ratios. The average of the 20 area ratios was 10%. Further, the cured forms of calcium silicate produced in Comparative Examples 37 and 38 were analyzed by powder X-ray diffractometry. As a result, it was found that each of the cured forms of calcium silicate exhibited a powder X-ray diffraction pattern wherein only a diffraction peak ascribed to the (101) plane of quartz was observed as a diffraction peak having a diffraction intensity which is much higher than the maximum intensity of the diffraction peak ascribed to the (220) plane of the tobermorite.

COMPARATIVE EXAMPLE 39

A cured form of calcium silicate was produced in substantially the same manner as in Comparative Example 27, except that an aluminum powder as a foaming agent was added to the aqueous slurry, followed by mixing at 40° C. for 30 seconds, and the resultant slurry was poured into the mold. The amounts of the raw materials are shown in Table 7, wherein the amounts of the raw materials are indicated in terms of parts by weight, relative to 100 parts by weight of the siliceous material (i.e., the finely pulverized form of massive siliceous material).

Various properties of the cured form of calcium silicate are shown in Table 15. A cross-section of the cured form of calcium silicate was observed by means of a scanning electron microscope. As a result, it was found that the cured form of calcium silicate was composed mainly of fibrous particles, the finely pulverized particles of massive siliceous material remaining unreacted, and coarse voids present around the finely pulverized particles of massive siliceous material, and contained no board-shaped crystals. Further, the cured form of calcium silicate was analyzed by powder X-ray diffractometry. As a result, it was found that the cured form of calcium silicate exhibited a powder X-ray diffraction pattern in which the diffraction peak ascribed to the (101) plane of quarts had a maximum diffraction intensity, wherein no sharp diffraction peaks ascribed to the tobermorite were observed.

COMPARATIVE EXAMPLE 40

An autoclaved lightweight concrete (i.e., a cured form of calcium silicate) was produced in substantially the same manner as in Comparative Example 15, except that to the aqueous slurry having a temperature of 50° C. and comprising the solid materials and the water was added a silicone oil "KF96-100CS" (trade name; manufactured and sold by Shin-Etsu Silicones, Japan) in an amount of 0.5% by weight, based on the total weight of the solid materials, and, to the resultant slurry was added aluminum powder. The one-side water absorption and dimensional stability of the produced autoclaved lightweight concrete were measured, and the results are shown in Table 18. With respect to each of the properties other than the one-side water absorption and the dimensional stability, the ALC exhibited substantially the same properties as in the case of the autoclaved lightweight concrete produced in Comparative Example 15.

COMPARATIVE EXAMPLE 41

An autoclaved lightweight concrete (i.e., a cured form of calcium silicate) was produced in substantially the same manner as in Comparative Example 15, except that to the slurry immediately before the addition of the aluminum powder was added an aramid short fiber (as used in Example 38) in an amount of 0.5% by volume, 0.5% by volume, based on the volume of the autoclaved lightweight concrete finally obtained after autoclaving and drying. Various properties of the autoclaved lightweight concrete are shown in Table 18, together with those of the autoclaved lightweight concrete obtained in Comparative Example 15. Also, the compressive strength and impact strength of the autoclaved lightweight concrete produced in Comparative Example 41, and the amount of the fiber used are shown in Table 20, together with the compressive strength and impact strength of the autoclaved lightweight concrete produced in Comparative Example 15. A cross-section of the autoclaved lightweight concrete produced in Comparative Example 41 was observed by means of a scanning electron microscope. As a result, it was found that a portion of the ALC which is free of aramid fibers had substantially the same microstructure as in the ALC produced in Comparative Example 15.

COMPARATIVE EXAMPLE 42

With respect to a commercially available lightweight concrete panel (manufactured and sold by Asahi Kasei Kabushiki Kaisha, Japan) having a width of 600 mm, a length of 2,000 mm and a thickness of 100 mm, which lightweight concrete panel had been reinforced with an iron rods having the same size and design as shown in FIG. 9, the flexural strength and impact response thereof were measured under conditions wherein the water content of the panel was 20% by weight. The results of the measurements of the flexural strength and impact response of the lightweight concrete panel are shown in Table 21 and 22, respectively. On the other hand, another panel of the same size and design was provided separately. With respect to a portion (of the panel) other than iron rods, various properties of the portion were measured. As a result, it was found that, with respect to each of these properties, the panel exhibited substantially the same properties as that of the ALC produced in Comparative Example 15. With respect to the impact response, the measurement was done three times, and the average value was calculated.

COMPARATIVE EXAMPLE 43

For producing a reinforced calcium silicate composite structure, an operation was done in substantially the same manner as in Example 39, except that the slurry used in Comparative Example 21 was poured into the mold. When the precured form obtained by precuring at 60° C. for 5 hours was released from mold, however, it was found that the volume of the precured form in the vertical direction was decreased (that is, sedimentation occurred). As a result, the produced cured form of calcium silicate having iron rods arranged therein suffered marked occurrence of cracks around the iron rods. Therefore, with respect to the cured form of calcium silicate, it was impossible to measure properties necessary as a reinforced calcium silicate composite structure.

TABLE 1

| Raw materials | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| OPC | | (Parts by weight) | 41.2 | 41.17 | 41.2 | 41.2 | 41.2 | 41.2 | 41.17 | 53.9 | 53.9 |
| Quick lime | Primary charging | (Parts by weight) | 13.9 | 13.94 | 13.9 | 13.9 | 13.9 | 13.9 | 13.94 | 18.2 | 18.2 |
| Quick lime | Secondary charging | (Parts by weight) | 32.5 | 32.52 | 32.5 | 32.5 | 32.5 | 32.5 | 32.52 | 42.5 | 42.5 |
| Pulverized form of massive | | (Parts by weight) | 100 | 100 | 100 | 100 | 100 | 100 | 100 | 80 | 70 |
| siliceous material | | Blaine value | 11000 | 11000 | 7500 | 5500 | 3500 | 2500 | 2500 | 11000 | 11000 |
| Silica fume | | (Parts by weight) | 0 | 0 | 0 | 0 | 0 | 0 | 0 | 20 | 30 |
| Gypsum | Primary charging | (Parts by weight) | 0 | 0 | 0 | 0 | 0 | 0 | 0 | 7.97 | 8 |
| Gypsum | Secondary charging | (Parts by weight) | 6.91 | 6.91 | 6.91 | 6.91 | 6.91 | 6.91 | 6.91 | 0 | 0 |
| Aluminum sulfate | | (Parts by weight) | 5.35 | 5.35 | 5.35 | 5.35 | 5.35 | 5.35 | 5.35 | 8.03 | 9.37 |
| Water | | (Parts by weight) | 368 | 367 | 368 | 368 | 368 | 368 | 367 | 548 | 640 |
| Pulverized pulp | | (Parts by weight) | 0 | 2.90 | 0 | 0 | 0 | 0 | 2.90 | 0 | 0 |

TABLE 1-continued

| Raw materials | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Aluminum powder | | (Parts by weight) | 0 | 0 | 0 | 0 | 0 | 0 | 0 | 0 | 0 |
| Methyl cellulose | | (Parts by weight) | 0 | 0 | 0 | 0 | 0 | 0 | 0 | 0 | 0 |
| $CaO/SiO_2$ | | (Molar ratio) | 0.73 | 0.73 | 0.73 | 0.73 | 0.73 | 0.73 | 0.73 | 0.93 | 0.93 |
| Water/solid materials ratio | | (Weight ratio) | 1.84 | 1.82 | 1.84 | 1.84 | 1.84 | 1.84 | 1.82 | 2.38 | 2.76 |

TABLE 2

| Raw materials | | | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|
| OPC | | (Parts by weight) | 53.9 | 53.9 | 41.2 | 41.2 | 41.2 | 41.2 | 41.2 | 41.2 | 41.2 | 41.2 |
| Quick lime | Primary charging | (Parts by weight) | 18.2 | 24.3 | 13.9 | 13.9 | 13.9 | 13.9 | 13.9 | 13.9 | 13.9 | 13.9 |
| Quick lime | Secondary charging | (Parts by weight) | 42.5 | 36.5 | 32.5 | 32.5 | 32.5 | 32.5 | 32.5 | 32.5 | 32.5 | 32.5 |
| Pulverized form of massive siliceous material | | (Parts by weight) | 70 | 60 | 100 | 100 | 100 | 100 | 100 | 100 | 100 | 100 |
| | | Blaine value | 11000 | 11000 | 11000 | 11000 | 11000 | 11000 | 11000 | 7500 | 7500 | 11000 |
| Silica fume | | (Parts by weight) | 30 | 40 | 0 | 0 | 0 | 0 | 0 | 0 | 0 | 0 |
| Gypsum | Primary charging | (Parts by weight) | 8 | 8.19 | 0 | 0 | 0 | 0 | 0 | 0 | 0 | 0 |
| Gypsum | Secondary charging | (Parts by weight) | 0 | 0 | 7 | 7 | 6.84 | 6.79 | 6.79 | 6.79 | 6.79 | 6.79 |
| Aluminum sulfate | | (Parts by weight) | 9.37 | 14.0 | 4.01 | 3.0 | 3.39 | 1.98 | 1.98 | 1.98 | 1.98 | 1.98 |
| Water | | (Parts by weight) | 640 | 944 | 326 | 325 | 293 | 241 | 241 | 203 | 174 | 150 |
| Pulverized pulp | | (Parts by weight) | 6.56 | 0 | 0 | 1 | 0 | 0 | 1 | 0 | 0 | 0 |
| Aluminum powder | | (Parts by weight) | 0 | 0 | 0 | 0 | 0 | 0 | 0 | 0 | 0 | 0 |
| Methyl cellulose | | (Parts by weight) | 0 | 0 | 0 | 0 | 0 | 0 | 0 | 0 | 0 | 0 |
| $CaO/SiO_2$ | | (Molar ratio) | 0.93 | 0.93 | 0.73 | 0.73 | 0.73 | 0.73 | 0.73 | 0.73 | 0.73 | 0.73 |
| Water/solid materials ratio | | (Weight ratio) | 2.68 | 3.99 | 1.64 | 1.63 | 1.48 | 1.23 | 1.22 | 1.03 | 0.88 | 0.77 |

TABLE 3

| Raw materials | | | Ex. 20 | Ex. 21 | Ex. 22 | Ex. 23 | Ex. 24 | Ex. 25 | Ex. 26 | Ex. 27 |
|---|---|---|---|---|---|---|---|---|---|---|
| OPC | | (Parts by weight) | 41.2 | 41.2 | 41.2 | 41.2 | 41.2 | 53.9 | 53.9 | 53.9 |
| Quick lime | Primary charging | (Parts by weight) | 13.9 | 13.9 | 13.9 | 13.9 | 13.9 | 18.2 | 18.2 | 18.2 |
| Quick lime | Secondary charging | (Parts by weight) | 32.5 | 32.5 | 32.5 | 32.5 | 32.5 | 42.5 | 42.5 | 42.5 |
| Pulverized form of massive siliceous material | | (Parts by weight) | 100 | 100 | 100 | 100 | 100 | 70 | 70 | 70 |
| | | Blaine value | 11000 | 11000 | 11000 | 11000 | 11000 | 11000 | 11000 | 11000 |
| Silica fume | | (Parts by weight) | 0 | 0 | 0 | 0 | 0 | 30 | 30 | 30 |
| Gypsum | Primary charging | (Parts by weight) | 6.79 | 6.84 | 0 | 0 | 0 | 8.02 | 8.02 | 8.02 |
| Gypsum | Secondary charging | (Parts by weight) | 0 | 0 | 6.91 | 6.91 | 6.9 | 0 | 0 | 0 |
| Aluminum sulfate | | (Parts by weight) | 1.98 | 3.41 | 5.35 | 5.35 | 5.35 | 9.37 | 9.37 | 9.37 |
| Water | | (Parts by weight) | 241 | 293.1 | 368 | 368 | 368 | 640 | 640 | 640 |

TABLE 3-continued

| Raw materials | | Ex. 20 | Ex. 21 | Ex. 22 | Ex. 23 | Ex. 24 | Ex. 25 | Ex. 26 | Ex. 27 |
|---|---|---|---|---|---|---|---|---|---|
| Pulverized pulp | (Parts by weight) | 0 | 0 | 0 | 2.9 | 0 | 0 | 6.56 | 0 |
| Aluminum powder | (Parts by weight) | 0.065 | 0.092 | 0.107 | 0.107 | 0.250 | 0.353 | 0.353 | 0.477 |
| Methyl cellulose | (Parts by weight) | 0.048 | 0.059 | 0.074 | 0.074 | 0.074 | 0.128 | 0.128 | 0.128 |
| $CaO/SiO_2$ | (Molar ratio) | 0.73 | 0.73 | 0.730 | 0.730 | 0.73 | 0.93 | 0.93 | 0.93 |
| Water/solid materials ratio | (Weight ratio) | 1.23 | 1.48 | 1.84 | 1.82 | 1.84 | 2.76 | 2.68 | 2.76 |

TABLE 4

| Raw materials | | | Ex. 28 | Ex. 29 | Ex. 30 | Ex. 31 | Ex. 32 | Ex. 33 |
|---|---|---|---|---|---|---|---|---|
| OPC | | (Parts by weight) | 41.2 | 41.2 | 41.2 | 41.2 | 41.2 | 41.2 |
| Quick lime | Primary charging | (Parts by weight) | 23.2 | 25.1 | 25.1 | 25.1 | 27.9 | 27.9 |
| Quick lime | Secondary charging | (Parts by weight) | 23.2 | 21.4 | 21.4 | 21.4 | 18.6 | 18.6 |
| Pulverized form of massive siliceous material | | (Parts by weight) | 100 | 100 | 100 | 100 | 100 | 100 |
| | | Blaine value | 7500 | 7500 | 7500 | 2500 | 7500 | 7500 |
| Silica fume | | (Parts by weight) | 0 | 0 | 0 | 0 | 0 | 0 |
| Gypsum | Primary charging | (Parts by weight) | 6.75 | 0 | 0 | 6.75 | 0 | 0 |
| Gypsum | Secondary charging | (Parts by weight) | 0 | 6.75 | 6.75 | 0 | 6.79 | 6.79 |
| Aluminum sulfate | | (Parts by weight) | 0.986 | 0.986 | 0.986 | 0.986 | 1.98 | 1.98 |
| Water | | (Parts by weight) | 202 | 187 | 187 | 187 | 150 | 131 |
| Pulverized pulp | | (Parts by weight) | 0 | 0 | 0 | 0 | 0 | 0 |
| Aluminum powder | | (Parts by weight) | 0.041 | 0.055 | 0.030 | 0.030 | 0.023 | 0.018 |
| Methylcellulose | | (Parts by weight) | 0.041 | 0.038 | 0.038 | 0.038 | 0.030 | 0.027 |
| $CaO/SiO_2$ | | (Molar ratio) | 0.73 | 0.73 | 0.73 | 0.73 | 0.73 | 0.73 |
| Water/solid materials ratio | | (Weight ratio) | 1.03 | 0.95 | 0.95 | 0.95 | 0.77 | 0.67 |

TABLE 5

| Raw materials | | | Comp. Ex. 13 | Comp. Ex. 14 | Comp. Ex. 15 | Comp. Ex. 16 | Comp. Ex. 20 | Comp. Ex. 21 | Comp. Ex. 22 | Comp. Ex. 25 | Comp. Ex. 26 |
|---|---|---|---|---|---|---|---|---|---|---|---|
| OPC | | (Parts by weight) | 81.6 | 81.6 | 81.6 | 81.6 | 40.7 | 54.1 | 53.8 | 13.4 | 27.8 |
| Quick lime | Primary charging | (Parts by weight) | 16.3 | 16.3 | 16.3 | 16.3 | 46.7 | 59.1 | 60.7 | 87.9 | 41.4 |
| Quick lime | Secondary charging | (Parts by weight) | 0 | 0 | 0 | 0 | 0 | 0 | 0 | 0 | 0 |
| Slaked lime | | (Parts by weight) | 0 | 0 | 0 | 0 | 0 | 0 | 0 | 29.0 | 82.2 |
| Pulverized form of massive siliceous material | | (Parts by weight) | 100 | 100 | 100 | 100 | 100 | 100 | 80 | 100 | 100 |
| | | Blaine value | 2500 | 2500 | 2500 | 2500 | 7500 | 11000 | 11000 | Average particle diameter of 20 μm | Average particle diameter of 20 μm |
| Silica fume | | (Parts by weight) | 0 | 0 | 0 | 0 | 0 | 0 | 20 | 0 | 0 |
| Gypsum | Primary charging | (Parts by weight) | 7.09 | 7.09 | 7.09 | 7.09 | 8.50 | 8.84 | 9.71 | 6.90 | 7.50 |

TABLE 5-continued

| Raw materials | | | Comp. Ex. 13 | Comp. Ex. 14 | Comp. Ex. 15 | Comp. Ex. 16 | Comp. Ex. 20 | Comp. Ex. 21 | Comp. Ex. 22 | Comp. Ex. 25 | Comp. Ex. 26 |
|---|---|---|---|---|---|---|---|---|---|---|---|
| Gypsum | Secondary charging | (Parts by weight) | 0 | 0 | 0 | 0 | 0 | 0 | 0 | 0 | 0 |
| Aluminum sulfate | | (Parts by weight) | 0 | 0 | 0 | 0 | 0 | 0 | 0 | 0 | 0 |
| Water | | (Parts by weight) | 143 | 143 | 143 | 143 | 239.9 | 420 | 631 | 147 | 171 |
| Pulverized pulp | | (Parts by weight) | 0 | 0 | 0 | 0 | 1.19 | 2.95 | 6.47 | 0 | 0 |
| Aluminum powder | | (Parts by weight) | 0.058 | 0.086 | 0.124 | 0.225 | 0 | 0 | 0 | 0 | 0 |
| Methyl cellulose | | (Parts by weight) | 0.029 | 0.029 | 0.029 | 0.029 | 0 | 0 | 0 | 0 | 0 |
| $CaO/SiO_2$ | | (Molar ratio) | 0.65 | 0.65 | 0.65 | 0.65 | 0.73 | 0.92 | 0.93 | 0.60 | 1.2 |
| Water/solid materials ratio | | (Weight ratio) | 0.70 | 0.70 | 0.70 | 0.70 | 1.22 | 1.84 | 2.74 | 0.62 | 0.66 |

TABLE 6

| Raw materials | | | Comp. Ex. 27 | Comp. Ex. 28 | Comp. Ex. 30 | Comp. Ex. 31 | Comp. Ex. 32 | Comp. Ex. 33 | Comp. Ex. 34 | Comp. Ex. 35 | Comp. Ex. 36 |
|---|---|---|---|---|---|---|---|---|---|---|---|
| OPC | | (Parts by weight) | 43.2 | 0.0 | 33.3 | 0 | 0 | 0.0 | 0.0 | 0 | 25.0 |
| Quick lime | Primary charging | (Parts by weight) | 77.2 | 73.3 | 0.0 | 0 | 0 | 93.3 | 88.0 | 0 | 0.0 |
| Quick lime | Secondary charging | (Parts by weight) | 0 | 0 | 0 | 0 | 0 | 0 | 0 | 0 | 0.0 |
| Slaked lime | | (Parts by weight) | 26 | 0 | 53.3 | 117 | 100 | 0 | 0 | 80.9 | 48.3 |
| Pulverized form of massive siliceous material | | (Parts by weight) | 100 | 80 | 33 | 100 | 73 | 100 | 0 | 100 | 100 |
| | | Blaine value | Average particle diameter of 20 μm | 11000 | 11000 | Siliceous sand | Siliceous sand | 7500 | — | 11000 | 2500 |
| Silica fume | | (Parts by weight) | 0 | 0 | 0 | 0 | 0 | 0 | 0 | 0 | 0 |
| Diatomaceous earth | | (Parts by weight) | 0 | 20 | 67 | 0 | 27 | 0 | 100 | 0 | 0 |
| Gypsum | Primary charging | (Parts by weight) | 7.40 | 0 | 0 | 0 | 27 | 0 | 0 | 0 | 5.00 |
| Gypsum | Secondary charging | (Parts by weight) | 0 | 0 | 0 | 0 | 0 | 0 | 0 | 37.1 | 0 |
| Aluminum sulfate | | (Parts by weight) | 0 | 0 | 0 | 29.7 | 0.80 | 2.8 | 18.80 | 4.8 | 0 |
| Water | | (Parts by weight) | 200 | 327 | 360 | 3295 | 7900 | 5800 | 1255 | 1585 | 98 |
| Pulverized pulp | | (Parts by weight) | 0 | 11 | 3 | 18.1 | 13.5 | 0 | 0 | 16.1 | 0 |
| Alkali-proof glass fiber | | (Parts by weight) | 0 | 11 | 0 | 1.8 | 2.7 | 5.8 | 0 | 4.2 | 0 |
| Vinylon fiber | | (Parts by weight) | 0 | 0 | 0 | 0 | 0 | 0 | 0 | 0.65 | 0 |
| Wollastonite | | (Parts by weight) | 0 | 0 | 0 | 36.2 | 27.0 | 0 | 0 | 33.9 | 0 |
| Granulated blast furnace slag | | (Parts by weight) | 0 | 0 | 0 | 0 | 0 | 0 | 0 | 37.1 | 0 |
| Pearlite | | (Parts by weight) | 0 | 0 | 0 | 0 | 0 | 0 | 0 | 6.5 | 0 |
| Aluminum powder | | (Parts by weight) | 0 | 0 | 0 | 0 | 0 | 0 | 0 | 0 | 0.017 |
| Methyl cellulose | | (Parts by weight) | 0 | 0 | 0 | 0 | 0 | 0 | 0 | 0 | 0 |
| Silicone | | (Parts by weight) | 0 | 0 | 0 | 0 | 0 | 4.7 | 0 | 0 | 0 |
| Proteinaceous retardant | | (Parts by weight) | 0 | 0 | 0 | 0 | 0 | 0 | 0 | 3.2 | 0 |
| $CaO/SiO_2$ | | (Molar ratio) | 1.2 | 0.83 | 0.73 | 1.02 | 0.91 | 1.0 | 1.13 | 0.77 | 0.60 |
| Water/solid materials ratio | | (Weight ratio) | 0.79 | 1.68 | 1.90 | 10.89 | 32.40 | 28.08 | 10.09 | 9.00 | 0.55 |

TABLE 7

| Raw materials | | | Comp. Ex. 37 | Comp. Ex. 38 | Comp. Ex. 39 |
|---|---|---|---|---|---|
| OPC | | (Parts by weight) | 25.0 | 25.0 | 43.2 |
| Quik lime | Primary charging | (Parts by weight) | 0.0 | 0.0 | 77.2 |
| Quick lime | Secondary charging | (Parts by weight) | 0.0 | 0.0 | 0 |
| Slaked lime | | (Parts by weight) | 48.3 | 48.3 | 26 |
| Pulverized form of massive siliceous material | | (Parts by weight) Blaine value | 100 2500 | 100 2500 | 100 Average particle diameter of 20 μm |
| Silica fume | | (Parts by weight) | 0 | 0 | 0 |
| Gypsum | Primary charging | (Parts by weight) | 5.00 | 5.00 | 7.40 |
| Gypsum | Secondary charging | (Parts by weight) | 0 | 0 | 0 |
| Aluminum sulfate | | (Parts by weight) | 0 | 0 | 0 |
| Water | | (Parts by weight) | 98 | 98 | 200 |
| Pulverized pulp | | (Parts by weight) | 0 | 0 | 0 |
| Aluminum powder | | (Parts by weight) | 0.033 | 0.083 | 0.046 |
| Methyl cellulose | | (Parts by weight) | 0 | 0 | 0 |
| $CaO/SiO_2$ | | (Molar ratio) | 0.60 | 0.60 | 1.2 |
| Water/solid materials ratio | | (Weight ratio) | 0.55 | 0.55 | 0.79 |

TABLE 8

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Apparent specific gravity | | 0.50 | 0.50 | 0.50 | 0.50 | 0.50 | 0.50 | 0.50 | 0.40 | 0.35 |
| Ib/Ia in the powder X-ray diffraction pattern | | 5.65 | 5.79 | 5.44 | 5.26 | 4.78 | 4.56 | 4.58 | 4.65 | 4.35 |
| Logarithmic width at 1/4 height obtained by mercury porosimetry | | 0.69 | 0.86 | 0.79 | 0.87 | 0.99 | 1.01 | 1.12 | 0.72 | 0.89 |
| Number of cells having a cell size of greater than 200 μm | | 20 or less | 20 or less | 20 or less | 20 or less | 20 or less | 20 or less | 20 or less | 20 or less | 20 or less |
| Ratio of the pore volume of pores having a pore diameter of 0.1 μm or less | vol % | 80.66 | 88.11 | 77.48 | 64.3 | 57.57 | 57.58 | 58.28 | 57.86 | 50.45 |
| Ic/Ib in the powder X-ray diffraction pattern | | 1.06 (Silica material) | 1.02 (Silica material) | 1.03 (Silica material) | 0.96 (Silica material) | 1.28 (Silica material) | 1.37 (Silica material) | 1.36 (Silica material) | 0.46 (Silica material) | 0.24 (Silica material) |
| Dynamic modulus of elasticity | $N/mm^2$ | 4620 | 4335 | 4520 | 4337 | 3913 | 3892 | 3820 | 2466 | 1929 |
| Compressive strength | $N/mm^2$ | 17.72 | 16.51 | 16.99 | 15.94 | 12.62 | 12.05 | 10.35 | 8.92 | 6.99 |
| Flexural strength | $N/mm^2$ | 3.78 | 4.08 | 4.3 | 4.22 | 3.40 | 3.28 | 3.35 | 2.22 | 1.74 |
| Value a defined by formula (1) | | 13 | 12 | 13 | 12 | 11 | 11 | 11 | 10 | 9 |
| Value b defined by formula (2) | | 1.78 | 1.83 | 1.77 | 1.77 | 1.63 | 1.57 | 1.39 | 2.30 | 2.61 |
| Specific surface area | $m^2/g$ | 42.3 | 48.5 | 44.6 | 43.2 | 40.5 | 36.5 | 30.6 | 52.0 | 53.5 |
| I (002)/I (220) in the powder X-ray diffraction pattern | | 0.39 | 0.39 | 0.42 | 0.42 | 0.4 | 0.43 | 0.39 | 0.32 | 0.31 |

TABLE 9

|  |  | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| Apparent specific gravity | | 0.35 | 0.25 | 0.55 | 0.55 | 0.60 | 0.69 | 0.69 | 0.79 | 0.89 | 0.99 |
| Ib/Ia in the powder X-ray diffraction pattern | | 4.34 | 3.90 | 6.01 | 5.25 | 5.77 | 5.55 | 5.59 | 5.17 | 4.94 | 4.76 |
| Logarithmic width at 1/4 height obtained by mercury porosimetry | | 0.90 | 0.99 | 0.79 | 0.80 | 0.82 | 0.72 | 0.79 | 0.88 | 0.85 | 0.70 |
| Number of cells having a cell size of greater than 200 μm | | 20 or less | 20 or less | 20 or less | 20 or less | 20 or less | 20 or less | 20 or less | 20 or less | 20 or less | 20 or less |
| Ratio of the pore volume of pores having a pore diameter of 0.1 μm or less | vol % | 50.63 | 29.15 | 88.73 | 84.66 | 92.28 | 95.01 | 90.06 | 95.83 | 97.14 | 95.31 |
| Ic/Ib in the powder X-ray diffraction pattern | | 0.22 (Silica material) | 0.34 (Silica material) | 0.89 (Silica material) | 0.90 (Silica material) | 0.87 (Silica material) | 0.82 (Silica material) | 0.79 (Silica material) | 1.08 (Silica material) | 1.19 (Silica material) | 1.23 (Silica material) |
| Dynamic modulus of elasticity | N/mm$^2$ | 1926 | 1197 | 4799 | 4955 | 5373 | 6950 | 6652 | 8061 | 9284 | 10181 |
| Compressive strength | N/mm$^2$ | 6.68 | 2.96 | 20.70 | 19.23 | 23.7 | 30.05 | 27.70 | 40.18 | 45.90 | 53.83 |
| Flexural strength | N/mm$^2$ | 1.75 | 0.969 | 3.77 | 3.55 | 4.21 | 5.63 | 5.77 | 6.67 | 7.64 | 7.57 |
| Value a defined by formula (1) | | 9 | 10 | 12 | 12 | 12 | 12 | 12 | 11 | 11 | 10 |
| Value b defined by formula (2) | | 2.50 | 2.26 | 1.97 | 1.74 | 1.90 | 1.64 | 1.61 | 1.76 | 1.62 | 1.66 |
| Specific surface Area | m$^2$/g | 52.6 | 66.0 | 51.1 | 50.5 | 46.3 | 45.5 | 47.2 | 43.2 | 42.3 | 42.6 |
| I (002)/I (220) in the powder X-ray diffraction pattern | | 0.35 | 0.44 | 0.47 | 0.45 | 0.42 | 0.39 | 0.38 | 0.46 | 0.44 | 0.47 |

TABLE 10

|  |  | Ex. 20 | Ex. 21 | Ex. 22 | Ex. 23 | Ex. 24 | Ex. 25 | Ex. 26 | Ex. 27 |
|---|---|---|---|---|---|---|---|---|---|
| Apparent specific gravity | | 0.49 | 0.39 | 0.35 | 0.35 | 0.25 | 0.20 | 0.20 | 0.144 |
| Ib/Ia in the powder X-ray diffraction pattern | | 5.88 | 6.02 | 5.82 | 6.15 | 5.92 | 4.52 | 4.58 | 4.42 |
| Logarithmic width at 1/4 height obtained by mercury porosimetry | | 0.94 | 1.12 | 1.02 | 1.07 | 1.07 | 0.95 | 0.97 | 0.96 |
| Number of cells having a cell size of greater than 200 μm | | Numerous | Numerous | Numerous | Numerous | Numerous | Numerous | Numerous | Numerous |
| Ratio of the pore volume of pores having a pore diameter of 0.1 μm or less | vol % | 75.89 | 66.75 | 61.42 | 62.60 | 58.96 | 33.31 | 32.5 | 31.25 |
| Ic/Ib in the powder X-ray diffraction pattern | | 0.86 (Silica material) | 0.78 (Silica material) | 0.90 (Silica material) | 0.87 (Silica material) | 0.88 (Silica material) | 0.31 (Silica material) | 0.35 (Silica material) | 0.30 (Silica material) |
| Dynamic modulus of elasticity | N/mm$^2$ | 3609 | 2430 | 2048 | 2045 | 1195 | 1014 | 1005 | 459 |
| Compressive strength | N/mm$^2$ | 10.18 | 6.84 | 5.32 | 5.26 | 2.87 | 1.43 | 1.4 | 0.79 |
| Flexural strength | N/mm$^2$ | 2.23 | 1.61 | 1.25 | 1.32 | 0.85 | 0.50 | 0.55 | 0.31 |
| Value a defined by formula (1) | | 11 | 10 | 10 | 10 | 10 | 11 | 11 | 8 |
| Value b defined by formula (2) | | 1.48 | 1.81 | 1.81 | 1.80 | 2.20 | 1.40 | 1.39 | 2.54 |
| Specific surface area | m$^2$/g | 44.5 | 48.5 | 50.5 | 52.3 | 51.5 | 53.5 | 55.2 | 53.8 |
| I (002)/I (220) in the powder X-ray diffraction pattern | | 0.4 | 0.32 | 0.38 | 0.39 | 0.38 | 0.31 | 0.34 | 0.33 |

TABLE 11

|  |  | Ex. 28 | Ex. 29 | Ex. 30 | Ex. 31 | Ex. 32 | Ex. 33 | Ex. 34 | Ex. 35 | Ex. 36 |
|---|---|---|---|---|---|---|---|---|---|---|
| Apparent specific gravity |  | 0.61 | 0.61 | 0.68 | 0.68 | 0.82 | 0.93 | 0.43 | 0.21 | 0.31 |
| Ib/Ia in the powder X-ray diffraction pattern |  | 6.25 | 6.25 | 6.25 | 4.44 | 4.88 | 4.75 | 5.06 | 4.86 | 4.93 |
| Logarithmic width at 1/4 height obtained by mercury porosimetry |  | 0.85 | 0.87 | 0.78 | 1.15 | 0.73 | 0.69 | 0.94 | 0.97 | 1.02 |
| Number of cells having a cell size of greater than 200 μm |  | Numerous | Numerous | Numerous | Numerous | Numerous | Numerous | Numerous | Numerous | Numerous |
| Ratio of the pore volume of pores having a pore diameter of 0.1 μm or less | vol % | 88.35 | 86.92 | 90.03 | 78.69 | 93.60 | 97.50 | 68.71 | 49.92 | 65.20 |
| Ic/Ib in the powder X-ray diffraction pattern |  | 0.78 (Silica material) | 0.98 (Silica material) | 0.93 (Silica material) | 2.50 (Silica material) | 1.18 (Silica material) | 1.26 (Silica material) | 0.91 (Silica material) | 0.88 (Silica material) | 0.91 (Silica material) |
| Dynamic modulus of elasticity | N/mm$^2$ | 5240 | 4850 | 5989 | 4953 | 6837 | 8061 | 2938 | 1014 | 1623 |
| Compressive strength | N/mm$^2$ | 16.77 | 15.20 | 20.68 | 13.2 | 27.6 | 32.5 | 9.1 | 1.96 | 4.14 |
| Flexural strength | N/mm$^2$ | 3.82 | 3.0 | 4.45 | 2.74 | 4.80 | 5.97 | 3.49 | 0.96 | 1.58 |
| Value a defined by formula (1) |  | 11 | 10 | 11 | 9 | 9 | 9 | 10 | 11 | 9 |
| Value b defined by formula (2) |  | 1.40 | 1.42 | 1.41 | 1.20 | 1.54 | 1.42 | 1.81 | 1.92 | 2.00 |
| Specific surface area | m$^2$/g | 45.2 | 43.5 | 45.2 | 39.6 | 41.2 | 40.3 | 49.6 | 52.3 | 54.2 |
| I (002)/I (220) in the powder X-ray diffraction pattern |  | 0.39 | 0.35 | 0.42 | 0.41 | 0.42 | 0.46 | 0.36 | 0.39 | 0.29 |

TABLE 12

|  |  | Comp. Ex. 2 | Comp. Ex. 3 | Comp. Ex. 5 | Comp. Ex. 6 | Comp. Ex. 7 | Comp. Ex. 8 | Comp. Ex. 9 | Comp. Ex. 11 | Comp. Ex. 12 |
|---|---|---|---|---|---|---|---|---|---|---|
| Apparent specific gravity |  | 0.50 | 0.51 | 0.35 | 0.69 | 0.49 | 0.35 | 0.35 | 0.20 | 0.69 |
| Ib/Ia in the powder X-ray diffraction pattern |  | 5.01 | 4.82 | 3.32 | 5.23 | 5.62 | 5.72 | 5.36 | 4.23 | 2.89 |
| Logarithmic width at 1/4 height obtained by mercury porosimetry |  | 1.39 | 1.61 | 1.36 | 1.32 | 1.27 | 1.29 | 1.42 | 1.47 | 1.62 |
| Number of cells having a cell size of greater than 200 μm |  | 20 or less | 20 or less | 20 or less | 20 or less | Numerous | Numerous | Numerous | Numerous | Numerous |
| Ratio of the pore volume of pores having a pore diameter of 0.1 μm or less | vol % | 52.10 | 42.10 | 43.10 | 78.20 | 63.5 | 47.60 | 44.30 | 23.5 | 67.76 |
| Ic/Ib in the powder X-ray diffraction pattern |  | 1.04 (Silica material) | 2.62 (Silica material) | 0.41 (Silica material) | 0.76 (Silica material) | 0.91 (Silica material) | 0.80 (Silica material) | 0.82 (Silica material) | 0.37 (Silica material) | 3.85 (Silica material) |
| Dynamic modulus of elasticity | N/mm$^2$ | 4310 | 3650 | 2095 | 6560 | 3250 | 2105 | 2050 | 996 | 4130 |
| Compressive strength | N/mm$^2$ | 10.10 | 7.12 | 3.48 | 19.30 | 6.85 | 3.44 | 3.32 | 1.03 | 9.75 |
| Flexural strength | N/mm$^2$ | 3.12 | 2.07 | 1.40 | 4.7 | 1.72 | 1.21 | 1.31 | 0.58 | 2.23 |
| Value a defined by formula (1) |  | 12 | 10 | 10 | 11 | 9 | 10 | 10 | 11 | 7 |
| Value b defined by formula (2) |  | 1.13 | 1.02 | 1.15 | 1.15 | 1.17 | 1.13 | 1.13 | 1.04 | 1.16 |
| Specific surface area | m$^2$/g | 53.1 | 45.3 | 57.3 | 46.6 | 48.2 | 52.3 | 51.5 | 56.3 | 39.6 |
| I (002)/I (220) in the powder X-ray diffraction pattern |  | 0.36 | 0.32 | 0.28 | 0.33 | 0.36 | 0.41 | 0.44 | 0.36 | 0.23 |

TABLE 13

|  |  | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 |
|---|---|---|---|---|---|---|---|---|---|---|
| Apparent specific gravity | | 0.69 | 0.62 | 0.50 | 0.38 | 0.51 | 0.49 | 0.49 | 0.69 | 0.51 |
| Ib/Ia in the powder X-ray diffraction pattern | | 4.98 | 5.38 | 5.22 | 5.38 | 5.21 | 4.50 | 4.44 | 5.48 | 5.75 |
| Logarithmic width at 1/4 height obtained by mercury porosimetry | | 1.51 | 1.54 | 1.75 | 1.50 | 1.62 | 1.54 | 1.67 | 1.32 | 1.50 |
| Number of cells having a cell size of greater than 200 μm | | Numerous | Numerous | Numerous | Numerous | Numerous | Numerous | Numerous | 20 or less | 20 or less |
| Ratio of the pore volume of pores having a pore diameter of 0.1 μm or less | vol % | 62.7 | 60.07 | 54.34 | 70.66 | 51.6 | 51.50 | 55.30 | 80.75 | 56.88 |
| Ic/Ib in the powder X-ray diffraction pattern | | 2.62 (Silica material) | 2.33 (Silica material) | 2.27 (Silica material) | 2.33 (Silica material) | 2.82 (Silica material) | 5.56 (Silica material) | 2.50 (Silica material) | 0.79 (Silica material) | 0.55 (Silica material) |
| Dynamic modulus of elasticity | N/mm$^2$ | 4568 | 3558 | 2825 | 1826 | 2680 | 2680 | 2520 | 6512 | 4370 |
| Compressive strength | N/mm$^2$ | 9 | 6.20 | 4.95 | 2.56 | 4.60 | 4.68 | 3.40 | 18.60 | 10.3 |
| Flexural strength | N/mm$^2$ | 3.29 | 2.82 | 1.4 | 1.08 | 1.65 | 1.46 | 1.16 | 4.8 | 3.32 |
| Value a defined by formula (1) | | 8 | 7 | 8 | 8 | 7 | 8 | 7 | 11 | 12 |
| Value b defined by formula (2) | | 0.92 | 0.92 | 1.04 | 1.04 | 1.05 | 1.07 | 0.85 | 1.12 | 1.13 |
| Specific surface area | m$^2$/g | 34.2 | 33.7 | 34.2 | 31.6 | 29.3 | 31.2 | 38.3 | 47.6 | 42.7 |
| I (002)/I (220) in the powder X-ray diffraction pattern | | 0.36 | 0.41 | 0.36 | 0.39 | 0.33 | 0.32 | 0.23 | 0.34 | 0.32 |

TABLE 14

|  |  | Comp. Ex. 22 | Comp. Ex. 23 | Comp. Ex. 24 | Comp. Ex. 25 | Comp. Ex. 26 | Comp. Ex. 27 | Comp. Ex. 28 | Comp. Ex. 29 | Comp. Ex. 30 |
|---|---|---|---|---|---|---|---|---|---|---|
| Apparent specific gravity | | 0.35 | 0.49 | 0.35 | 1.08 | 0.98 | 0.88 | 0.74 | 0.29 | 0.45 |
| Ib/Ia in the powder X-ray diffraction pattern | | 3.26 | 5.23 | 5.36 | No tobermorite | No tobermorite | No tobermorite | 1.24 | No tobermorite | 2.91 |
| Logarithmic width at 1/4 height obtained by mercury porosimetry | | 1.42 | 1.36 | 1.48 | 1.31 | 1.36 | 1.56 | 1.26 | 0.67 | 1.21 |
| Number of cells having a cell size of greater than 200 μm | | 20 or less | Numerous | Numerous | 20 or less | 20 or less | 20 or less | 20 or less | 20 or less | 20 or less |
| Ratio of the pore volume of pores having a pore diameter of 0.1 μm or less | vol % | 44.52 | 56.5 | 40.30 | 70.50 | 62.80 | 56.95 | 61.9 | 3.50 | 48.80 |
| Ic/Ib in the powder X-ray diffraction pattern | | 0.36 (Silica material) | 0.88 (Silica material) | 0.84 (Silica material) | No tobermorite | No tobermorite | No tobermorite | 3.00 (Silica material) | No tobermorite | 0.97 (Silica material) |
| Dynamic modulus of elasticity | N/mm$^2$ | 2131 | 3120 | 2050 | 6882 | 6250 | 4710 | 2050 | 561 | 2753 |
| Compressive strength | N/mm$^2$ | 3.58 | 5.86 | 3.12 | 20.70 | 18.23 | 12.11 | 13.7 | 2.70 | 4.90 |
| Flexural strength | N/mm$^2$ | 1.40 | 1.42 | 1.35 | 3.66 | 2.43 | 2.45 | 4.21 | 2.00 | 0.4 |
| Value a defined by formula (1) | | 10 | 9 | 10 | 6 | 6 | 6 | 3 | 4 | 9 |
| Value b defined by formula (2) | | 1.15 | 1.06 | 1.06 | 1.15 | 1.17 | 1.18 | 4.67 | 6.42 | 1.07 |
| Specific surface area | m$^2$/g | 56.3 | 47.5 | 52.3 | 87.8 | 86.5 | 82.7 | 39.0 | 32.7 | 99.8 |
| I (002)/I (220) in the powder X-ray diffraction pattern | | 0.26 | 0.36 | 0.35 | No tobermorite | No tobermorite | No tobermorite | 0.18 | No tobermorite | 0.4 |

TABLE 15

|  |  | Comp. Ex. 31 | Comp. Ex. 32 | Comp. Ex. 33 | Comp. Ex. 34 | Comp. Ex. 35 | Comp. Ex. 36 | Comp. Ex. 37 | Comp. Ex. 38 | Comp. Ex. 39 |
|---|---|---|---|---|---|---|---|---|---|---|
| Apparent specific gravity |  | 0.60 | 0.54 | 0.17 | 0.30 | 0.37 | 0.94 | 0.83 | 0.62 | 0.66 |
| Ib/Ia in the powder X-ray diffraction pattern |  | 2.77 | 2.28 | 4.55 | 3.92 | 2.73 | 2.76 | 2.69 | 2.76 | No tobermorite |
| Logarithmic width at 1/4 height obtained by mercury porosimetry |  | 1.10 | 1.39 | 2.05 | 1.70 | 2.56 | 0.86 | 0.89 | 0.92 | 1.76 |
| Number of cells having a cell size of greater than 200 μm |  | 20 or less | 20 or less | 20 or less | 20 or less | 20 or less | Numerous | Numerous | Numerous | Numerous |
| Ratio of the pore volume of pores having a pore diameter of 0.1 μm or less | vol % | 48.5 | 37.3 | 3.18 | 10.08 | 16.2 | 85.78 | 83.66 | 69.50 | 56.29 |
| Ic/Ib in the powder X-ray diffraction pattern |  | 5.00 (Silica material) | 2.44 (Silica material) | 0.24 (Xonotolite) | 0.50 (Gypsum) | 1.67 (Silica material) | 4.35 (Silica material) | 5.26 (Silica material) | 4.35 (Silica material) | No tobermorite |
| Dynamic modulus of elasticity | N/mm$^2$ | 1988 | 2004 | 277 | 347.35 | 561 | 7105 | 5712 | 3360 | 2269 |
| Compressive strength | N/mm$^2$ | 2.84 | 2.51 | 0.51 | 1.38 | 0.36 | 20.35 | 10.45 | 7.09 | 4.59 |
| Flexural strength | N/mm$^2$ | 1.43 | 1.25 | 0.17 | 0.46 | 0.15 | 5.24 | 4.18 | 2.42 | 1.20 |
| Value a defined by formula (1) |  | 4 | 5 | 4 | 2 | 2 | 8 | 8 | 7 | 4 |
| Value b defined by formula (2) |  | 1.01 | 0.88 | 3.49 | 6.74 | 0.86 | 1.07 | 0.77 | 1.15 | 1.34 |
| Specific surface area | m$^2$/g | 52.8 | 58.6 | 66.3 | 58.3 | 66.5 | 81.7 | 78.4 | 80.8 | 93.3 |
| I (002)/I (220) in the powder X-ray diffraction pattern |  | 0.25 | 0.25 | 0.17 | 0.32 | 0.30 | 0.36 | 0.33 | 0.38 | No tobermorite |

TABLE 16

| Accelerated carbonation test |  | Ex. 1 | Ex. 20 | Comp. Ex. 15 | Comp. Ex. 27 | Comp. Ex. 28 | Comp. Ex. 30 | Comp. Ex. 37 |
|---|---|---|---|---|---|---|---|---|
| Shrinkage ratio (3 Days later) | % | 0 | 0 | 0 | 0.45 | 0.08 | 0.05 | 0.1 |
| Shrinkage ratio (7 Days later) | % | 0 | 0 | 0.04 | 0.55 | 0.24 | 0.2 | 0.36 |
| Shrinkage ratio (14 Days later) | % | 0.01 | 0.02 | 0.18 | 0.65 | 0.33 | 0.28 | 0.44 |

TABLE 17

| Nail holding strength test |  | Ex. 1 | Ex. 20 | Comp. Ex. 15 | Comp. Ex. 21 | Comp. Ex. 23 |
|---|---|---|---|---|---|---|
| Apparent specific gravity |  | 0.50 | 0.49 | 0.50 | 0.50 | 0.49 |
| Pull-out strength | (kgf) | 162 | 110 | 68.8 | 120 | 75 |
| Breakage property |  | Cone breakage | Cone breakage | Pulled-out | Cone breakage | Pulled-out |

TABLE 18

|  | Ex. 1 | Ex. 37 | Comp. Ex. 40 |
|---|---|---|---|
| Water-repellent substance | Not added | Added | Added |
| Apparent specific gravity | 0.50 | 0.50 | 0.50 |
| Ib/Ia in the powder X-ray diffraction pattern | 5.65 | 5.36 | 5.11 |
| Logarithmic width at 1/4 height obtained by mercury porosimetry | 0.69 | 0.71 | 1.77 |
| Number of cells having a cell size of greater than 200 μm | 20 or less | 20 or less | Numerous |

TABLE 18-continued

|  |  | Ex. 1 | Ex. 37 | Comp. Ex. 40 |
|---|---|---|---|---|
| Ratio of the pore volume of pores having a pore diameter of 0.1 $\mu$m or less | vol % | 80.66 | 82.22 | 56.30 |
| Ic/Ib in the powder X-ray diffraction pattern |  | 1.06 (Silica material) | 1.04 (Silica material) | 2.62 (Silica material) |
| Dynamic modulus of elasticity | N/mm$^2$ | 4620 | 4580 | 2750 |
| Compressive strength | N/mm$^2$ | 17.72 | 17.12 | 4.65 |
| Flexural strength | N/mm$^2$ | 3.78 | 3.68 | 1.4 |
| Value of a defined by formula (1) |  | 13 | 13 | 8 |
| Value of b defined by formula (2) |  | 1.78 | 1.75 | 1.02 |
| Specific surface area | m$^2$/g | 42.3 | 40.2 | 36.3 |
| I (002)/I (220) in the powder X-ray diffraction pattern |  | 0.39 | 0.43 | 0.33 |
| One-side water absorption |  |  |  |  |
| 1 day later | weight % | 26 | 5 | 21 |
| 1 week later | weight % | 62 | 9 | 36 |
| Dimensional change ratio |  |  |  |  |
| 1 day later | $\mu$m/m | 580 | 300 | 452 |
| 1 week later | $\mu$m/m | 910 | 560 | 773 |

TABLE 19

|  |  | Ex. 38 | Ex. 1 | Comp. Ex. 41 | Comp. Ex. 15 |
|---|---|---|---|---|---|
| Apparent specific gravity |  | 0.50 | 0.50 | 0.50 | 0.50 |
| Ib/Ia in the powder X-ray diffraction pattern |  | 5.58 | 5.65 | 5.03 | 5.22 |
| Logarithmic width at 1/4 height obtained by mercury porosimetry |  | 0.75 | 0.69 | 1.74 | 1.75 |
| Number of cells having a cell size of greater than 200 $\mu$m |  | 20 or less | 20 or less | Numerous | Numerous |
| Ratio of the pore volume of pores having a pore diameter of 0.1 $\mu$m or less | vol % | 77.30 | 80.66 | 52.60 | 54.34 |
| Ic/Ib in the powder X-ray diffraction pattern |  | 1.02 (Silica material) | 1.06 (Silica material) | 2.63 (Silica material) | 2.57 (Silica material) |
| Dynamic modulus of elasticity | N/mm$^2$ | 4320 | 4620 | 2750 | 2825 |
| Compressive strength | N/mm$^2$ | 18.20 | 17.72 | 5.02 | 4.95 |
| Flexural strength | N/mm$^2$ | 3.42 | 3.78 | 1.52 | 1.4 |
| Value of a defined by formula (1) |  | 12 | 13 | 8 | 8 |
| Value of b defined by formula (2) |  | 2.03 | 1.78 | 1.10 | 1.04 |
| Specific surface area | m$^2$/g | 44.3 | 42.3 | 35.3 | 34.2 |
| I (002)/I (220) in the powder X-ray diffraction pattern |  | 0.35 | 0.39 | 0.39 | 0.36 |

TABLE 20

|  |  | Ex. 38 | Ex. 1 | Comp. Ex. 41 | Comp. Ex. 15 |
|---|---|---|---|---|---|
| Fiber |  | AF |  | AF |  |
| Amount of fiber | vol % | 0.5 | 0 | 0.5 | 0 |
| Compressive strength | N/mm$^2$ | 18.2 | 17.72 | 5.02 | 4.95 |
| Impact strength | J/m$^2$ | 2150 | 400 | 1150 | 350 |

AF: Aramid fiber "Technora 320–6 mm" (trade name; manufactured and sold by Teijin Chemicals Ltd., Japan)

TABLE 21

|  |  | Ex. 39 | Comp. Ex. 42 |
|---|---|---|---|
| Weight of the panel | (kgf) | 76 | 76 |
| Initial cracking load | (kgf) | 1678 | 776 |
| Initial cracking deflection | (mm) | 6.95 | 5.19 |
| Stiffness of the panel | (kgf · cm$^2$) | 2.37 × 10$^8$ | 1.47 × 10$^8$ |
| Breaking load | (kgf) | 2017 | 1432 |

TABLE 22

|  |  | Ex. 39 | Comp. Ex. 42 |
|---|---|---|---|
| Maximum forced response displacement | (mm) | 3.0 | 4.2 |
| Half-life of the amplitude | (sec) | 0.265 | 0.375 |
| Resonance frequency | (Hz) | 34.7 | 32 |

INDUSTRIAL APPLICABILITY

The cured form of calcium silicate of the present invention which, while exhibiting excellent properties such as fire resistance and a light weight, exhibits excellent properties, such as a high modulus of elasticity, a high compressive strength, a high ratio of compressive strength to modulus of elasticity, a high resistance to the neutralization reaction, and a high processability. Therefore, the cured form of calcium silicate of the present invention can be used as materials for an external wall, an internal wall and the like. Specifically, the cured form of calcium silicate of the present invention can be used as materials for a fire resisting partition wall, a cloth finishing wall, a fire resisting ceiling board for eaves, a fireproof coating board, an external board for a building, a floor panel for a dwelling, a fire resisting sheathing board and the like.

More specifically, the cured form of calcium silicate of the present invention exhibits satisfactory insulation against noises generated due to the weight impact. Further, the cured form of calcium silicate of the present invention can be used in a wide variety of building materials, in which the use of conventional composition is inevitably limited, such as a part of a building which is carried by supporting members arranged at long intervals, a roof bed which is required to have a high retention strength, a high-rise building and the like. Furthermore, a conventional apparatus employed for producing a conventional ALC can be used, so that the productivity of the cured form of calcium silicate of the present invention is efficiently improved.

In addition, the cured form of calcium silicate has high modulus of elasticity, high compressive strength and high ratio of compressive strength to modulus of elasticity even when the cured form of calcium silicate contains coarse cells. Therefore, the cured form of calcium silicate enables provision of building materials having an excellency of properties which is several times as high as those of conventional building materials.

What is claimed is:

1. A cured form of calcium silicate, mainly comprising tobermorite and exhibiting:

a powder X-ray diffraction pattern in which the diffraction peak intensity Ib ascribed to the (220) plane of the tobermorite and the minimum diffraction intensity Ia observed in the diffraction angle range between the two diffraction peaks respectively ascribed to the (220) plane and (222) plane of the tobermorite satisfy the relationship $Ib/Ia \geq 3.0$;

an apparent specific gravity of from 0.14 to 1.0; and a differential pore distribution curve obtained by mercury porosimetry in which the logarithmic width of the pore diameter distribution as measured at a height of ¼ of the height of the maximum peak of the differential pore distribution curve is from 0.40 to 1.20.

2. The cured form of calcium silicate according to claim 1, which exhibits an apparent specific gravity of from 0.14 to 0.9.

3. The cured form of calcium silicate according to claim 1, which exhibits an apparent specific gravity of from 0.2 to less than 0.7.

4. The cured form of calcium silicate according to any one of claims 1 to 3, wherein the relationship $Ib/Ia \geq 4.0$ is satisfied in said powder X-ray diffraction pattern.

5. The cured form of calcium silicate according to any one of claims 1 to 3, wherein the value of parameter a defined by formula (1) below is 7 or more and the value of parameter b defined by formula (2) below is 1.20 or more, $$a = (Y \times 10^{-3})/(D^{1.5}) \quad (1)$$

wherein Y and D respectively represent the modulus of elasticity (N/mm$^2$) of and the apparent specific gravity of the cured form of calcium silicate, $$b = S/(Y \times 10^{-3})^{1.5} \quad (2)$$

wherein S represents the compressive strength (N/mm$^2$) of the cured form of calcium silicate and Y is as defined above.

6. The cured form of calcium silicate according to claim 5, wherein the value of parameter b defined by formula (2) is 1.30 or more.

7. The cured form of calcium silicate according to any one of claims 1 to 3, wherein the number of cells having a cell size of greater than 200 μm in terms of the length of the long axis of the cross-section of each of the cells, in a 10 mm square on a cross-section of the cured form of calcium silicate, is larger than 20 and wherein the amount of the pore volume of pores having a pore diameter of 0.1 μm or less, as determined by mercury porosimetry, is:

from $V_1$ (D) to 98 vol % when the apparent specific gravity D of the cured form of calcium silicate is from 0.5 to 1.0, from $V_2$ (D) to 95 vol % when the apparent specific gravity D of the cured form of calcium silicate is from 0.3 to less than 0.5, or from $V_3$ (D) to 90 vol % when the apparent specific gravity D of the cured form of calcium silicate is from 0.14 to less than 0.3, wherein each vol % is based on the total pore volume of the cured form of calcium silicate, and $V_1$ (D), $V_2$ (D) and $V_3$ (D) are, respectively, calculated by the following formulae (3), (4) and (5):

$$V_1(D) = 50 \times D + 40 \quad (3),$$

$$V_2(D) = 100 \times D + 15 \quad (4), \text{ and}$$

$$V_3(D) = 200 \times D - 15 \quad (5).$$

8. The cured form of calcium silicate according to any one of claims 1 to 3, wherein the number of cells having a cell size of greater than 200 μm in terms of the length of the long axis of the cross-section of each of the cells, in a 10 mm square on a cross-section of the cured form of calcium silicate, is 20 or less and wherein the amount of the pore volume of pores having a pore diameter of 0.1 μm or less, as determined by mercury porosimetry, is:

from 90 to 98 vol % when the apparent specific gravity D of the cured form of calcium silicate is from 0.8 to 1.0, from $V_4$ (D) to 97 vol % when the apparent specific gravity D of the cured form of calcium silicate is from 0.5 to less than 0.8, or from $V_5$ (D) to 92 vol % when the apparent specific gravity D of the cured form of calcium silicate is from 0.14 to less than 0.5, wherein each vol % is based on the total pore volume of the cured form of calcium silicate, and $V_4$ (D) and $V_5$ (D) are, respectively, calculated by the following formulae (6) and (7):

$$V_4(D) = 100 \times D + 10 \quad (6), \text{ and}$$

$$V_5(D) = 150 \times D - 15 \quad (7).$$

9. The cured form of calcium silicate according to any one of claims 1 to 3, which further comprises a coexisting highly crystalline sub-stance and exhibits a powder X-ray diffraction pattern in which the diffraction peak intensity Ib ascribed to the (220) plane of the tobermorite and the maximum diffraction intensity Ic ascribed to the coexisting highly crystalline substance satisfy the relationship Ic/Ib≦3.0.

10. A calcium silicate composite structure comprising the cured form of calcium silicate of any one of claims 1 to 3 and a reinforcing iron rod or a reinforcing wire netting.

11. A method for producing a cured form of calcium silicate mainly comprising tobermorite, which comprises:

providing an aqueous slurry comprising water and solid materials including a siliceous material, a cementitious material, a calcareous material, at least one member selected from the group consisting of aluminum sulfate and a hydrate thereof, and a sulfate compound other than aluminum sulfate and a hydrate thereof, pouring said aqueous slurry into a mold, and precuring said aqueous slurry, followed by autoclaving, wherein 50% by weight or more of said siliceous material is a crystalline siliceous material, and wherein said at least one member selected from the group consisting of said aluminum sulfate and the hydrate thereof is contained in said aqueous slurry in an amount of from 0.09 to 10% by weight in terms of the amount of $Al_2O_3$, based on the total weight of said solid materials, and said sulfate compound other than aluminum sulfate and a hydrate thereof is contained in said aqueous slurry in an amount of from 0.15 to 15% by weight in terms of the amount of $SO_3$, based on the total weight of said solid materials, and wherein said amount of $SO_3$ is the sum of the amount of the $SO_3$ corresponding to said at least one member selected from the group consisting of said aluminum sulfate and the hydrate thereof and the amount of the $SO_3$ corresponding to said sulfate compound other than aluminum sulfate and a hydrate thereof.

12. The method according to claim 11, wherein a precured form of aqueous slurry, which is obtained by said precuring of said aqueous slurry, is re-leased from said mold and autoclaved.

13. The method according to claim 11 or 12, wherein said aqueous slurry contains the water in an amount of from 0.67 to 3.5 in terms of the ratio of the weight of the water to the total weight of said solid materials and wherein said aqueous slurry is mixed with an aluminum powder as a foaming agent, wherein said aluminum powder is used in an amount of from 0.002 to 0.8% by weight in terms of the weight of solid aluminum, based on the total weight of said solid materials, to thereby obtain a foamable aqueous slurry, said foamable aqueous slurry being poured into the mold.

14. The method according to claim 11 or 12, wherein said aqueous slurry contains the water in an amount of from 0.67 to 3.5 in terms of the ratio of the weight of the water to the total weight of said solid materials and wherein said aqueous slurry is mixed with a foam prepared by introducing air into a pre-foaming agent or an aqueous solution thereof, wherein said foam is used in an amount of from 5 to 300% by volume, based on the volume of said aqueous slurry, to thereby obtain a pre-foamed aqueous slurry, said pre-foamed aqueous slurry being poured into the mold.

15. The method according to claim 11 or 12, wherein said aqueous slurry is a nonfoamable aqueous slurry which contains the water in an amount of from 0.77 to 5 in terms of the ratio of the weight of the water to the total weight of said solid materials, said non-foamable aqueous slurry being poured into the mold.

16. The method according to any one of claims 11 to 15, wherein said aqueous slurry comprising said water and said solid materials including said siliceous material, said cementitious material, said calcareous material, said at least one member selected from the group consisting of said aluminum sulfate and the hydrate thereof, and said sulfate compound other than aluminum sulfate and a hydrate thereof is prepared by a process comprising the steps of:

(1) mixing together water, a siliceous material, a cementitious material, at least one member selected from the group consisting of aluminum sulfate and a hydrate thereof, a sulfate compound other than aluminum sulfate and a hydrate thereof, and a part of a calcareous material, to thereby obtain a mixture, and (2) adding the remainder of the calcareous material to the mixture obtained in step (1), followed by mixing.

17. The method according to any one of claims 11 to 15, wherein said aqueous slurry comprising said water and said solid materials including said siliceous material, said cementitious material, said calcareous material, said at least one member selected from the group consisting of said aluminum sulfate and the hydrate thereof, and said sulfate compound other than aluminum sulfate and a hydrate thereof is prepared by a process comprising the steps of:

(1) mixing together water, a siliceous material, a cementitious material, at least one member selected from the group consisting of aluminum sulfate and a hydrate thereof, and a part of a calcareous material, to thereby obtain a mixture, and (2) adding a sulfate compound other than aluminum sulfate and a hydrate thereof and the remainder of the calcareous material to the mixture obtained in step (1), followed by mixing.

18. The method according to any one of claims 11 to 12, wherein said sulfate compound other than aluminum sulfate and a hydrate thereof is gypsum dihydrate.

19. The method according to any one of claims 11 to 12, wherein said crystalline siliceous material is a finely pulverized form of massive siliceous material, wherein said finely pulverized form has a specific surface area of from 5,000 to 300,000 $cm^2/g$ as measured by the Blaine permeation method.

20. The method according to any one of claims 11 to 12, wherein said mold has a reinforcing iron rod or a reinforcing wire netting arranged therein, to thereby enable production of a reinforced calcium silicate composite structure.

21. The cured form of calcium silicate according to any one of claims 1 to 3, wherein the number of cells having a cell size of greater than 200 $\mu$m in terms of length of the long axis of the cross-section of each of the cells, in a 10 mm square on a cross-section of the cured form of calcium silicate, is larger than 20.

* * * * *